US012643696B2

(12) United States Patent      (10) Patent No.:    US 12,643,696 B2

Lowe et al.            (45) Date of Patent:      Jun. 2, 2026

(54) RECONFIGURABLE LANDING PLATFORMS IN BASE STATIONS FOR USE WITH UNMANNED AERIAL VEHICLES

(71) Applicant: Skydio, Inc., San Mateo, CA (US)

(72) Inventors: Patrick Allen Lowe, Palo Alto, CA (US); Christopher C. Berthelet, Sunnyvale, CA (US); Philipp Foehn, Foster City, CA (US); Benjamin Scott Thompson, San Carlos, CA (US); Yee Shan Woo, Campbell, CA (US); Joseph Tankeh, Fremont, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 19/090,833

(22) Filed: Mar. 26, 2025

(65) Prior Publication Data

US 2026/0048864 A1     Feb. 19, 2026

Related U.S. Application Data

(60) Provisional application No. 63/683,496, filed on Aug. 15, 2024.

(51) Int. Cl.
| | |
|---|---|
| *B64U 70/92* | (2023.01) |
| *B64U 70/50* | (2023.01) |
| *B64U 80/70* | (2023.01) |

(52) U.S. Cl.
CPC ............. *B64U 70/92* (2023.01); *B64U 70/50* (2023.01); *B64U 80/70* (2023.01)

(58) Field of Classification Search
CPC ........ B64U 70/97; B64U 80/25; B64U 80/70; B64U 10/14; B64U 70/92; B64U 70/95; B64U 70/99; A63B 21/156; F16H 55/52
See application file for complete search history.

(56) References Cited

U.S. PATENT DOCUMENTS 3,253,806 A  *  5/1966  Eickmann ............... B64C 27/12
                                           244/17.23
3,417,729 A  *  12/1968  Gilday .................. B64C 27/006
                                               416/61

(Continued)

FOREIGN PATENT DOCUMENTS

CN      104220780 A    12/2014
CN      106986043 A     7/2017

(Continued)

OTHER PUBLICATIONS

International Search Report and Written Opinion mailed on Jan. 9, 2026 in corresponding PCT Application No. PCT/US2025/042006.

*Primary Examiner* — Medhat Badawi

(74) *Attorney, Agent, or Firm* — Young Basile Hanlon & MacFarlane, P.C.

(57) ABSTRACT

A reconfigurable landing platform for a base station that is configured to receive an unmanned aerial vehicle (UAV). The landing platform includes alignment members, which are configured for engagement with the UAV, and a drive mechanism, which is connected to the alignment members to facilitate repositioning of the alignment members from an extended position into a retracted position to thereby reposition the UAV on the landing platform. The drive mechanism includes a drive member and pulley assemblies, which engage the drive member and are configured to vary a lateral tension and an axial tension therein.

20 Claims, 24 Drawing Sheets

(56)                References Cited

U.S. PATENT DOCUMENTS

| 3,483,696 | A | * | 12/1969 | Gilbert | B64C 27/08 |
| | | | | | 416/157 R |
| 3,575,527 | A | * | 4/1971 | Watanabe | F04D 29/052 |
| | | | | | 416/169 R |
| 3,805,723 | A | * | 4/1974 | Bernaerts | B63H 3/002 |
| | | | | | 416/61 |
| 4,262,712 | A | * | 4/1981 | Young | B67D 7/54 |
| | | | | | 141/DIG. 1 |
| 4,865,248 | A | * | 9/1989 | Barth | E05B 35/086 |
| | | | | | 312/215 |
| 4,954,962 | A | * | 9/1990 | Evans, Jr. | G05D 1/0246 |
| | | | | | 701/28 |
| 5,040,116 | A | * | 8/1991 | Evans, Jr. | G05D 1/0246 |
| | | | | | 701/28 |
| 5,116,273 | A | * | 5/1992 | Chan | A45B 23/00 |
| | | | | | 160/370.21 |
| 5,283,739 | A | * | 2/1994 | Summerville | G05D 1/0289 |
| | | | | | 700/255 |
| 5,371,581 | A | * | 12/1994 | Wangler | G01S 17/933 |
| | | | | | 340/963 |
| 5,386,462 | A | * | 1/1995 | Schlamp | G07F 11/62 |
| | | | | | 379/93.12 |
| 5,452,374 | A | * | 9/1995 | Cullen | G06T 7/70 |
| | | | | | 382/296 |
| 5,497,236 | A | * | 3/1996 | Wolff | H04N 1/047 |
| | | | | | 358/406 |
| 5,731,884 | A | * | 3/1998 | Inoue | H04N 1/4076 |
| | | | | | 358/3.06 |
| 5,842,667 | A | * | 12/1998 | Jones | B64F 1/00 |
| | | | | | 244/114 R |
| 5,847,522 | A | * | 12/1998 | Barba | H02K 7/1025 |
| | | | | | 318/269 |
| 5,901,253 | A | * | 5/1999 | Tretter | G06T 3/606 |
| | | | | | 382/292 |
| 5,995,898 | A | * | 11/1999 | Tuttle | G07C 5/085 |
| | | | | | 427/255.31 |
| 6,031,612 | A | * | 2/2000 | Shirley | G01B 11/2531 |
| | | | | | 356/511 |
| 6,073,283 | A | * | 6/2000 | Zheng | A47G 9/062 |
| | | | | | 5/502 |
| 6,079,668 | A | * | 6/2000 | Brown | B64F 1/36 |
| | | | | | 244/114 R |
| 6,266,577 | B1 | * | 7/2001 | Popp | B25J 9/1682 |
| | | | | | 700/248 |
| 6,344,796 | B1 | * | 2/2002 | Ogilvie | G07C 9/27 |
| | | | | | 340/568.1 |
| 6,374,155 | B1 | * | 4/2002 | Wallach | G05D 1/0295 |
| | | | | | 701/25 |
| 6,426,699 | B1 | * | 7/2002 | Porter | A47F 10/00 |
| | | | | | 340/568.1 |
| 6,507,670 | B1 | * | 1/2003 | Moed | G06T 5/77 |
| | | | | | 382/172 |
| 6,543,983 | B1 | * | 4/2003 | Felder | B23Q 7/1442 |
| | | | | | 414/389 |
| 6,636,781 | B1 | * | 10/2003 | Shen | B25J 9/065 |
| | | | | | 703/2 |
| 6,676,460 | B1 | * | 1/2004 | Motsenbocker | B63H 5/165 |
| | | | | | 440/71 |
| 6,690,997 | B2 | * | 2/2004 | Rivalto | G06Q 10/08 |
| | | | | | 700/242 |
| 6,694,217 | B2 | * | 2/2004 | Bloom | G07C 9/21 |
| | | | | | 700/242 |
| 6,705,523 | B1 | * | 3/2004 | Stamm | G06Q 10/08 |
| | | | | | 235/383 |
| 6,804,607 | B1 | * | 10/2004 | Wood | G05D 1/1062 |
| | | | | | 340/425.5 |
| 6,919,803 | B2 | * | 7/2005 | Breed | G08B 29/181 |
| | | | | | 340/568.1 |
| 6,954,290 | B1 | * | 10/2005 | Braudaway | H04N 1/00045 |
| | | | | | 358/488 |
| 6,961,711 | B1 | * | 11/2005 | Chee | G07F 7/00 |
| | | | | | 705/26.1 |
| 6,965,440 | B1 | * | 11/2005 | Nakagiri | G06F 3/1262 |
| | | | | | 715/251 |
| 6,970,838 | B1 | * | 11/2005 | Kamath | G06Q 30/0617 |
| | | | | | 705/26.81 |
| 7,006,952 | B1 | * | 2/2006 | Matsumoto | G06F 7/60 |
| | | | | | 703/2 |
| 7,016,536 | B1 | * | 3/2006 | Ling | G06V 30/15 |
| | | | | | 382/290 |
| 7,031,519 | B2 | * | 4/2006 | Elmenhurst | G06F 18/254 |
| | | | | | 382/101 |
| 7,082,883 | B1 | * | 8/2006 | Arias | A47C 31/11 |
| | | | | | 108/90 |
| 7,129,817 | B2 | * | 10/2006 | Yamagishi | G07C 9/37 |
| | | | | | 340/5.71 |
| 7,133,743 | B2 | * | 11/2006 | Tilles | G07F 17/13 |
| | | | | | 700/242 |
| 7,145,699 | B2 | * | 12/2006 | Dolan | G06V 30/1478 |
| | | | | | 358/452 |
| 7,149,611 | B2 | * | 12/2006 | Beck | B64U 30/26 |
| | | | | | 701/32.4 |
| 7,171,879 | B2 | * | 2/2007 | Gass | B27G 21/00 |
| | | | | | 83/477.1 |
| 7,188,513 | B2 | * | 3/2007 | Wilson | G01N 1/2226 |
| | | | | | 73/864.81 |
| 7,334,755 | B2 | * | 2/2008 | Svoboda, Jr. | B64C 27/08 |
| | | | | | 244/17.23 |
| 7,335,071 | B1 | * | 2/2008 | Motsenbocker | B63H 23/30 |
| | | | | | 440/71 |
| 7,337,686 | B2 | * | 3/2008 | Sagi-Dolev | G01V 11/00 |
| | | | | | 73/866 |
| 7,337,944 | B2 | * | 3/2008 | Devar | A47G 29/16 |
| | | | | | 232/19 |
| 7,339,993 | B1 | * | 3/2008 | Brooks | H04N 21/440281 |
| | | | | | 375/240.1 |
| 7,459,880 | B1 | * | 12/2008 | Rosen | H01M 10/465 |
| | | | | | 320/101 |
| 7,639,386 | B1 | * | 12/2009 | Siegel | G06Q 40/03 |
| | | | | | 358/1.18 |
| 7,668,404 | B2 | * | 2/2010 | Adams | G06V 10/24 |
| | | | | | 382/101 |
| 7,673,831 | B2 | * | 3/2010 | Steele | F42B 12/365 |
| | | | | | 244/1 TD |
| 7,685,953 | B2 | * | 3/2010 | Giles | B63J 99/00 |
| | | | | | 114/72 |
| 7,693,745 | B1 | * | 4/2010 | Pomerantz | G07F 17/13 |
| | | | | | 705/26.5 |
| 7,894,939 | B2 | * | 2/2011 | Zini | G05D 1/028 |
| | | | | | 700/245 |
| 7,925,375 | B2 | * | 4/2011 | Schininger | G07F 11/54 |
| | | | | | 700/214 |
| 7,946,526 | B2 | * | 5/2011 | Zimet | B64U 30/24 |
| | | | | | 244/17.23 |
| 7,946,530 | B1 | * | 5/2011 | Talmage, Jr. | B64C 27/006 |
| | | | | | 244/140 |
| 7,966,093 | B2 | * | 6/2011 | Zhuk | G05D 1/0088 |
| | | | | | 706/50 |
| 8,015,023 | B1 | * | 9/2011 | Lee | G06Q 10/08 |
| | | | | | 700/226 |
| 8,052,081 | B2 | * | 11/2011 | Olm | B64U 10/13 |
| | | | | | 244/17.23 |
| 8,078,317 | B2 | * | 12/2011 | Allinson | G07F 11/62 |
| | | | | | 700/242 |
| 8,126,642 | B2 | * | 2/2012 | Trepagnier | G05D 1/024 |
| | | | | | 701/28 |
| 8,131,607 | B2 | * | 3/2012 | Park | G06Q 10/047 |
| | | | | | 705/28 |
| 8,145,351 | B2 | * | 3/2012 | Schininger | G07F 9/009 |
| | | | | | 221/12 |
| 8,195,328 | B2 | * | 6/2012 | Mallett | G16H 40/67 |
| | | | | | 221/102 |
| 8,245,469 | B2 | * | 8/2012 | Rubel | E04B 5/48 |
| | | | | | 52/223.6 |
| 8,256,172 | B2 | * | 9/2012 | Benson | E04F 15/02183 |
| | | | | | 52/489.1 |
| 8,286,236 | B2 | * | 10/2012 | Jung | G06Q 50/18 |
| | | | | | 713/168 |

(56)  References Cited

U.S. PATENT DOCUMENTS

| | | | | |
|---|---|---|---|---|
| 8,412,588 | B1 * | 4/2013 | Bodell | G06Q 30/0643 |
| | | | | 706/919 |
| 8,418,959 | B2 * | 4/2013 | Kang | B64U 80/25 |
| | | | | 244/116 |
| 8,429,754 | B2 * | 4/2013 | Jung | H04L 9/40 |
| | | | | 726/21 |
| 8,511,606 | B1 * | 8/2013 | Lutke | B64U 80/40 |
| | | | | 320/109 |
| 8,599,027 | B2 * | 12/2013 | Sanchez | G01S 13/931 |
| | | | | 340/435 |
| 8,602,349 | B2 * | 12/2013 | Petrov | G05D 1/0866 |
| | | | | 244/17.23 |
| 8,639,400 | B1 * | 1/2014 | Wong | A63H 27/12 |
| | | | | 701/16 |
| 8,736,820 | B2 * | 5/2014 | Choe | G05D 1/024 |
| | | | | 356/9 |
| 8,752,166 | B2 * | 6/2014 | Jung | B33Y 50/02 |
| | | | | 700/95 |
| 8,791,790 | B2 * | 7/2014 | Robertson | G07C 9/20 |
| | | | | 455/411 |
| 8,874,301 | B1 * | 10/2014 | Rao | B60K 28/04 |
| | | | | 340/576 |
| 8,899,903 | B1 * | 12/2014 | Saad | B65G 67/00 |
| | | | | 320/109 |
| 8,948,914 | B2 * | 2/2015 | Zini | G05B 19/41895 |
| | | | | 700/258 |
| 8,956,100 | B2 * | 2/2015 | Davi | B60P 1/02 |
| | | | | 414/334 |
| 8,989,053 | B1 * | 3/2015 | Skaaksrud | H04W 4/80 |
| | | | | 370/255 |
| 9,033,285 | B2 * | 5/2015 | Iden | B61C 17/12 |
| | | | | 701/19 |
| 9,050,997 | B1 * | 6/2015 | Schramm | B62D 6/002 |
| 9,051,043 | B1 * | 6/2015 | Peeters | G05D 1/104 |
| 9,056,676 | B1 * | 6/2015 | Wang | B60R 9/00 |
| 9,079,587 | B1 * | 7/2015 | Rupp | G05D 1/0289 |
| 9,126,693 | B1 * | 9/2015 | Shi | G05D 1/0669 |
| 9,139,310 | B1 * | 9/2015 | Wang | G05D 1/102 |
| 9,163,909 | B2 * | 10/2015 | Chengalva | G05D 1/0088 |
| 9,193,452 | B2 * | 11/2015 | Carreker | B64C 27/52 |
| 9,195,959 | B1 * | 11/2015 | Lopez | G06Q 30/0635 |
| 9,216,587 | B2 * | 12/2015 | Ando | B41J 29/38 |
| 9,216,857 | B1 * | 12/2015 | Kalyan | G06Q 10/087 |
| 9,235,213 | B2 * | 1/2016 | Villamar | G06Q 10/087 |
| 9,244,147 | B1 * | 1/2016 | Soundararajan | G06Q 10/0833 |
| 9,256,852 | B1 * | 2/2016 | Myllymaki | B60P 3/007 |
| 9,261,578 | B2 * | 2/2016 | Im | G01S 5/02526 |
| 9,290,277 | B2 * | 3/2016 | You | B64U 50/34 |
| 9,321,531 | B1 * | 4/2016 | Takayama | B64D 47/06 |
| 9,336,635 | B2 * | 5/2016 | Robertson | G07C 9/00571 |
| 9,358,975 | B1 * | 6/2016 | Watts | G05D 1/0223 |
| 9,381,916 | B1 * | 7/2016 | Zhu | B60W 30/0956 |
| 9,387,928 | B1 * | 7/2016 | Gentry | B64U 50/39 |
| 9,397,518 | B1 * | 7/2016 | Theobald | B25J 5/005 |
| 9,404,761 | B2 * | 8/2016 | Meuleau | G01C 21/3453 |
| 9,409,644 | B2 * | 8/2016 | Stanek | G05D 1/0202 |
| 9,411,337 | B1 * | 8/2016 | Theobald | G05D 1/0225 |
| 9,412,280 | B1 * | 8/2016 | Zwillinger | G08G 5/54 |
| 9,421,869 | B1 * | 8/2016 | Ananthanarayanan | |
| | | | | B60L 5/005 |
| 9,436,183 | B2 * | 9/2016 | Thakur | G01C 21/3407 |
| 9,436,926 | B2 * | 9/2016 | Cousins | G05D 1/0246 |
| 9,446,858 | B2 * | 9/2016 | Hess | B64F 3/02 |
| 9,448,559 | B2 * | 9/2016 | Kojo | G01C 21/3685 |
| 9,457,899 | B2 * | 10/2016 | Duffy | B64U 10/16 |
| 9,489,490 | B1 * | 11/2016 | Theobald | G16H 20/13 |
| 9,527,605 | B1 * | 12/2016 | Gentry | G05D 1/0094 |
| 9,535,421 | B1 * | 1/2017 | Canoso | G05D 1/0214 |
| 9,545,852 | B2 * | 1/2017 | Streett | H02J 7/35 |
| 9,551,989 | B2 * | 1/2017 | Scarlatti | G05D 1/00 |
| 9,561,941 | B1 * | 2/2017 | Watts | G05D 1/0268 |
| 9,563,201 | B1 * | 2/2017 | Tofte | H04N 23/90 |
| 9,568,335 | B2 * | 2/2017 | Thakur | G05D 1/0217 |

| | | | | |
|---|---|---|---|---|
| 9,582,950 | B2 * | 2/2017 | Shimizu | G07C 9/28 |
| 9,589,448 | B1 * | 3/2017 | Schneider | F41H 9/10 |
| 9,600,645 | B2 * | 3/2017 | Fadell | H04L 67/12 |
| 9,619,776 | B1 * | 4/2017 | Ford | B64U 80/86 |
| 9,623,562 | B1 * | 4/2017 | Watts | B25J 13/006 |
| 9,643,722 | B1 * | 5/2017 | Myslinski | G05D 1/689 |
| 9,650,136 | B1 * | 5/2017 | Haskin | B64U 10/13 |
| 9,652,912 | B2 * | 5/2017 | Fadell | G06Q 10/08 |
| 9,656,805 | B1 * | 5/2017 | Evans | B64U 80/25 |
| 9,671,791 | B1 * | 6/2017 | Paczan | G08G 5/57 |
| 9,677,564 | B1 * | 6/2017 | Woodworth | B64U 20/30 |
| 9,697,730 | B2 * | 7/2017 | Thakur | G08G 1/0112 |
| 9,718,564 | B1 * | 8/2017 | Beckman | B61L 15/0027 |
| 9,720,414 | B1 * | 8/2017 | Theobald | B25J 5/007 |
| 9,731,821 | B2 * | 8/2017 | Hoareau | G06Q 10/08 |
| 9,733,646 | B1 * | 8/2017 | Nusser | B65G 57/03 |
| 9,746,852 | B1 * | 8/2017 | Watts | G01S 17/86 |
| 9,746,853 | B2 * | 8/2017 | Scheepjens | G05D 1/0212 |
| 9,778,653 | B1 * | 10/2017 | McClintock | G06Q 10/08 |
| 9,783,075 | B2 * | 10/2017 | Henry | B60L 53/36 |
| 9,783,301 | B2 * | 10/2017 | Schliwa | B64D 11/0007 |
| 9,786,187 | B1 * | 10/2017 | Bar-Zeev | G06Q 10/08355 |
| 9,796,529 | B1 * | 10/2017 | Hoareau | G06Q 10/08 |
| 9,815,633 | B1 * | 11/2017 | Kisser | B65G 37/02 |
| 9,828,092 | B1 * | 11/2017 | Navot | B64U 10/14 |
| 9,858,604 | B2 * | 1/2018 | Apsley | G06Q 30/0635 |
| 9,886,035 | B1 * | 2/2018 | Watts | G05D 1/0088 |
| 9,896,204 | B1 * | 2/2018 | Willison | G05D 1/102 |
| 9,957,045 | B1 * | 5/2018 | Daly | B64U 50/19 |
| 9,959,771 | B1 * | 5/2018 | Carlson | G08G 5/57 |
| 9,974,612 | B2 * | 5/2018 | Pinter | A61B 5/741 |
| 10,007,272 | B2 | 6/2018 | Tirpak et al. | |
| 10,022,753 | B2 * | 7/2018 | Chelian | B07C 5/362 |
| 10,048,697 | B1 * | 8/2018 | Theobald | B65G 47/61 |
| 10,079,497 | B2 | 9/2018 | Cheng et al. | |
| 10,099,561 | B1 * | 10/2018 | Ananthanarayanan | |
| | | | | B60L 53/126 |
| 10,099,785 | B1 * | 10/2018 | Gonzalez | B64U 50/31 |
| 10,108,185 | B1 * | 10/2018 | Theobald | G05B 19/4189 |
| 10,112,712 | B1 * | 10/2018 | Gentry | B60L 53/51 |
| 10,137,984 | B1 * | 11/2018 | Flick | G08G 5/80 |
| 10,176,722 | B1 * | 1/2019 | Boyd | G08G 5/57 |
| 10,268,208 | B1 * | 4/2019 | Hopwood Thomas | |
| | | | | G05D 1/0676 |
| 10,287,033 | B2 * | 5/2019 | Hu | B64F 1/02 |
| 10,310,501 | B2 * | 6/2019 | Greenberger | H02J 7/342 |
| 10,434,885 | B2 * | 10/2019 | Antonini | B64C 25/52 |
| 10,467,685 | B1 * | 11/2019 | Brisson | G06Q 10/083 |
| 10,507,938 | B2 | 12/2019 | Raz et al. | |
| 10,526,094 | B2 * | 1/2020 | Cheng | B64U 80/25 |
| 10,558,226 | B1 * | 2/2020 | Bigdeli | G06V 10/22 |
| 10,577,126 | B2 * | 3/2020 | Mozer | B64F 1/02 |
| 10,633,115 | B2 | 4/2020 | Pilskalns | |
| 10,719,080 | B2 * | 7/2020 | Zhang | B64F 5/60 |
| 10,745,102 | B2 * | 8/2020 | Nysæter | B64U 30/20 |
| 10,745,132 | B1 * | 8/2020 | Kimchi | B64U 10/13 |
| 10,780,988 | B2 * | 9/2020 | Buchmueller | B64U 50/19 |
| D903,576 | S * | 12/2020 | Feldman | D12/345 |
| 10,860,115 | B2 * | 12/2020 | Tran | G06F 3/0346 |
| 10,899,436 | B2 * | 1/2021 | Gentry | B64C 25/001 |
| 10,967,970 | B2 * | 4/2021 | Van Niekerk | B64U 20/87 |
| 11,007,290 | B2 * | 5/2021 | Kreitenberg | A61L 2/24 |
| 11,079,752 | B1 * | 8/2021 | Lombardini | B64U 80/60 |
| 11,111,033 | B1 * | 9/2021 | Burks | B64U 50/19 |
| D932,369 | S * | 10/2021 | Passley | D12/16.1 |
| 11,148,805 | B2 * | 10/2021 | Cooper | B64U 70/97 |
| 11,148,808 | B2 * | 10/2021 | Wiggerich | B64U 30/26 |
| 11,164,149 | B1 * | 11/2021 | Williams | G06K 19/06028 |
| 11,180,253 | B1 * | 11/2021 | Seeley | B64U 60/50 |
| 11,235,890 | B1 * | 2/2022 | Dahlstrom | B05B 13/005 |
| 11,292,620 | B1 * | 4/2022 | Molony | B64G 1/1071 |
| 11,370,561 | B2 * | 6/2022 | Ratajczak | B64C 1/061 |
| 11,459,117 | B1 * | 10/2022 | Shapiro | G08G 5/54 |
| 11,534,801 | B2 * | 12/2022 | Volta | B66F 9/063 |
| 11,572,197 | B1 * | 2/2023 | Nevdahs | B64U 50/19 |
| 11,597,515 | B2 * | 3/2023 | Passley | B64F 1/007 |
| 11,597,516 | B1 * | 3/2023 | Klinkmueller | B64U 70/20 |
| 11,603,218 | B2 * | 3/2023 | Fisher | B64F 1/222 |
| 11,603,219 | B2 * | 3/2023 | Ratajczak | B64U 30/20 |

(56) References Cited

U.S. PATENT DOCUMENTS

| | | | | |
|---|---|---|---|---|
| 11,609,581 B2 | | 3/2023 | Carthew et al. | |
| 11,619,952 B2 | * | 4/2023 | Kwon | G05D 1/0808 |
| | | | | 701/3 |
| 11,628,932 B2 | * | 4/2023 | Seung | B64U 60/50 |
| | | | | 244/17.23 |
| 11,636,771 B2 | * | 4/2023 | Barker | B64F 1/222 |
| | | | | 701/16 |
| 11,641,966 B2 | * | 5/2023 | Nakanishi | A47G 29/124 |
| | | | | 232/44 |
| 11,649,050 B1 | * | 5/2023 | Miller | G05D 1/0808 |
| | | | | 701/11 |
| 11,655,049 B1 | | 5/2023 | MontúFar Chávez et al. | |
| 11,667,402 B2 | * | 6/2023 | Liske | B64U 80/25 |
| | | | | 244/116 |
| 11,673,690 B2 | * | 6/2023 | Dayan | B64U 70/97 |
| | | | | 244/114 R |
| 11,710,092 B2 | * | 7/2023 | Dearing | G07C 9/00896 |
| | | | | 705/330 |
| 11,713,136 B2 | * | 8/2023 | Foggia | B64F 1/222 |
| | | | | 244/114 R |
| 11,714,189 B2 | * | 8/2023 | Padmanabhan | G01S 19/51 |
| | | | | 342/22 |
| 11,738,867 B2 | * | 8/2023 | Ehasoo | B60L 53/00 |
| | | | | 244/17.11 |
| 11,741,422 B2 | * | 8/2023 | Gil | B65G 1/0478 |
| | | | | 705/338 |
| 11,748,688 B2 | * | 9/2023 | Ur | B64C 39/024 |
| | | | | 705/332 |
| 11,760,485 B2 | * | 9/2023 | Wabnegger | H02G 1/02 |
| | | | | 244/121 |
| 11,767,129 B2 | * | 9/2023 | Warwick | B64C 39/024 |
| | | | | 244/137.1 |
| 11,772,814 B2 | * | 10/2023 | Dubois | B64U 70/83 |
| | | | | 244/110 E |
| 11,776,136 B1 | * | 10/2023 | Pachikov | B64U 10/13 |
| | | | | 244/17.23 |
| 11,780,606 B2 | * | 10/2023 | Carthew | B64U 70/99 |
| | | | | 244/114 R |
| 11,794,894 B2 | * | 10/2023 | Brock | B64U 30/20 |
| 11,794,922 B1 | * | 10/2023 | Twyford | B64U 80/25 |
| 11,808,580 B1 | * | 11/2023 | Ebrahimi Afrouzi | |
| | | | | G05D 1/0272 |
| 11,814,191 B2 | * | 11/2023 | Cheng | B64F 1/005 |
| 11,814,241 B2 | * | 11/2023 | Tian | B60P 3/11 |
| D1,008,873 S | * | 12/2023 | Lin | D12/16.1 |
| 11,840,152 B2 | * | 12/2023 | Fisher | B64C 29/02 |
| 11,851,162 B1 | * | 12/2023 | Daube | B64C 19/00 |
| 11,851,209 B2 | * | 12/2023 | Fisher | B64F 1/005 |
| 11,858,662 B2 | * | 1/2024 | Gil | B64U 80/10 |
| 11,866,168 B2 | * | 1/2024 | Cooper | B64U 70/97 |
| 11,868,146 B2 | * | 1/2024 | Yasunaga | G05D 1/0094 |
| 11,873,116 B2 | * | 1/2024 | Kozlenko | B64F 1/222 |
| 11,884,422 B2 | * | 1/2024 | Lowe | H05K 7/20145 |
| 11,898,368 B2 | * | 2/2024 | Blake | B60L 53/30 |
| 11,900,823 B2 | * | 2/2024 | Surace | G05D 1/0676 |
| 11,932,315 B2 | * | 3/2024 | Hwang | B64F 1/32 |
| 11,933,613 B2 | * | 3/2024 | Michini | G05D 1/689 |
| 11,939,046 B1 | * | 3/2024 | Berry | B64C 27/08 |
| 11,939,057 B2 | * | 3/2024 | Hamm | B64U 20/70 |
| 11,939,080 B2 | * | 3/2024 | Cowden | B64U 80/30 |
| 11,939,083 B2 | * | 3/2024 | Baklycki | B64F 1/36 |
| 12,017,553 B2 | * | 6/2024 | Lowe | H05K 7/20436 |
| 12,059,089 B1 | * | 8/2024 | Dunn | A47G 29/141 |
| 12,065,273 B2 | | 8/2024 | Kiyokami et al. | |
| 12,084,211 B2 | * | 9/2024 | Li | B64U 70/99 |
| 12,090,359 B1 | * | 9/2024 | Gonzalez | A63B 21/0058 |
| 12,091,194 B2 | * | 9/2024 | Wang | B64F 1/005 |
| 12,099,370 B2 | * | 9/2024 | Jourdan | G05D 1/0676 |
| 12,134,329 B2 | * | 11/2024 | Todeschini | G05D 1/0202 |
| 12,168,533 B1 | * | 12/2024 | Hinman | B64U 70/97 |
| 12,172,777 B2 | * | 12/2024 | Carthew | B64U 70/93 |
| 12,183,940 B2 | * | 12/2024 | Bell | G05D 1/0202 |
| 12,195,213 B2 | * | 1/2025 | Qi | B64U 70/97 |
| 12,195,214 B2 | | 1/2025 | Shi et al. | |
| 12,246,610 B2 | * | 3/2025 | Altenhofen | B64U 70/97 |
| 12,275,318 B2 | * | 4/2025 | Lowe | B64U 70/92 |
| 12,358,662 B2 | | 7/2025 | Roberts | |
| 12,391,414 B2 | | 8/2025 | Qiu et al. | |
| 2001/0045449 A1 | * | 11/2001 | Shannon | G07C 9/21 |
| | | | | 232/19 |
| 2002/0016726 A1 | * | 2/2002 | Ross | G06Q 10/08 |
| | | | | 705/339 |
| 2002/0035450 A1 | * | 3/2002 | Thackston | G05B 19/4099 |
| | | | | 703/1 |
| 2002/0072979 A1 | * | 6/2002 | Sinha | G06Q 10/087 |
| | | | | 705/26.7 |
| 2002/0087375 A1 | * | 7/2002 | Griffin | G06Q 10/0835 |
| | | | | 705/336 |
| 2002/0107751 A1 | * | 8/2002 | Rajagopalan | G06Q 30/0627 |
| | | | | 705/26.7 |
| 2002/0111914 A1 | * | 8/2002 | Terada | G06Q 30/02 |
| | | | | 705/60 |
| 2002/0116289 A1 | * | 8/2002 | Yang | G06Q 10/08 |
| | | | | 705/26.81 |
| 2002/0123930 A1 | * | 9/2002 | Boyd | G06Q 30/0254 |
| | | | | 705/14.1 |
| 2002/0156645 A1 | * | 10/2002 | Hansen | G07F 17/13 |
| | | | | 705/26.1 |
| 2003/0040980 A1 | * | 2/2003 | Nakajima | G07F 17/13 |
| | | | | 705/26.8 |
| 2003/0072031 A1 | * | 4/2003 | Kuwata | H04N 1/00188 |
| | | | | 358/1.15 |
| 2003/0121968 A1 | * | 7/2003 | Miller | G07F 17/13 |
| | | | | 235/375 |
| 2003/0141411 A1 | * | 7/2003 | Pandya | G06Q 10/02 |
| | | | | 244/114 R |
| 2004/0002898 A1 | * | 1/2004 | Kuhlmann | G06Q 30/0635 |
| | | | | 705/26.81 |
| 2004/0068416 A1 | * | 4/2004 | Solomon | G05D 1/0088 |
| | | | | 446/454 |
| 2004/0112660 A1 | * | 6/2004 | Johansson | B63B 27/19 |
| | | | | 180/167 |
| 2004/0160335 A1 | * | 8/2004 | Reitmeier | A47J 31/4407 |
| | | | | 340/4.12 |
| 2004/0162638 A1 | * | 8/2004 | Solomon | G05D 1/0088 |
| | | | | 700/247 |
| 2004/0256519 A1 | * | 12/2004 | Ellis | B64F 1/125 |
| | | | | 244/110 E |
| 2004/0257199 A1 | * | 12/2004 | Fitzgibbon | G07C 9/00182 |
| | | | | 340/5.71 |
| 2005/0061910 A1 | * | 3/2005 | Wobben | B64C 29/00 |
| | | | | 244/17.23 |
| 2005/0068178 A1 | * | 3/2005 | Lee | G06Q 30/06 |
| | | | | 700/214 |
| 2005/0093865 A1 | * | 5/2005 | Jia | H04N 1/38 |
| | | | | 345/426 |
| 2005/0102240 A1 | * | 5/2005 | Misra | G06Q 30/06 |
| | | | | 705/59 |
| 2005/0178894 A1 | * | 8/2005 | McGeer | B64U 70/70 |
| | | | | 244/63 |
| 2005/0244060 A1 | * | 11/2005 | Nagarajan | H04N 1/41 |
| | | | | 382/302 |
| 2005/0285934 A1 | * | 12/2005 | Carter | H04N 7/147 |
| | | | | 348/14.06 |
| 2006/0038067 A1 | * | 2/2006 | Dennis | B64F 1/06 |
| | | | | 244/63 |
| 2006/0053534 A1 | * | 3/2006 | Mullen | F41H 7/005 |
| | | | | 2/456 |
| 2006/0118162 A1 | * | 6/2006 | Saelzer | H02J 3/38 |
| | | | | 136/246 |
| 2006/0136237 A1 | * | 6/2006 | Spiegel | G06Q 10/0835 |
| | | | | 705/13 |
| 2006/0249622 A1 | * | 11/2006 | Steele | B64U 80/20 |
| | | | | 244/115 |
| 2006/0287829 A1 | * | 12/2006 | Pashko-Paschenko | |
| | | | | G08G 5/723 |
| | | | | 340/436 |
| 2007/0016496 A1 | * | 1/2007 | Bar | G06Q 10/087 |
| | | | | 705/28 |

(56) References Cited

U.S. PATENT DOCUMENTS

| | | | |
|---|---|---|---|
| 2007/0073552 A1* | 3/2007 | Hileman | G06Q 10/08 705/333 |
| 2007/0102565 A1* | 5/2007 | Speer | B64U 10/20 244/2 |
| 2007/0150375 A1* | 6/2007 | Yang | G06Q 10/08 705/26.81 |
| 2007/0170237 A1* | 7/2007 | Neff | A47G 29/122 232/36 |
| 2007/0176432 A1* | 8/2007 | Rolt | F03D 9/255 290/55 |
| 2007/0210953 A1* | 9/2007 | Abraham | G08G 5/57 342/36 |
| 2007/0233337 A1* | 10/2007 | Plishner | G05D 1/0295 701/23 |
| 2007/0244763 A1* | 10/2007 | Williams | G06Q 10/10 705/26.1 |
| 2007/0246601 A1* | 10/2007 | Layton | B64C 39/10 244/12.2 |
| 2007/0262195 A1* | 11/2007 | Bulaga | B64U 10/20 244/12.4 |
| 2007/0293978 A1* | 12/2007 | Wurman | G05B 19/4189 700/213 |
| 2008/0012697 A1* | 1/2008 | Smith | B60K 35/50 340/439 |
| 2008/0027591 A1* | 1/2008 | Lenser | G05D 1/0038 701/28 |
| 2008/0100258 A1* | 5/2008 | Ward | H01M 10/465 320/101 |
| 2008/0109246 A1* | 5/2008 | Russell | G06Q 10/04 414/800 |
| 2008/0111816 A1* | 5/2008 | Abraham | G06Q 30/06 345/420 |
| 2008/0141921 A1* | 6/2008 | Hinderks | F01L 3/22 114/274 |
| 2008/0150679 A1* | 6/2008 | Bloomfield | B60R 25/24 340/5.72 |
| 2008/0154659 A1* | 6/2008 | Bettes | G06Q 10/08 705/7.36 |
| 2008/0167817 A1* | 7/2008 | Hessler | G01C 21/005 701/514 |
| 2008/0184906 A1* | 8/2008 | Kejha | B64D 27/33 102/374 |
| 2008/0189012 A1* | 8/2008 | Kaufmann | B62D 15/025 701/41 |
| 2008/0217486 A1* | 9/2008 | Colten | B64U 10/25 244/45 R |
| 2008/0301009 A1* | 12/2008 | Plaster | G06Q 10/087 705/28 |
| 2009/0027253 A1* | 1/2009 | van Tooren | G08G 5/59 342/29 |
| 2009/0057486 A1* | 3/2009 | Becht, IV | B64F 1/007 244/114 R |
| 2009/0062974 A1* | 3/2009 | Tamamoto | G05D 1/0295 701/25 |
| 2009/0063166 A1* | 3/2009 | Palmer | B65D 19/42 211/133.4 |
| 2009/0079388 A1* | 3/2009 | Reddy | G06Q 40/12 320/109 |
| 2009/0086275 A1* | 4/2009 | Liang | G06V 10/25 358/3.21 |
| 2009/0091435 A1* | 4/2009 | Bolourchi | B60K 28/066 340/575 |
| 2009/0106124 A1* | 4/2009 | Yang | G06Q 30/0601 705/26.1 |
| 2009/0149985 A1* | 6/2009 | Chirnomas | G07F 11/26 705/26.1 |
| 2009/0164379 A1* | 6/2009 | Jung | G06Q 10/06 705/310 |
| 2009/0165127 A1* | 6/2009 | Jung | G06Q 10/06 726/21 |
| 2009/0216394 A1* | 8/2009 | Heppe | B64U 20/87 701/16 |
| 2009/0236470 A1* | 9/2009 | Goossen | B64U 70/80 244/115 |
| 2009/0254457 A1* | 10/2009 | Folsom | G06Q 30/0601 705/26.1 |
| 2009/0254482 A1* | 10/2009 | Vadlamani | G06F 21/10 705/59 |
| 2009/0299903 A1* | 12/2009 | Hung | G06Q 20/40 235/462.1 |
| 2009/0303507 A1* | 12/2009 | Abeloe | B33Y 30/00 358/1.9 |
| 2009/0314883 A1* | 12/2009 | Arlton | B64U 80/40 244/63 |
| 2010/0007479 A1* | 1/2010 | Smith | B60W 50/14 340/576 |
| 2010/0030608 A1* | 2/2010 | Kaminsky | G06Q 10/10 707/E17.014 |
| 2010/0031351 A1* | 2/2010 | Jung | G06F 21/10 700/98 |
| 2010/0038480 A1* | 2/2010 | Wu | B64F 1/26 244/114 B |
| 2010/0088163 A1* | 4/2010 | Davidson | G06Q 10/08 340/425.5 |
| 2010/0088175 A1* | 4/2010 | Lundquist | G06Q 30/0234 705/26.1 |
| 2010/0100269 A1* | 4/2010 | Ekhaguere | G08G 5/74 701/26 |
| 2010/0169185 A1* | 7/2010 | Cottingham | G06F 3/01 715/708 |
| 2010/0170993 A1* | 7/2010 | Misegades | B64C 7/00 244/130 |
| 2010/0206145 A1* | 8/2010 | Tetelbaum | B27G 19/02 83/13 |
| 2010/0287065 A1* | 11/2010 | Alivandi | G06Q 30/02 705/26.1 |
| 2010/0299067 A1* | 11/2010 | McCollough | G08G 5/51 701/301 |
| 2010/0299222 A1* | 11/2010 | Hamilton, IV | G06Q 20/12 705/26.1 |
| 2010/0320313 A1* | 12/2010 | Hanafin | B64F 1/125 244/114 R |
| 2011/0035149 A1* | 2/2011 | McAndrew | G05D 1/0077 701/466 |
| 2011/0068224 A1* | 3/2011 | Kang | B64U 80/25 244/116 |
| 2011/0074570 A1* | 3/2011 | Feldstein | G08B 13/196 348/E7.087 |
| 2011/0087350 A1* | 4/2011 | Fogel | G06T 19/00 700/98 |
| 2011/0112761 A1* | 5/2011 | Hurley | G06Q 10/08 701/465 |
| 2011/0153052 A1* | 6/2011 | Pettibone | G06F 30/13 700/98 |
| 2011/0166707 A1* | 7/2011 | Romanov | G01S 5/16 700/255 |
| 2011/0174925 A1* | 7/2011 | Ying | B64F 1/005 701/16 |
| 2011/0178711 A1* | 7/2011 | Christoph | G01S 7/51 701/301 |
| 2011/0210866 A1* | 9/2011 | David | G08G 1/166 340/901 |
| 2011/0227435 A1* | 9/2011 | Maeda | B60L 50/16 310/77 |
| 2011/0246331 A1* | 10/2011 | Luther | G06Q 30/0627 705/26.63 |
| 2011/0253831 A1* | 10/2011 | Cheng | A63H 27/12 244/17.11 |
| 2011/0264311 A1* | 10/2011 | Lee | H04N 7/183 348/E7.085 |
| 2011/0282476 A1* | 11/2011 | Hegemier | G06Q 30/0621 705/26.5 |
| 2011/0301787 A1* | 12/2011 | Chaperon | A63H 27/12 701/2 |
| 2011/0313878 A1* | 12/2011 | Norman | G06F 30/12 705/26.5 |
| 2012/0039694 A1* | 2/2012 | Suzanne | E04H 5/02 414/339 |

(56)     References Cited

U.S. PATENT DOCUMENTS

| | | | | | |
|---|---|---|---|---|---|
| 2012/0078592 | A1* | 3/2012 | Sims, Jr. | G06F 30/00 | 703/1 |
| 2012/0080556 | A1* | 4/2012 | Root, Jr. | B64F 1/06 | 73/170.28 |
| 2012/0091260 | A1* | 4/2012 | Callou | G05D 1/0858 | 244/17.13 |
| 2012/0109419 | A1* | 5/2012 | Mercado | G07C 9/00182 | 701/2 |
| 2012/0219397 | A1* | 8/2012 | Baker | B65G 1/1373 | 414/796 |
| 2012/0221438 | A1* | 8/2012 | Cook, Jr. | G06Q 30/0641 | 705/26.61 |
| 2012/0227389 | A1* | 9/2012 | Hinderks | F02B 75/002 | 60/317 |
| 2012/0229325 | A1* | 9/2012 | Dutruc | G01S 7/03 | 342/29 |
| 2012/0234969 | A1* | 9/2012 | Savoye | B64U 10/13 | 244/17.11 |
| 2012/0235606 | A1* | 9/2012 | Takeuchi | H02K 7/116 | 318/371 |
| 2012/0323365 | A1* | 12/2012 | Taylor | G05D 1/0225 | 901/1 |
| 2013/0006739 | A1* | 1/2013 | Horvitz | G06Q 30/0222 | 705/14.23 |
| 2013/0073477 | A1* | 3/2013 | Grinberg | G06Q 30/00 | 705/332 |
| 2013/0081245 | A1* | 4/2013 | Vavrina | B60L 53/51 | 29/281.1 |
| 2013/0093582 | A1* | 4/2013 | Walsh | G08G 1/166 | 340/436 |
| 2013/0126611 | A1* | 5/2013 | Kangas | G06K 7/10178 | 235/385 |
| 2013/0148123 | A1* | 6/2013 | Hayashi | G03F 9/7046 | 356/401 |
| 2013/0193269 | A1* | 8/2013 | Zwaan | B64U 20/87 | 244/118.1 |
| 2013/0206915 | A1* | 8/2013 | Desaulniers | B64U 10/20 | 244/165 |
| 2013/0218446 | A1* | 8/2013 | Bradley | G06Q 10/00 | 701/123 |
| 2013/0218799 | A1* | 8/2013 | Lehmann | G06Q 10/063 | 705/337 |
| 2013/0233964 | A1* | 9/2013 | Woodworth | B64U 10/60 | 244/175 |
| 2013/0261792 | A1* | 10/2013 | Gupta | G05B 15/02 | 700/232 |
| 2013/0262252 | A1* | 10/2013 | Lakshman | G06Q 30/06 | 705/26.1 |
| 2013/0262276 | A1* | 10/2013 | Wan | G06Q 10/00 | 705/28 |
| 2013/0262336 | A1* | 10/2013 | Wan | G06Q 10/087 | 705/339 |
| 2013/0264381 | A1* | 10/2013 | Kim | G07F 17/13 | 232/24 |
| 2013/0320133 | A1* | 12/2013 | Ratti | B64C 33/025 | 244/22 |
| 2013/0324164 | A1* | 12/2013 | Vulcano | H04W 4/02 | 455/457 |
| 2013/0332062 | A1* | 12/2013 | Kreitmair-Steck | G08G 5/80 | 701/301 |
| 2013/0344778 | A1* | 12/2013 | Schafer | B24B 41/02 | 451/294 |
| 2014/0010656 | A1* | 1/2014 | Nies | F03D 7/0244 | 29/889 |
| 2014/0025230 | A1* | 1/2014 | Levien | A63H 27/12 | 701/2 |
| 2014/0030444 | A1* | 1/2014 | Swaminathan | C23C 16/48 | 427/569 |
| 2014/0031964 | A1* | 1/2014 | Sidhu | G05B 19/41865 | 700/99 |
| 2014/0032034 | A1* | 1/2014 | Raptopoulos | G08G 5/55 | 701/25 |
| 2014/0040065 | A1* | 2/2014 | DuBois | G06Q 30/0621 | 705/26.5 |
| 2014/0052661 | A1* | 2/2014 | Shakes | G06Q 10/0836 | 705/339 |
| 2014/0058959 | A1* | 2/2014 | Isbjornssund | G06Q 50/184 | 705/310 |
| 2014/0081445 | A1* | 3/2014 | Villamar | G06Q 10/087 | 701/19 |
| 2014/0089073 | A1* | 3/2014 | Jacobs | G06Q 20/326 | 705/16 |
| 2014/0124621 | A1* | 5/2014 | Godzdanker | B64F 1/125 | 244/110 E |
| 2014/0136282 | A1* | 5/2014 | Fedele | G06Q 10/06 | 705/7.31 |
| 2014/0136414 | A1* | 5/2014 | Abhyanker | G06Q 20/3224 | 701/25 |
| 2014/0149244 | A1* | 5/2014 | Abhyanker | G06Q 30/0605 | 705/26.2 |
| 2014/0156053 | A1* | 6/2014 | Mahdavi | B29C 64/112 | 700/119 |
| 2014/0180914 | A1* | 6/2014 | Abhyanker | G06Q 10/0832 | 705/332 |
| 2014/0200697 | A1* | 7/2014 | Cheng | G06Q 30/06 | 700/98 |
| 2014/0214684 | A1* | 7/2014 | Pell | G06Q 30/02 | 705/57 |
| 2014/0244433 | A1* | 8/2014 | Cruz | G06T 7/001 | 705/26.8 |
| 2014/0254896 | A1* | 9/2014 | Zhou | G06Q 20/3829 | 705/16 |
| 2014/0257595 | A1* | 9/2014 | Tillmann | B64U 10/14 | 701/2 |
| 2014/0271200 | A1* | 9/2014 | Sutton | B64C 27/33 | 29/889 |
| 2014/0283104 | A1* | 9/2014 | Nilsson | H04N 1/32117 | 726/26 |
| 2014/0309813 | A1* | 10/2014 | Ricci | G06V 20/59 | 701/1 |
| 2014/0319272 | A1* | 10/2014 | Casado | B60L 58/10 | 244/110 E |
| 2014/0325218 | A1* | 10/2014 | Shimizu | H04L 12/10 | 713/168 |
| 2014/0330456 | A1* | 11/2014 | Lopez Morales | G06Q 10/087 | 701/3 |
| 2015/0006005 | A1* | 1/2015 | Yu | G05D 1/667 | 701/22 |
| 2015/0066178 | A1* | 3/2015 | Stava | B22F 10/47 | 700/98 |
| 2015/0069968 | A1* | 3/2015 | Pounds | B60L 53/35 | 320/109 |
| 2015/0097530 | A1* | 4/2015 | Scarlatti | H02J 7/00 | 320/109 |
| 2015/0098819 | A1* | 4/2015 | Tourin | G01M 5/0091 | 416/61 |
| 2015/0102154 | A1* | 4/2015 | Duncan | G05D 1/0094 | 701/300 |
| 2015/0112837 | A1* | 4/2015 | O'Dea | G06Q 20/24 | 705/26.41 |
| 2015/0112885 | A1* | 4/2015 | Fadell | G08B 29/185 | 705/330 |
| 2015/0120094 | A1* | 4/2015 | Kimchi | G08G 5/55 | 701/3 |
| 2015/0120602 | A1* | 4/2015 | Huffman | G06Q 10/083 | 700/214 |
| 2015/0123462 | A1* | 5/2015 | Kamradt | B67D 7/02 | 141/192 |
| 2015/0127712 | A1* | 5/2015 | Fadell | H04L 12/2807 | 709/202 |
| 2015/0129716 | A1* | 5/2015 | Yoffe | B64F 1/029 | 244/110 C |
| 2015/0158599 | A1* | 6/2015 | Sisko | B64F 1/20 | 244/114 R |
| 2015/0175276 | A1* | 6/2015 | Koster | A47G 29/14 | 244/114 R |
| 2015/0183528 | A1* | 7/2015 | Walsh | B64C 39/024 | 244/114 R |

(56) References Cited

U.S. PATENT DOCUMENTS

| | | | | |
|---|---|---|---|---|
| 2015/0185034 A1* | 7/2015 | Abhyanker | G05D 1/0088 | |
| | | | 701/23 | |
| 2015/0191255 A1* | 7/2015 | Zolich | B64F 1/16 | |
| | | | 340/946 | |
| 2015/0202770 A1* | 7/2015 | Patron | G06Q 50/01 | |
| | | | 901/50 | |
| 2015/0227882 A1* | 8/2015 | Bhatt | G06Q 10/083 | |
| | | | 705/330 | |
| 2015/0246727 A1* | 9/2015 | Masticola | G08B 29/145 | |
| | | | 701/2 | |
| 2015/0253777 A1* | 9/2015 | Binney | G05D 1/0214 | |
| | | | 701/28 | |
| 2015/0254611 A1* | 9/2015 | Perez | G06Q 10/08355 | |
| | | | 705/5 | |
| 2015/0259078 A1* | 9/2015 | Filipovic | G08B 13/1965 | |
| | | | 244/114 R | |
| 2015/0286216 A1* | 10/2015 | Miwa | G05D 1/0808 | |
| | | | 701/4 | |
| 2015/0314881 A1* | 11/2015 | Tsaliah | B64D 17/725 | |
| | | | 244/146 | |
| 2015/0317597 A1* | 11/2015 | Shucker | G06Q 10/0833 | |
| | | | 235/375 | |
| 2015/0332206 A1* | 11/2015 | Trew | G06Q 10/083 | |
| | | | 705/330 | |
| 2015/0336669 A1* | 11/2015 | Kantor | G01C 21/343 | |
| | | | 701/3 | |
| 2015/0336670 A1* | 11/2015 | Zhang | B29C 43/18 | |
| | | | 244/119 | |
| 2015/0336677 A1* | 11/2015 | Smaoui | H01R 24/38 | |
| | | | 320/109 | |
| 2015/0363843 A1* | 12/2015 | Loppatto | G06Q 30/0283 | |
| | | | 705/330 | |
| 2015/0367850 A1* | 12/2015 | Clarke | H04N 23/90 | |
| | | | 701/28 | |
| 2015/0370251 A1* | 12/2015 | Siegel | B64D 1/22 | |
| | | | 701/2 | |
| 2016/0001877 A1* | 1/2016 | Paulos | B64U 30/29 | |
| | | | 701/3 | |
| 2016/0001883 A1* | 1/2016 | Sanz | B64U 10/13 | |
| | | | 244/17.23 | |
| 2016/0003637 A1* | 1/2016 | Andersen | G01C 21/362 | |
| | | | 701/519 | |
| 2016/0009413 A1* | 1/2016 | Lee | G08G 5/57 | |
| | | | 701/16 | |
| 2016/0011592 A1* | 1/2016 | Zhang | B64U 70/97 | |
| | | | 244/114 R | |
| 2016/0019495 A1* | 1/2016 | Kolchin | G06Q 10/0833 | |
| | | | 705/333 | |
| 2016/0023761 A1* | 1/2016 | McNally | G05D 1/0094 | |
| | | | 701/3 | |
| 2016/0033966 A1* | 2/2016 | Farris | G01C 21/20 | |
| | | | 701/16 | |
| 2016/0039541 A1* | 2/2016 | Beardsley | G05D 1/0011 | |
| | | | 701/2 | |
| 2016/0051110 A1* | 2/2016 | Cao | A47L 9/009 | |
| | | | 15/324 | |
| 2016/0058181 A1* | 3/2016 | Han | H04N 23/661 | |
| | | | 312/236 | |
| 2016/0068264 A1* | 3/2016 | Ganesh | G08G 5/55 | |
| | | | 701/4 | |
| 2016/0068265 A1* | 3/2016 | Hoareau | G06Q 10/08 | |
| | | | 701/3 | |
| 2016/0068267 A1* | 3/2016 | Liu | G05D 1/042 | |
| | | | 701/4 | |
| 2016/0070265 A1* | 3/2016 | Liu | B64C 39/024 | |
| | | | 701/25 | |
| 2016/0085238 A1* | 3/2016 | Hayes | G08G 5/22 | |
| | | | 701/4 | |
| 2016/0101856 A1* | 4/2016 | Kohstall | G05D 1/0669 | |
| | | | 244/17.23 | |
| 2016/0104099 A1* | 4/2016 | Villamar | G06Q 10/08 | |
| | | | 705/26.81 | |
| 2016/0104113 A1* | 4/2016 | Gorlin | G06Q 10/08355 | |
| | | | 705/338 | |
| 2016/0107750 A1* | 4/2016 | Yates | B64U 10/25 | |
| | | | 244/2 | |
| 2016/0114488 A1* | 4/2016 | Mascorro Medina | | |
| | | | B25J 9/1697 | |
| | | | 901/1 | |
| 2016/0117931 A1* | 4/2016 | Chan | G08G 5/56 | |
| | | | 701/120 | |
| 2016/0125746 A1* | 5/2016 | Kunzi | G08G 5/55 | |
| | | | 701/11 | |
| 2016/0129592 A1* | 5/2016 | Saboo | B25J 5/007 | |
| | | | 700/248 | |
| 2016/0130000 A1* | 5/2016 | Rimanelli | B64U 20/50 | |
| | | | 244/2 | |
| 2016/0130015 A1* | 5/2016 | Caubel | B64C 27/001 | |
| | | | 244/120 | |
| 2016/0131025 A1* | 5/2016 | Pekrul | F02B 53/10 | |
| | | | 123/205 | |
| 2016/0132059 A1* | 5/2016 | Mason | B65G 1/1373 | |
| | | | 701/28 | |
| 2016/0144734 A1* | 5/2016 | Wang | B64C 29/0016 | |
| | | | 701/17 | |
| 2016/0144982 A1* | 5/2016 | Sugumaran | B64C 25/32 | |
| | | | 244/108 | |
| 2016/0180618 A1* | 6/2016 | Ho | G07C 9/00563 | |
| | | | 340/5.52 | |
| 2016/0185466 A1* | 6/2016 | Dreano, Jr. | G06Q 10/083 | |
| | | | 705/26.81 | |
| 2016/0194959 A1* | 7/2016 | Pekrul | F01C 19/06 | |
| | | | 418/146 | |
| 2016/0196755 A1* | 7/2016 | Navot | G05D 1/0088 | |
| | | | 701/4 | |
| 2016/0196756 A1* | 7/2016 | Prakash | B64U 80/25 | |
| | | | 701/3 | |
| 2016/0200438 A1* | 7/2016 | Bokeno | B64C 39/024 | |
| | | | 244/2 | |
| 2016/0207627 A1* | 7/2016 | Hoareau | B64D 1/02 | |
| 2016/0214717 A1* | 7/2016 | De Silva | B64D 5/00 | |
| 2016/0214728 A1* | 7/2016 | Rossi | B64U 30/291 | |
| 2016/0221671 A1* | 8/2016 | Fisher | B64U 30/26 | |
| 2016/0229299 A1* | 8/2016 | Streett | B64F 1/222 | |
| 2016/0229530 A1* | 8/2016 | Welsh | B64U 30/24 | |
| 2016/0235236 A1* | 8/2016 | Byers | A47G 29/14 | |
| 2016/0239789 A1* | 8/2016 | Hanks | G06Q 30/04 | |
| 2016/0239803 A1* | 8/2016 | Borley | G06Q 10/08355 | |
| 2016/0244162 A1* | 8/2016 | Weller | B64U 10/13 | |
| 2016/0244187 A1* | 8/2016 | Byers | A47G 29/14 | |
| 2016/0257401 A1* | 9/2016 | Buchmueller | G01C 21/343 | |
| 2016/0257423 A1* | 9/2016 | Martin | A47G 29/14 | |
| 2016/0257424 A1* | 9/2016 | Stabler | A63H 27/12 | |
| 2016/0257426 A1* | 9/2016 | Mozer | B64U 70/30 | |
| 2016/0258775 A1* | 9/2016 | Santilli | G06Q 10/0833 | |
| 2016/0266578 A1* | 9/2016 | Douglas | G05D 1/0282 | |
| 2016/0272317 A1* | 9/2016 | Cho | G08G 1/162 | |
| 2016/0280371 A1* | 9/2016 | Canavor | H04W 4/029 | |
| 2016/0282126 A1* | 9/2016 | Watts | G06Q 10/08 | |
| 2016/0286128 A1* | 9/2016 | Zhou | H04N 23/698 | |
| 2016/0291445 A1* | 10/2016 | Fisher, Sr. | F16M 11/10 | |
| 2016/0299233 A1* | 10/2016 | Levien | G08G 5/53 | |
| 2016/0304198 A1* | 10/2016 | Jourdan | G08G 5/57 | |
| 2016/0304217 A1* | 10/2016 | Fisher | B64F 1/222 | |
| 2016/0307448 A1* | 10/2016 | Salnikov | A01C 21/00 | |
| 2016/0311329 A1* | 10/2016 | Rodriguez | B60L 58/18 | |
| 2016/0321503 A1* | 11/2016 | Zhou | B64U 50/38 | |
| 2016/0334229 A1* | 11/2016 | Ross | G08B 25/00 | |
| 2016/0340006 A1* | 11/2016 | Tang | B63C 9/01 | |
| 2016/0340021 A1* | 11/2016 | Zhang | B64C 27/006 | |
| 2016/0355261 A1* | 12/2016 | Chin | B64U 70/20 | |
| 2016/0364660 A1* | 12/2016 | Brown | G01C 21/20 | |
| 2016/0364679 A1* | 12/2016 | Cao | G06Q 10/083 | |
| 2016/0364823 A1* | 12/2016 | Cao | G01C 21/3438 | |
| 2016/0364989 A1* | 12/2016 | Speasl | G08G 5/57 | |
| 2016/0371984 A1* | 12/2016 | Macfarlane | G05D 1/106 | |
| 2016/0378108 A1* | 12/2016 | Paczan | G06Q 10/083 | |
| | | | 705/330 | |
| 2017/0011333 A1* | 1/2017 | Greiner | G06K 7/10722 | |

(56) References Cited

U.S. PATENT DOCUMENTS

| | | | |
|---|---|---|---|
| 2017/0011340 A1* | 1/2017 | Gabbai | G05D 1/667 |
| 2017/0015415 A1* | 1/2017 | Chan | G06Q 30/04 |
| 2017/0021923 A1* | 1/2017 | Fisher | B64U 70/97 |
| 2017/0021941 A1* | 1/2017 | Fisher | G05D 1/0011 |
| 2017/0021942 A1* | 1/2017 | Fisher | B64U 70/80 |
| 2017/0023949 A1* | 1/2017 | Fisher | G08G 5/55 |
| 2017/0032315 A1* | 2/2017 | Gupta | G06Q 10/08 |
| 2017/0050749 A1* | 2/2017 | Pilskalns | G05D 1/0676 |
| 2017/0073085 A1* | 3/2017 | Tremblay | B64F 1/007 |
| 2017/0081043 A1* | 3/2017 | Jones | B64C 37/02 |
| 2017/0087999 A1* | 3/2017 | Miller | G01C 21/3679 |
| 2017/0096222 A1* | 4/2017 | Spinelli | B64U 80/25 |
| 2017/0100837 A1* | 4/2017 | Zevenbergen | G05D 1/0225 |
| 2017/0113352 A1* | 4/2017 | Lutz | B25J 9/1682 |
| 2017/0117676 A1* | 4/2017 | James | B64U 80/70 |
| 2017/0121023 A1* | 5/2017 | High | B64D 9/00 |
| 2017/0129464 A1* | 5/2017 | Wang | H02J 7/0045 |
| 2017/0129603 A1* | 5/2017 | Raptopoulos | B64F 1/22 |
| 2017/0132558 A1* | 5/2017 | Perez | G06Q 10/083 |
| 2017/0137118 A1* | 5/2017 | Gentry | B64D 1/02 |
| 2017/0137150 A1* | 5/2017 | Conyers | B60K 1/02 |
| 2017/0144776 A1* | 5/2017 | Fisher | B64C 39/024 |
| 2017/0147975 A1* | 5/2017 | Natarajan | G06Q 10/0832 |
| 2017/0152060 A1* | 6/2017 | Morisawa | B64U 50/23 |
| 2017/0154347 A1* | 6/2017 | Bateman | G06Q 10/067 |
| 2017/0158352 A1* | 6/2017 | von Flotow | B64F 1/0295 |
| 2017/0158353 A1* | 6/2017 | Schmick | B60L 53/12 |
| 2017/0166327 A1* | 6/2017 | Schmidt | B64F 1/007 |
| 2017/0167881 A1* | 6/2017 | Rander | B60W 60/0016 |
| 2017/0174335 A1* | 6/2017 | Malloy | B64D 35/021 |
| 2017/0190443 A1* | 7/2017 | Fisher | B64F 1/005 |
| 2017/0193442 A1* | 7/2017 | Ekkel | G06Q 10/083 |
| 2017/0199522 A1* | 7/2017 | Li | G07C 5/0866 |
| 2017/0203632 A1* | 7/2017 | Westendarp | B60H 1/00378 |
| 2017/0203857 A1* | 7/2017 | O'Toole | A47G 29/141 |
| 2017/0217323 A1 | 8/2017 | Antonini et al. | |
| 2017/0225782 A1* | 8/2017 | Kohstall | B64U 30/26 |
| 2017/0225783 A1* | 8/2017 | Fisher | B64U 20/87 |
| 2017/0225799 A1* | 8/2017 | Selwyn | B64F 1/005 |
| 2017/0225801 A1* | 8/2017 | Bennett | B64U 70/90 |
| 2017/0225802 A1* | 8/2017 | Lussier | B64U 10/20 |
| 2017/0240062 A1 | 8/2017 | Jaiswal et al. | |
| 2017/0240291 A1* | 8/2017 | Kim | H01M 16/006 |
| 2017/0247120 A1* | 8/2017 | Miller | B64U 80/25 |
| 2017/0253349 A1* | 9/2017 | Wang | B64U 70/97 |
| 2017/0255896 A1* | 9/2017 | Van Dyke | G06Q 10/0835 |
| 2017/0270314 A1* | 9/2017 | Tsybrovskyy | H04W 12/06 |
| 2017/0275025 A1* | 9/2017 | Johnson | B64F 1/12 |
| 2017/0283090 A1* | 10/2017 | Miller | B64U 70/97 |
| 2017/0286905 A1* | 10/2017 | Richardson | G06Q 10/0836 |
| 2017/0300855 A1* | 10/2017 | Lund | B64F 5/10 |
| 2017/0305526 A1* | 10/2017 | Thomassey | B64C 27/26 |
| 2017/0305575 A1* | 10/2017 | Bash | B64F 1/32 |
| 2017/0308850 A1* | 10/2017 | Roush | G01C 21/343 |
| 2017/0316379 A1* | 11/2017 | Lepek | G06Q 10/047 |
| 2017/0316701 A1* | 11/2017 | Gil | G06Q 10/0832 |
| 2017/0323129 A1* | 11/2017 | Davidson | G05D 1/0234 |
| 2017/0327091 A1* | 11/2017 | Capizzo | B60L 53/68 |
| 2017/0330145 A1* | 11/2017 | Studnicka | G07C 9/00896 |
| 2017/0341769 A1* | 11/2017 | Haberbusch | F17C 5/007 |
| 2017/0345245 A1* | 11/2017 | Torresani | H04W 4/80 |
| 2017/0372256 A1* | 12/2017 | Kantor | G08G 5/34 |
| 2018/0024554 A1* | 1/2018 | Brady | G06Q 10/0833 701/23 |
| 2018/0039286 A1* | 2/2018 | Tirpak | G05D 1/042 |
| 2018/0053139 A1* | 2/2018 | Stoman | B64U 10/13 |
| 2018/0056794 A1* | 3/2018 | Kim | B60L 53/126 |
| 2018/0088586 A1* | 3/2018 | Hance | G05D 1/0236 |
| 2018/0092345 A1* | 4/2018 | Okumura | F41G 7/2253 |
| 2018/0092484 A1* | 4/2018 | Lewis | G08G 5/54 |
| 2018/0105020 A1* | 4/2018 | Smith | B60H 1/262 |
| 2018/0105271 A1* | 4/2018 | Wypyszynski | B64U 10/13 |
| 2018/0105289 A1* | 4/2018 | Walsh | G06Q 10/1097 |
| 2018/0118340 A1* | 5/2018 | Russo | B64U 50/37 |
| 2018/0118374 A1* | 5/2018 | Lombardini | B64F 3/02 |
| 2018/0127211 A1* | 5/2018 | Jarvis | G05D 1/0285 |
| 2018/0137454 A1* | 5/2018 | Kulkarni | G05D 1/021 |
| 2018/0194484 A1* | 7/2018 | Livieratos | B64U 10/13 |
| 2018/0196418 A1* | 7/2018 | Meier | G05D 1/0206 |
| 2018/0208070 A1* | 7/2018 | Sanchez | B64U 10/13 |
| 2018/0233055 A1* | 8/2018 | Damnjanovic | G08G 5/57 |
| 2018/0237161 A1* | 8/2018 | Minnick | B64U 50/37 |
| 2018/0245365 A1* | 8/2018 | Wankewycz | B64U 10/13 |
| 2018/0257775 A1* | 9/2018 | Baek | B64U 30/26 |
| 2018/0265196 A1* | 9/2018 | Phillips | B64F 1/20 |
| 2018/0265295 A1* | 9/2018 | Beckman | G08G 5/57 |
| 2018/0265296 A1* | 9/2018 | Beckman | B64U 70/90 |
| 2018/0295327 A1* | 10/2018 | Yearwood | G06V 20/62 |
| 2018/0312276 A1* | 11/2018 | Miller | B64U 10/14 |
| 2018/0319496 A1* | 11/2018 | Zhang | B64U 20/50 |
| 2018/0327091 A1* | 11/2018 | Burks | B64U 50/13 |
| 2018/0354649 A1* | 12/2018 | Ortiz | G08B 13/1436 |
| 2018/0357910 A1* | 12/2018 | Hobbs | G08G 5/54 |
| 2018/0360326 A1* | 12/2018 | Lee | G06F 3/0346 |
| 2018/0364740 A1* | 12/2018 | Collins | G05D 1/0088 |
| 2018/0370618 A1* | 12/2018 | Harris | B64C 25/24 |
| 2018/0370652 A1* | 12/2018 | Vendrame | B64F 1/007 |
| 2019/0002128 A1* | 1/2019 | Raz | B64U 70/99 |
| 2019/0009926 A1* | 1/2019 | Hu | B64U 70/99 |
| 2019/0016476 A1* | 1/2019 | Scherz | H02J 7/00 |
| 2019/0023133 A1* | 1/2019 | Renold | B60L 53/35 |
| 2019/0023416 A1* | 1/2019 | Borko | G06F 3/041 |
| 2019/0028904 A1* | 1/2019 | Carpenter | G08G 5/76 |
| 2019/0047462 A1* | 2/2019 | Vijayaraghavan | B60W 30/00 |
| 2019/0051192 A1* | 2/2019 | Schick | G08G 5/80 |
| 2019/0055018 A1* | 2/2019 | Bei | B64U 70/92 |
| 2019/0100108 A1* | 4/2019 | Davis | B64U 80/84 |
| 2019/0100313 A1* | 4/2019 | Campbell | B64U 10/14 |
| 2019/0100330 A1* | 4/2019 | Cheng | B64U 80/25 |
| 2019/0106224 A1* | 4/2019 | Nishikawa | B64U 50/37 |
| 2019/0108472 A1* | 4/2019 | Sweeney | B64U 70/90 |
| 2019/0135403 A1* | 5/2019 | Perry | B64U 10/25 |
| 2019/0152326 A1* | 5/2019 | Nishikawa | B64U 50/19 |
| 2019/0161190 A1* | 5/2019 | Gil | H04L 67/55 |
| 2019/0172358 A1* | 6/2019 | Zhou | G06V 20/17 |
| 2019/0193952 A1* | 6/2019 | Zevenbergen | B60L 53/12 |
| 2019/0202578 A1 | 7/2019 | Fox et al. | |
| 2019/0217952 A1* | 7/2019 | Zawadzki | B64D 1/02 |
| 2019/0217968 A1* | 7/2019 | Schmidt | B64F 1/007 |
| 2019/0233103 A1* | 8/2019 | High | A47G 29/141 |
| 2019/0233107 A1* | 8/2019 | Tian | B64C 39/12 |
| 2019/0245365 A1* | 8/2019 | Farrahi Moghaddam | B64U 10/14 |
| 2019/0256201 A1* | 8/2019 | Plekhanov | B64U 20/40 |
| 2019/0256202 A1* | 8/2019 | Resnick | B64U 10/13 |
| 2019/0256207 A1* | 8/2019 | Nohmi | G05D 1/0866 |
| 2019/0258910 A1* | 8/2019 | Stoman | G06K 19/06028 |
| 2019/0263519 A1* | 8/2019 | Argus | B64D 31/06 |
| 2019/0270526 A1* | 9/2019 | Hehn | B60L 53/18 |
| 2019/0283871 A1* | 9/2019 | Wieczorek | B64U 10/60 |
| 2019/0291961 A1* | 9/2019 | Urban | G06Q 50/40 |
| 2019/0308724 A1* | 10/2019 | Cooper | B64U 80/25 |
| 2019/0315235 A1* | 10/2019 | Kung | B60L 53/36 |
| 2019/0315463 A1* | 10/2019 | Chen | F24H 15/25 |
| 2019/0337407 A1* | 11/2019 | Wang | B60L 53/31 |
| 2019/0348862 A1* | 11/2019 | Obayashi | B64U 30/21 |
| 2019/0382134 A1* | 12/2019 | Baklycki | B64F 1/36 |
| 2019/0383052 A1* | 12/2019 | Blake | E04H 6/44 |
| 2020/0003529 A1* | 1/2020 | Benezra | B64U 80/70 |
| 2020/0010214 A1* | 1/2020 | Newcomb | B60L 53/51 |
| 2020/0017218 A1* | 1/2020 | Ahmad | B64D 9/00 |
| 2020/0017237 A1* | 1/2020 | Walker | G08G 5/54 |
| 2020/0031466 A1* | 1/2020 | Anderson | B64U 30/26 |
| 2020/0036243 A1* | 1/2020 | Zhao | H02K 1/145 |
| 2020/0044463 A1* | 2/2020 | Kim | B64U 10/14 |
| 2020/0055613 A1* | 2/2020 | Miller | G05D 1/0676 |
| 2020/0062373 A1* | 2/2020 | Liao | B64U 10/16 |
| 2020/0062419 A1* | 2/2020 | Jimenez Hernandez | B64U 50/30 |
| 2020/0094957 A1* | 3/2020 | Sohmshetty | B60P 3/11 |
| 2020/0108930 A1* | 4/2020 | Foley | B64U 80/00 |
| 2020/0113167 A1* | 4/2020 | Bouten | A01C 23/008 |
| 2020/0148322 A1* | 5/2020 | Pekrul | B63H 5/02 |
| 2020/0165008 A1* | 5/2020 | Krauss | G05D 1/0676 |

(56) References Cited

U.S. PATENT DOCUMENTS

| | | | | |
|---|---|---|---|---|
| 2020/0180940 | A1* | 6/2020 | Rainville | B64F 1/28 |
| 2020/0189731 | A1* | 6/2020 | Mistry | B64C 39/022 |
| 2020/0198803 | A1* | 6/2020 | Zhou | B64U 70/30 |
| 2020/0207484 | A1* | 7/2020 | Foggia | B64U 70/90 |
| 2020/0207485 | A1* | 7/2020 | Foggia | B64U 70/90 |
| 2020/0218287 | A1* | 7/2020 | Wang | B64U 50/34 |
| 2020/0218288 | A1* | 7/2020 | Johnson | B64U 30/26 |
| 2020/0225684 | A1* | 7/2020 | Anderson | B64U 70/95 |
| 2020/0239160 | A1* | 7/2020 | Cheng | B64U 70/99 |
| 2020/0247540 | A1* | 8/2020 | Jones | B64D 7/08 |
| 2020/0262583 | A1* | 8/2020 | Ducharme | B64U 70/30 |
| 2020/0272144 | A1* | 8/2020 | Yang | B64U 10/14 |
| 2020/0284883 | A1* | 9/2020 | Ferreira | G01S 7/4815 |
| 2020/0290752 | A1* | 9/2020 | Kolosiuk | B64U 70/95 |
| 2020/0301445 | A1* | 9/2020 | Jourdan | G06K 19/06037 |
| 2020/0309489 | A1* | 10/2020 | Kadavanich | F41J 9/08 |
| 2020/0310465 | A1* | 10/2020 | Carthew | B64U 80/30 |
| 2020/0324898 | A1* | 10/2020 | Youmans | G06V 20/176 |
| 2020/0346736 | A1* | 11/2020 | Krasnoff | B64G 1/413 |
| 2020/0346743 | A1* | 11/2020 | Bernard | B64C 25/18 |
| 2020/0349852 | A1* | 11/2020 | DiCosola | G08G 5/55 |
| 2020/0369384 | A1* | 11/2020 | Kelly | G08G 5/32 |
| 2020/0369408 | A1* | 11/2020 | Dolata | B60L 53/16 |
| 2020/0398999 | A1* | 12/2020 | Ortiz | G07C 9/00563 |
| 2020/0406773 | A1* | 12/2020 | Lacaze | B60L 53/35 |
| 2021/0016696 | A1* | 1/2021 | Kelly | F16B 2/22 |
| 2021/0031947 | A1* | 2/2021 | Wankewycz | B60L 53/51 |
| 2021/0045564 | A1* | 2/2021 | Duckers | E06B 3/483 |
| 2021/0047055 | A1* | 2/2021 | Lee | B64F 1/22 |
| 2021/0053677 | A1* | 2/2021 | Passley | B64U 70/95 |
| 2021/0070468 | A1* | 3/2021 | Svirsky | B64U 80/25 |
| 2021/0074170 | A1* | 3/2021 | Barker | B64F 1/28 |
| 2021/0086913 | A1* | 3/2021 | Friedman | B60L 53/30 |
| 2021/0089055 | A1* | 3/2021 | Tran | G08G 5/55 |
| 2021/0094686 | A1* | 4/2021 | Metzner | G08B 13/1965 |
| 2021/0107682 | A1* | 4/2021 | Kozlenko | B64F 1/222 |
| 2021/0107684 | A1* | 4/2021 | Le Lann | B64F 1/26 |
| 2021/0114729 | A1* | 4/2021 | Ragan | B64D 9/00 |
| 2021/0122495 | A1* | 4/2021 | Rezvani | B64F 1/007 |
| 2021/0125503 | A1* | 4/2021 | Henry | G05D 1/0094 |
| 2021/0127658 | A1* | 5/2021 | Luebke | F16C 11/04 |
| 2021/0197983 | A1* | 7/2021 | Wang | B64U 80/10 |
| 2021/0214068 | A1* | 7/2021 | Bry | B64D 47/08 |
| 2021/0214102 | A1* | 7/2021 | Geng | B64U 70/97 |
| 2021/0224739 | A1 | 7/2021 | Sweeny et al. | |
| 2021/0229805 | A1* | 7/2021 | Getman | B64C 27/52 |
| 2021/0237694 | A1* | 8/2021 | Hirschvogel | B60J 7/16 |
| 2021/0237899 | A1* | 8/2021 | Warwick | B64C 39/024 |
| 2021/0253242 | A1* | 8/2021 | Falk-Petersen | B64U 80/40 |
| 2021/0276735 | A1* | 9/2021 | Raptopoulos | A47G 29/141 |
| 2021/0284335 | A1* | 9/2021 | Mclaughlin | B64U 50/39 |
| 2021/0284356 | A1* | 9/2021 | Jourdan | B64F 1/18 |
| 2021/0300591 | A1* | 9/2021 | Tian | B64F 1/007 |
| 2021/0309388 | A1* | 10/2021 | Ratajczak | B64D 31/00 |
| 2021/0339842 | A1* | 11/2021 | Sauer | B64C 1/061 |
| 2021/0347500 | A1* | 11/2021 | Hagan | B64U 10/13 |
| 2021/0349456 | A1* | 11/2021 | Pham | G05D 1/0676 |
| 2021/0354820 | A1* | 11/2021 | Hiller | B60L 53/12 |
| 2021/0371128 | A1* | 12/2021 | Rodriguez | A47G 29/141 |
| 2021/0394930 | A1* | 12/2021 | O'Toole | A47G 29/141 |
| 2021/0405655 | A1* | 12/2021 | Yi | B64U 70/90 |
| 2022/0009647 | A1* | 1/2022 | Johannesson | B64U 20/96 |
| 2022/0019247 | A1* | 1/2022 | Dayan | G05D 1/104 |
| 2022/0041279 | A1* | 2/2022 | Rowse | G05D 1/104 |
| 2022/0041299 | A1* | 2/2022 | Wankewycz | B64D 37/30 |
| 2022/0055745 | A1* | 2/2022 | Walker | H02G 11/02 |
| 2022/0055770 | A1* | 2/2022 | O'Toole | B65G 69/003 |
| 2022/0063798 | A1* | 3/2022 | Johnson | B64C 37/02 |
| 2022/0073214 | A1* | 3/2022 | Liske | B64F 1/22 |
| 2022/0106125 | A1* | 4/2022 | Ragan | F16G 3/10 |
| 2022/0119103 | A1 | 4/2022 | Braun et al. | |
| 2022/0119105 | A1* | 4/2022 | Schmalzried | B64U 70/95 |
| 2022/0162001 | A1* | 5/2022 | Gherardi | G05D 1/0088 |
| 2022/0163980 | A1* | 5/2022 | Beer | G05D 1/228 |
| 2022/0169400 | A1* | 6/2022 | Seeley | B64C 1/20 |
| 2022/0169401 | A1* | 6/2022 | Di Cosola | B60L 53/51 |
| 2022/0171388 | A1* | 6/2022 | Yanagihashi | B65G 43/00 |
| 2022/0177124 | A1* | 6/2022 | Marshall | B64U 10/20 |
| 2022/0185501 | A1* | 6/2022 | Kempley | B64U 70/70 |
| 2022/0234757 | A1* | 7/2022 | Dayan | B64U 70/97 |
| 2022/0242589 | A1* | 8/2022 | Pham | G09F 27/005 |
| 2022/0247347 | A1 | 8/2022 | Gavrilov | |
| 2022/0289376 | A1* | 9/2022 | Hayakawa | G05D 1/101 |
| 2022/0306320 | A1* | 9/2022 | Howe | B60L 53/00 |
| 2022/0315248 | A1* | 10/2022 | Castellano Aldave | B60L 3/00 |
| 2022/0380063 | A1* | 12/2022 | Shah | B64U 70/92 |
| 2022/0396373 | A1* | 12/2022 | Wang | E05F 15/00 |
| 2023/0017530 | A1* | 1/2023 | Lowe | H01M 10/6556 |
| 2023/0023246 | A1* | 1/2023 | McLaughlin | G05D 1/0088 |
| 2023/0031028 | A1* | 2/2023 | Ehasoo | B64F 1/222 |
| 2023/0044050 | A1* | 2/2023 | Cevacins | B64U 70/97 |
| 2023/0045483 | A1* | 2/2023 | Ahn | G05D 1/689 |
| 2023/0045691 | A1* | 2/2023 | Cevacins | B64U 60/00 |
| 2023/0046127 | A1* | 2/2023 | Guerra Johansson | H04N 7/183 |
| 2023/0063715 | A1* | 3/2023 | Bell | G05D 1/0246 |
| 2023/0065140 | A1* | 3/2023 | Blevins | B64U 20/40 |
| 2023/0074715 | A1* | 3/2023 | Kwon | F04D 25/08 |
| 2023/0088830 | A1* | 3/2023 | Kim | B64U 50/32 244/221 |
| 2023/0096139 | A1* | 3/2023 | Ubaldi | B65G 23/44 198/844.1 |
| 2023/0100169 | A1* | 3/2023 | Laczak | B64F 1/125 232/1 R |
| 2023/0133068 | A1* | 5/2023 | Wiegman | B60L 53/62 320/109 |
| 2023/0140387 | A1* | 5/2023 | Infanti | B64U 60/50 244/114 R |
| 2023/0159192 | A1* | 5/2023 | Gil | B64U 80/40 244/137.1 |
| 2023/0202680 | A1* | 6/2023 | Yehya | B64U 70/30 244/110 E |
| 2023/0202682 | A1* | 6/2023 | Kiyokami | B64U 70/90 244/114 R |
| 2023/0202691 | A1* | 6/2023 | Kiyokami | B64U 70/93 244/114 R |
| 2023/0244249 | A1* | 8/2023 | Smith | G05D 1/2469 701/11 |
| 2023/0298268 | A1* | 9/2023 | Oleynikova | B60W 30/09 |
| 2023/0303272 | A1* | 9/2023 | Passley | B64U 70/00 |
| 2023/0347765 | A1* | 11/2023 | Lowe | B64U 70/92 |
| 2023/0348099 | A1* | 11/2023 | Woo | H05K 7/20154 |
| 2023/0348100 | A1* | 11/2023 | Altenhofen | H05K 7/20145 |
| 2023/0348103 | A1* | 11/2023 | Lowe | H05K 7/20154 |
| 2023/0348104 | A1* | 11/2023 | Lowe | B64U 70/92 |
| 2023/0348105 | A1* | 11/2023 | Grasberger | B60L 53/30 |
| 2023/0348106 | A1* | 11/2023 | Berthelet | B64U 70/97 |
| 2023/0348122 | A1* | 11/2023 | Fehler | B64F 1/32 |
| 2023/0349146 | A1* | 11/2023 | Vasconi | B66B 9/00 |
| 2023/0373626 | A1* | 11/2023 | Kiyokami | B64D 1/22 |
| 2023/0373668 | A1* | 11/2023 | Kozlenko | G05D 1/0055 |
| 2023/0399132 | A1* | 12/2023 | Kiyokami | B64C 39/024 |
| 2024/0002080 | A1* | 1/2024 | Shi | B64F 1/362 |
| 2024/0010368 | A1* | 1/2024 | Liao | B64U 80/10 |
| 2024/0067371 | A1* | 2/2024 | Turner | B64U 50/37 |
| 2024/0076067 | A1* | 3/2024 | Takahashi | B64U 10/60 |
| 2024/0076072 | A1* | 3/2024 | Arii | B64U 70/90 |
| 2024/0101038 | A1* | 3/2024 | Liffring | B60R 9/042 |
| 2024/0101286 | A1* | 3/2024 | Regev | B64U 70/20 |
| 2024/0101287 | A1* | 3/2024 | Takahashi | B64U 80/86 |
| 2024/0109656 | A1* | 4/2024 | Stege | G06Q 10/083 |
| 2024/0132238 | A1* | 4/2024 | Qiu | B64U 70/92 |
| 2024/0140228 | A1* | 5/2024 | Lowe | B60L 53/302 |
| 2024/0140630 | A1* | 5/2024 | Lee | B64U 80/40 |
| 2024/0158112 | A1* | 5/2024 | Le Lann | H01M 50/262 |
| 2024/0176367 | A1* | 5/2024 | Zhou | G08G 5/22 |
| 2024/0190593 | A1* | 6/2024 | Shah | B60L 53/14 |
| 2024/0262545 | A1* | 8/2024 | Fu | H05K 7/20909 |
| 2024/0278946 | A1* | 8/2024 | Roberts | B64U 70/92 |
| 2024/0300677 | A1* | 9/2024 | Sercel | B64G 1/623 |
| 2024/0336378 | A1* | 10/2024 | Neate | B64U 70/50 |
| 2024/0343426 | A1* | 10/2024 | Cornew | B64U 80/25 |
| 2024/0365728 | A1 | 11/2024 | Miller et al. | |
| 2024/0384587 | A1* | 11/2024 | Anderson | B64U 70/90 |

(56) References Cited

U.S. PATENT DOCUMENTS

| | | | |
|---|---|---|---|
| 2024/0391616 A1 * | 11/2024 | Dayan | B64U 70/90 |
| 2024/0425199 A1 * | 12/2024 | Li | G05D 1/042 |
| 2025/0002185 A1 * | 1/2025 | Liu | B64U 80/70 |
| 2025/0026509 A1 * | 1/2025 | Infanti | B64U 70/50 |
| 2025/0074632 A1 * | 3/2025 | DiCosola | G07F 15/006 |
| 2025/0108943 A1 * | 4/2025 | Sekiguchi | B64U 80/20 |
| 2025/0121966 A1 * | 4/2025 | Gronstedt | B64U 80/70 |
| 2025/0128638 A1 * | 4/2025 | Scheler | B60L 53/30 |
| 2025/0145314 A1 * | 5/2025 | Gronstedt | B64F 1/32 |
| 2025/0223061 A1 * | 7/2025 | Merdin | B64U 80/25 |

FOREIGN PATENT DOCUMENTS

| | | | |
|---|---|---|---|
| CN | 206485585 U | 9/2017 | |
| CN | 110494362 A | 11/2019 | |
| EP | 4059841 A1 | 9/2022 | |
| WO | 2014160589 A1 | 10/2014 | |
| WO | 2021230948 A2 | 11/2021 | |
| WO | 2023056516 A1 | 4/2023 | |

* cited by examiner

RECONFIGURABLE LANDING PLATFORMS IN BASE STATIONS FOR USE WITH UNMANNED AERIAL VEHICLES

CROSS-REFERENCE TO RELATED APPLICATION(S)

This application claims the benefit of and priority to U.S. Provisional Patent Application Ser. No. 63/683,496, filed on Aug. 15, 2024, the entire content of which is hereby incorporated by reference.

TECHNICAL FIELD

The present disclosure relates to a base station for an unmanned aerial vehicle (UAV) (e.g., a drone). More specifically, the present disclosure relates to a base station that includes a reconfigurable landing platform that facilitates landing and charging of the UAV and improves the overall docking procedure.

BACKGROUND

Base stations are utilized to service and accommodate UAVs during use and storage. During landing, the UAV is received by a landing surface that is often configured for electrical connection to the UAV in order to charge the UAV. Proper landing thus facilitates not only charging of the UAV but closure of the base station in a manner that avoids damage to the UAV and/or the base station.

In order to improve upon the overall docking procedure, the present disclosure provides a base station with a landing platform that is reconfigurable from a first configuration into a second configuration to reposition (e.g., generally center) the UAV on the landing platform, which generally aligns a power source on the UAV with a charging hub of the base station and inhibits (if not entirely prevents) contact between the UAV and the roof of the base station during closure.

SUMMARY

In one aspect of the present disclosure, a base station for a UAV is disclosed that includes a roof and a base that supports the roof.

The base includes a body and a landing platform that is supported by the body.

The landing platform includes a stage, which defines landing areas that are configured to receive the UAV during docking, and alignment members, which are configured for engagement with the UAV and are repositionable in relation to the stage from an extended position into a retracted position to thereby reposition the UAV on the landing platform and inhibit contact between the UAV and the roof during closure.

In certain embodiments, the platform may be pivotably connected to the body such that the landing platform is repositionable between a closed position and an open position.

In certain embodiments, the landing areas may define depressions that extend vertically into the stage.

In certain embodiments, the depressions may be generally circular in configuration.

In certain embodiments, the depressions may be configured to receive legs of the UAV.

In certain embodiments, the alignment members may be positioned laterally outward of the landing areas in the extended position.

In certain embodiments, the alignment members may include fences that span the landing areas and projections that extend laterally inward from the fences.

In certain embodiments, the projections may be generally centered along the fences.

In certain embodiments, the projections may be generally triangular in configuration.

In certain embodiments, the projections may define bearing surfaces that are configured for engagement with the UAV.

In certain embodiments, the bearing surfaces may subtend an angle therebetween that lies substantially within a range of approximately 90 degrees to approximately 150 degrees whereby the projections urge the UAV outwardly towards a periphery of the landing platform upon contact therewith during repositioning of the alignment members from the extended position into the retracted position.

In another aspect of the present disclosure, a base station for a UAV is disclosed that includes: a body; a charging hub that is supported by the body and which is configured for electrical connection to the UAV to facilitate charging thereof; and a landing platform that is supported by the body. The landing platform includes a stage and alignment members that are configured for engagement with the UAV.

The stage includes depressions that are configured to receive the UAV to thereby inhibit movement of the UAV in relation to the landing platform and a window that is generally aligned with the charging hub.

The alignment members are configured for engagement with the UAV and are repositionable in relation to the stage from an extended position into a retracted position to thereby generally align a power source on the UAV with the charging hub.

In certain embodiments, the landing platform may further include fiducials that are configured to facilitate landing of the UAV.

In certain embodiments, the fiducials may include at least one first fiducial having a first configuration and at least one second fiducial having a second configuration that is different than the first configuration.

In certain embodiments, the at least one first fiducial may be positioned within at least one of the depressions.

In certain embodiments, the at least one second fiducial may be positioned between the depressions.

In certain embodiments, the landing platform may further include at least one light source that is associated with the at least one first fiducial and the at least one second fiducial to facilitate backlighting thereof.

In certain embodiments, the fiducials may further include at least one third fiducial that is devoid of backlighting.

In another aspect of the present disclosure, a base station for a UAV is disclosed that includes a charging hub and a landing platform.

The charging hub is configured for electrical connection to the UAV.

The landing platform is configured to receive the UAV and is reconfigurable from a first configuration into a second configuration to thereby generally align the UAV with the charging hub and facilitate charging of the UAV.

In certain embodiments, the landing platform may include alignment members that are repositionable along an axis that extends in generally orthogonal relation to a landing direction of the UAV during reconfiguration of the landing platform from the first configuration into the second configuration.

In certain embodiments, the alignment members may be movable laterally inward towards each other during reconfiguration of the landing platform from the first configuration into the second configuration.

In another aspect of the present disclosure, a landing platform for a base station is disclosed that is configured to receive a UAV. The landing platform is reconfigurable from a first configuration into a second configuration to thereby reposition the UAV on the landing platform and includes: a stage; alignment members; and a drive mechanism.

The alignment members are configured for engagement with the UAV and are repositionable in relation to the stage from an extended position, which corresponds to the first configuration of the landing platform, into a retracted position, which corresponds to the second configuration of the landing platform.

The drive mechanism is connected to the alignment members to facilitate repositioning from the extended position into the retracted position and includes: a drive member; pulley assemblies that engage the drive member; drive brackets that extend between and connect the drive member and the alignment members such that movement of the drive member causes corresponding movement of the drive brackets and the alignment members; and slide assemblies that support the alignment members.

The slide assemblies include: slide brackets that are connected to the stage; guides that are connected to the slide brackets; and slide members that are movable in relation to the guides and which are connected to the alignment members such that movement of the alignment members causes corresponding movement of the slide members.

In certain embodiments, the pulley assemblies may include: a first pulley assembly, which defines a first axis of rotation; a second pulley assembly, which defines second axes of rotation; third pulley assemblies, which define third axes of rotation; and a fourth pulley assembly, which defines a fourth axis of rotation.

In certain embodiments, the first axis of rotation, the third axes of rotation, and the fourth axis of rotation may be fixed.

In certain embodiments, the second axes of rotation may be movable.

In certain embodiments, the pulley assemblies may include: a first pulley assembly; a second pulley assembly; third pulley assemblies; and a fourth pulley assembly.

The first pulley assembly is connected to the stage and includes a first frame and a first pulley that extends into the first frame. The first pulley engages the drive member such that the drive member extends about the first pulley whereby rotation of the first pulley causes movement of the drive member.

The second pulley is connected to the stage and includes a second frame and second pulleys that are rotatable in relation to the second frame. The second pulleys engage the drive member such that the drive member extends between the second pulleys.

The third pulley assemblies are connected to the stage and each include a third frame and third pulleys that are rotatable in relation to the third frame. The third pulleys engage the drive member such that the drive member extends about the third pulleys.

The fourth pulley assembly is connected to the stage and includes a first bracket and a second bracket.

The first bracket is fixedly connected to the stage, and the second bracket is movably connected to the stage such that the second bracket is axially movable in relation to the first bracket.

The second bracket includes a fourth frame and a fourth pulley that is rotatable in relation to the fourth frame. The fourth pulley engages the drive member such that the drive member extends about the fourth pulley.

In certain embodiments, the second pulleys may be laterally movable in relation to the second frame.

In certain embodiments, the second pulley assembly may further include pulley shafts that are connected to the second pulleys and which extend into slots in the frame.

In certain embodiments, the second pulley assembly may further include a biasing member that extends between the pulley shafts to bias the second pulleys laterally inward and thereby apply a lateral tension to the drive member.

In certain embodiments, the third pulleys may be laterally fixed in relation to the third frame.

In certain embodiments, the fourth pulley assembly may further include an adjustment member that extends between the first bracket and the second bracket, wherein the adjustment member is configured to vary an axial tension in the drive member.

In another aspect of the present disclosure, a reconfigurable landing platform for a base station is disclosed that is configured to receive a UAV. The reconfigurable landing platform includes alignment members and a drive mechanism.

The alignment members are configured for engagement with the UAV and are repositionable from an extended position into a retracted position to thereby reposition the UAV on the reconfigurable landing platform.

The drive mechanism is connected to the alignment members to facilitate repositioning from the extended position into the retracted position. The drive mechanism includes a drive member and pulley assemblies that engage the drive member and which are configured to vary a lateral tension and an axial tension in the drive member.

In certain embodiments, the pulley assemblies may include adjustable pulley assemblies and non-adjustable pulley assemblies.

In certain embodiments, the adjustable pulley assemblies may include a first adjustable pulley assembly that is configured to apply the lateral tension to the drive member and a second adjustable pulley assembly that is configured to apply the axial tension to the drive member.

In certain embodiments, the first adjustable pulley assembly may include: a first frame that defines slots; pulley shafts that extend into the slots; and first pulleys that are connected to the pulley shafts.

In certain embodiments, the first adjustable pulley assembly may further include a biasing member that extends between the pulley shafts to bias the first pulleys laterally inward and thereby vary the lateral tension in the drive member.

In certain embodiments, the second adjustable pulley assembly may include a fixed bracket and a movable bracket that is axially repositionable in relation to the fixed bracket, wherein axial repositioning of the movable bracket in relation to the fixed bracket varies the axial tension in the drive member.

In another aspect of the present disclosure, a reconfigurable landing platform for a base station is disclosed that is configured to receive a UAV. The reconfigurable landing platform includes alignment members and a drive mechanism.

The alignment members are configured for engagement with the UAV and are repositionable from an extended position into a retracted position to thereby reposition the UAV on the reconfigurable landing platform.

The drive mechanism is connected to the alignment members to facilitate repositioning from the extended position into the retracted position. The drive mechanism includes a drive member and drive brackets that extend between and connect the drive member and the alignment members such that movement of the drive member causes corresponding movement of the drive brackets and the alignment members.

In certain embodiments, the drive mechanism may further include slide assemblies that support the alignment members to facilitate repositioning of the alignment members from the extended position into the retracted position.

In certain embodiments, the slide assemblies may include guides and slide members that are movable in relation to the guides. The slide members are connected to the alignment members such that movement of the alignment members causes corresponding movement of the slide members.

In certain embodiments, the slide assemblies may further include guards that are positioned between the slide members and the alignment members. The guards conceal the slide members to thereby protect the slide members from water and/or debris.

In another aspect of the present disclosure, a method of docking a UAV with a base station is disclosed. The method includes landing the UAV on a landing platform of the base station and reconfiguring the landing platform from a first configuration into a second configuration to thereby reposition the UAV on the landing platform.

In certain embodiments, landing the UAV may include receiving the UAV within landing areas defining depressions that extend vertically into the landing platform.

In certain embodiments, reconfiguring the landing platform from the first configuration into the second configuration may include generally centering the UAV on the landing platform.

In certain embodiments, reconfiguring the landing platform from the first configuration into the second configuration may include repositioning alignment members on the landing platform from an extended position into a retracted position.

In certain embodiments, repositioning the alignment members from the extended position into the retracted position may include moving the alignment members laterally inwards towards each other.

In certain embodiments, reconfiguring the landing platform from the first configuration into the second configuration may include causing the alignment members to engage legs of the UAV and urging the UAV towards a periphery of the landing platform.

In certain embodiments, reconfiguring the landing platform from the first configuration into the second configuration may include generally aligning a power source on the UAV with a charging hub of the base station.

In certain embodiments, the method may further include repositioning the charging hub from a first position into a second position.

In certain embodiments, repositioning the charging hub from the first position into the second position may include extending the charging hub through a window in the landing platform.

In certain embodiments, extending the charging hub may include electrically connecting the charging hub to the power source on the UAV to thereby charge the UAV.

In another aspect of the present disclosure, a method of docking a UAV with a base station is disclosed. The method includes: opening a roof of the base station; guiding the UAV via visualization of a fiducial on a landing platform of the base station; landing the UAV on the landing platform; and retracting alignment members on the landing platform into engagement with the UAV to thereby generally center the UAV on the landing platform.

In certain embodiments, retracting the alignment members may include repositioning the alignment members along an axis of movement that extends in generally orthogonal relation to a landing direction of the UAV.

In certain embodiments, the method may further include performing a landing assessment to confirm proper landing of the UAV.

In certain embodiments, performing the landing assessment may include confirming that the UAV is positioned within landing areas on the landing platform.

In certain embodiments, confirming that the UAV is positioned within the landing areas may include detecting the UAV via the at least one fiducial.

In certain embodiments, guiding the UAV may include visualizing a first fiducial that is positioned within at least one of a plurality of landing areas on the landing platform and visualizing a second fiducial that is positioned between the plurality of landing areas.

In certain embodiments, the method may further include backlighting the first fiducial and/or the second fiducial.

In certain embodiments, the method may further include extending the alignment members to thereby disengage the alignment members from the UAV and closing the roof of the base station.

In another aspect of the present disclosure, a method of docking a UAV with a base station is disclosed. The method includes: opening a roof of the base station to expose a landing platform; guiding the UAV via visualization of a fiducial positioned within at least one of a plurality of landing areas that extend vertically into the landing platform; receiving the UAV within the landing areas; generally aligning a power source on the UAV with a charging hub of the base station; repositioning the charging hub from a first position, in which the charging hub is concealed within the landing platform, into a second position, in which the charging hub extends through a window in the landing platform; and electrically connecting the power source on the UAV to the charging hub to thereby charge the UAV.

In certain embodiments, generally aligning the power source on the UAV with the charging hub may include repositioning the UAV on the landing platform.

In certain embodiments, repositioning the UAV on the landing platform may include urging the UAV towards a periphery of the landing platform and generally centering the UAV on the landing platform.

In another aspect of the present disclosure, a landing platform is disclosed for a base station that is configured to receive a UAV. The landing platform includes: a drive member; pulley assemblies that engage the drive member; drive brackets that are connected to the drive member such that movement of the drive member causes corresponding movement of the drive brackets; and alignment members that are connected to the drive brackets such that movement of the drive brackets causes corresponding movement of the alignment members between an extended position and a retracted position, wherein the alignment members are configured to engage the UAV such that movement of the alignment members from the extended position into the retracted position repositions the UAV on the landing platform.

The pulley assemblies include: a first pulley assembly, which defines a first axis of rotation; a second pulley assembly, which defines second axes of rotation; third pulley assemblies, which define third axes of rotation; and a fourth pulley assembly, which defines a fourth axis of rotation.

In certain embodiments, the first axis of rotation, the third axes of rotation, and the fourth axis of rotation may be fixed.

In certain embodiments, the second axes of rotation may be movable.

In certain embodiments, the second pulley assembly may be adjustable to thereby vary a lateral tension in the drive member.

In certain embodiments, the second pulley assembly may include: a frame; pulley shafts that extend into the frame; and pulleys that engage the drive member and which are connected to the pulley shafts such that the pulley shafts and the pulleys are laterally movable in relation to the frame.

In certain embodiments, the second pulley assembly may further include a biasing member that is connected to the pulley shafts to bias the pulley shafts and the pulleys laterally inward to thereby apply the lateral tension to the drive member.

In certain embodiments, the fourth pulley assembly may be adjustable to thereby vary an axial tension in the drive member.

In certain embodiments, the fourth pulley assembly may include a fixed bracket and a movable bracket that engages the drive member, wherein the movable bracket is axially repositionable in relation to the fixed bracket to thereby expand and compress the fourth pulley assembly.

In certain embodiments, the fourth pulley assembly may further include an adjustment member that extends between the fixed bracket and the movable bracket.

In certain embodiments, the adjustment member may threadably engage the movable bracket such that rotation of the adjustment member causes axial repositioning of the movable bracket.

In another aspect of the present disclosure, a landing platform is disclosed for a base station that is configured to receive a UAV. The landing platform includes: a drive member; alignment members that are operatively connected to the drive member such that movement of the drive member causes corresponding movement of the alignment members; and pulley assemblies that support the drive member, wherein the pulley assemblies include adjustable pulley assemblies and non-adjustable pulley assemblies.

In certain embodiments, the adjustable pulley assemblies may include a first adjustable pulley assembly, which is configured to apply a lateral tension to the drive member, and a second adjustable pulley assembly, which is configured to apply an axial tension to the drive member.

In certain embodiments, the first adjustable pulley assembly may include a frame and first pulleys that engage the drive member and which are laterally movable in relation to the frame.

In certain embodiments, the first adjustable pulley assembly may further include a biasing member that is configured to bias the first pulleys laterally inward.

In certain embodiments, the second adjustable pulley assembly may include: a first bracket; a second bracket, which includes a second pulley that engages the drive member; and an adjustment member that extends between the first bracket and the second bracket, wherein rotation of the adjustment member causes axial repositioning of the second bracket to thereby expand and compress the second adjustable pulley assembly.

In another aspect of the present disclosure, a landing platform is disclosed for a base station that is configured to receive a UAV. The landing platform includes: a drive member; alignment members that are operatively connected to the drive member such that movement of the drive member causes extension and retraction of the alignment members to thereby reposition the UAV on the landing platform; a first pulley assembly that is configured to apply a lateral tension to the drive member; and a second pulley assembly that is configured to apply an axial tension to the drive member.

In certain embodiments, the first pulley assembly may include first pulleys that engage the drive member and which are rotatable about movable axes of rotation.

In certain embodiments, the second pulley assembly may include a second pulley that engages the drive member and which is rotatable about a fixed axis of rotation.

In certain embodiments, the first pulley assembly may include a first biasing member that extends in generally orthogonal relation to a length of the drive member.

In certain embodiments, the second pulley assembly may include a second biasing member that extends in generally parallel relation to the length of the drive member.

In another aspect of the present disclosure, a method is disclosed for using a base station that is configured to receive a UAV. The method includes: applying a lateral tension to a drive member that is operatively connected to alignment members on a landing platform of the base station such that movement of the drive member causes corresponding movement of the alignment members to thereby reconfigure the landing platform and reposition the UAV on the landing platform; applying an axial tension to the drive member; and actuating a motor assembly to thereby advance and retract the drive member.

In certain embodiments, applying the lateral tension to the drive member may include applying a lateral force to the drive member via a first pulley assembly.

In certain embodiments, applying the lateral force to the drive member may include applying the lateral force in a direction that is generally orthogonal in relation to a length of the drive member.

In certain embodiments, applying the lateral force to the drive member may include biasing first pulleys towards each other.

In certain embodiments, biasing the first pulleys towards each other may include applying the lateral force to pulley shafts supporting the first pulleys.

In certain embodiments, actuating the motor assembly may include rotating the first pulleys about movable axes of rotation.

In certain embodiments, applying the axial tension to the drive member may include applying an axial force to the drive member via a second pulley assembly, which includes a first bracket and a second bracket.

In certain embodiments, applying the axial force to the drive member may include applying the axial force in a direction that is generally parallel in relation to a length of the drive member.

In certain embodiments, applying the axial force to the drive member may include moving the second bracket axially in relation to the first bracket.

In certain embodiments, moving the second bracket axially in relation to the first bracket may include rotating an adjustment member that extends between the first bracket and the second bracket.

In another aspect of the present disclosure, a method is disclosed for using a base station that is configured to receive a UAV. The method includes: applying a lateral tension to a drive member that extends internally within the base station; applying an axial tension to the drive member; and moving the drive member to reposition alignment members that are operatively connected thereto to thereby reposition the UAV on a landing platform of the base station.

In certain embodiments, applying the lateral tension to the drive member may include biasing first pulleys into engagement with the drive member.

In certain embodiments, biasing the first pulleys into engagement with the drive member may include applying a biasing force to pulleys shafts that are connected to the first pulleys.

In certain embodiments, applying the axial tension to the drive member may include approximating a first bracket and a second bracket.

In certain embodiments, approximating the first bracket and the second bracket may include rotating an adjustment member that extends therebetween.

In another aspect of the present disclosure, a method is disclosed for using a base station that is configured to receive a UAV. The method includes: moving a drive member to reposition alignment members and generally align a power source on the UAV with a charging hub of the base station; applying a first tension to the drive member in a direction that is generally orthogonal in relation to a length of the drive member; and applying a second tension to the drive member in a direction that is generally parallel in relation to the length of the drive member.

In certain embodiments, applying the first tension to the drive member may include approximating first pulleys.

In certain embodiments, applying the second tension to the drive member may include approximating a fixed bracket and a movable bracket, wherein the movable bracket includes a second pulley.

In certain embodiments, moving the drive member may include rotating the first pulleys and the second pulley about movable axes of rotation.

In certain embodiments, approximating the fixed bracket and the movable bracket may include rotating an adjustment member that threadably engages the movable bracket.

In another aspect of the present disclosure, a landing platform for a base station is disclosed that is configured to receive a UAV. The landing platform includes a stage and alignment members that are movable in relation to the stage and which are configured for engagement with the UAV to thereby reposition the UAV on the landing platform. The alignment members include fences and projections that extend laterally inward form the fences.

In certain embodiments, the fences and the projections may be formed from a single piece of material.

In certain embodiments, the stage may include landing areas that are configured to receive the UAV.

In certain embodiments, the fences may span the landing areas.

In certain embodiments, the projections may define lengths corresponding to front-to-rear spacing between legs of the UAV.

In certain embodiments, the projections may be generally centered along the fences.

In certain embodiments, the projections may be generally triangular in configuration.

In certain embodiments, the projections may define bearing surfaces that are configured for engagement with the UAV such that approximation of the alignment members urges the UAV outwardly towards a periphery of the landing platform.

In certain embodiments, the bearing surfaces may subtend an angle therebetween that lies substantially within the range of approximately 90 degrees to approximately 150 degrees.

In certain embodiments, the alignment members may further include resilient bumpers to absorb force upon contact between the alignment members and the UAV.

In another aspect of the present disclosure, a landing platform for a base station is disclosed that is configured to receive a UAV. The landing platform includes alignment members that are configured for engagement with the UAV and which are repositionable from an extended position into a retracted position to generally center the UAV on the landing platform.

In certain embodiments, the alignment members may include alignment brackets with mounts that are configured to receive first fasteners.

In certain embodiments, the landing platform may further include a drive mechanism that is connected to the mounts and which is configured to reposition the alignment members between the extended position and the retracted position.

In certain embodiments, the alignment brackets may include first sections; second sections that extend in generally parallel relation to the first sections; and transitions that extend between and connect the first sections and the second sections.

In certain embodiments, the second sections may include fins that are configured to facilitate drainage.

In certain embodiments, the first sections and the second sections may be vertically offset.

In certain embodiments, the alignment brackets may be configured such that the transitions subtend angles with the first sections and the second sections that lie substantially within the range of approximately 110 degrees to approximately 150 degrees.

In another aspect of the present disclosure, a landing platform for a base station is disclosed that is configured to receive a UAV. The landing platform includes a stage, which defines slots and includes landing areas that are configured to receive the UAV, and alignment members that are configured for engagement with the UAV. The alignment members are movable in relation to the stage and include: fences, which span the landing areas; projections, which extend laterally inward from the fences; and alignment brackets, which extend laterally inward from the fences and are positioned outwardly of the projections. The alignment brackets are movable through the slots during movement of the alignment members and include: first sections; second sections; and transitions that extend between and connect the first sections and the second sections.

In certain embodiments, the first sections and the second sections may be vertically offset.

In certain embodiments, the second sections may extend in generally parallel relation to the first sections.

In another aspect of the present disclosure, a landing platform for a base station is disclosed that is configured to receive a UAV. The landing platform includes: alignment members that are configured for engagement with the UAV; drive brackets that are connected to the alignment members; and a drive member that is connected to the drive brackets such that the drive brackets extend between and connect the alignment members and the drive member, whereby movement of the drive member causes corresponding movement of the drive brackets and the alignment members to thereby reposition the UAV on the landing platform.

In certain embodiments, the drive brackets may include first ends that are connected to the drive member and second ends that are connected to the alignment members.

In certain embodiments, the first ends may include first openings that are configured to receive first fasteners such that the first fasteners facilitate connection of the drive member to the drive brackets.

In certain embodiments, the second ends may include second openings that are configured to receive second fasteners such that the second fasteners extend through the drive brackets and into the alignment members.

In certain embodiments, the second openings may extend in generally orthogonal relation to the first openings.

In certain embodiments, the first ends may include grooves that are configured to receive the drive member such that the drive member extends into the drive brackets.

In certain embodiments, the grooves may extend in generally parallel relation to a length of the drive member.

In certain embodiments, the landing platform may further include retainers that extends between and connect the drive brackets and the drive member.

In certain embodiments, the retainers may overlie the drive member.

In certain embodiments, the retainers may span the grooves.

In another aspect of the present disclosure, a landing platform for a base station is disclosed that is configured to receive a UAV. The landing platform includes: a drive member; alignment members that are driven by the drive member such that the landing platform is reconfigurable from a first configuration into a second configuration to thereby generally center the UAV on the landing platform; and drive brackets that extend between and connect the drive member and the alignment members such that movement of the drive member causes corresponding movement of the drive brackets and the alignment members.

In certain embodiments, the drive brackets may include first ends that are connected to the drive member and second ends that are connected to the alignment members.

In certain embodiments, the first ends may include first openings that are configured to receive first fasteners, which facilitate connection of the drive member to the drive brackets.

In certain embodiments, the second ends may include second openings that are configured to receive second fasteners such that the second fasteners extend through the drive brackets and into the alignment members.

In certain embodiments, the second openings may extend in generally orthogonal relation to the first openings.

In another aspect of the present disclosure, a landing platform for a base station is disclosed that is configured to receive a UAV. The landing platform includes: a stage that is configured to receive the UAV; alignment members that are configured for engagement with the UAV and which are movable in relation to the stage from an extended position into a retracted position to thereby generally align a power source on the UAV with a charging hub of the base station; a drive member that is positioned beneath the stage; and drive brackets that extend between and connect the alignment members and the drive member such that movement of the drive member repositions the alignment members from the extended position into the retracted position.

In certain embodiments, the drive brackets may include grooves that are configured to receive the drive member such that the drive member extends into the drive brackets.

In certain embodiments, the grooves may extend in generally parallel relation to a length of the drive member.

In certain embodiments, the landing platform may further include retainers that extend between and connect the drive brackets and the drive member.

In certain embodiments, the retainers may overlie the drive member.

In certain embodiments, the retainers may span the grooves.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
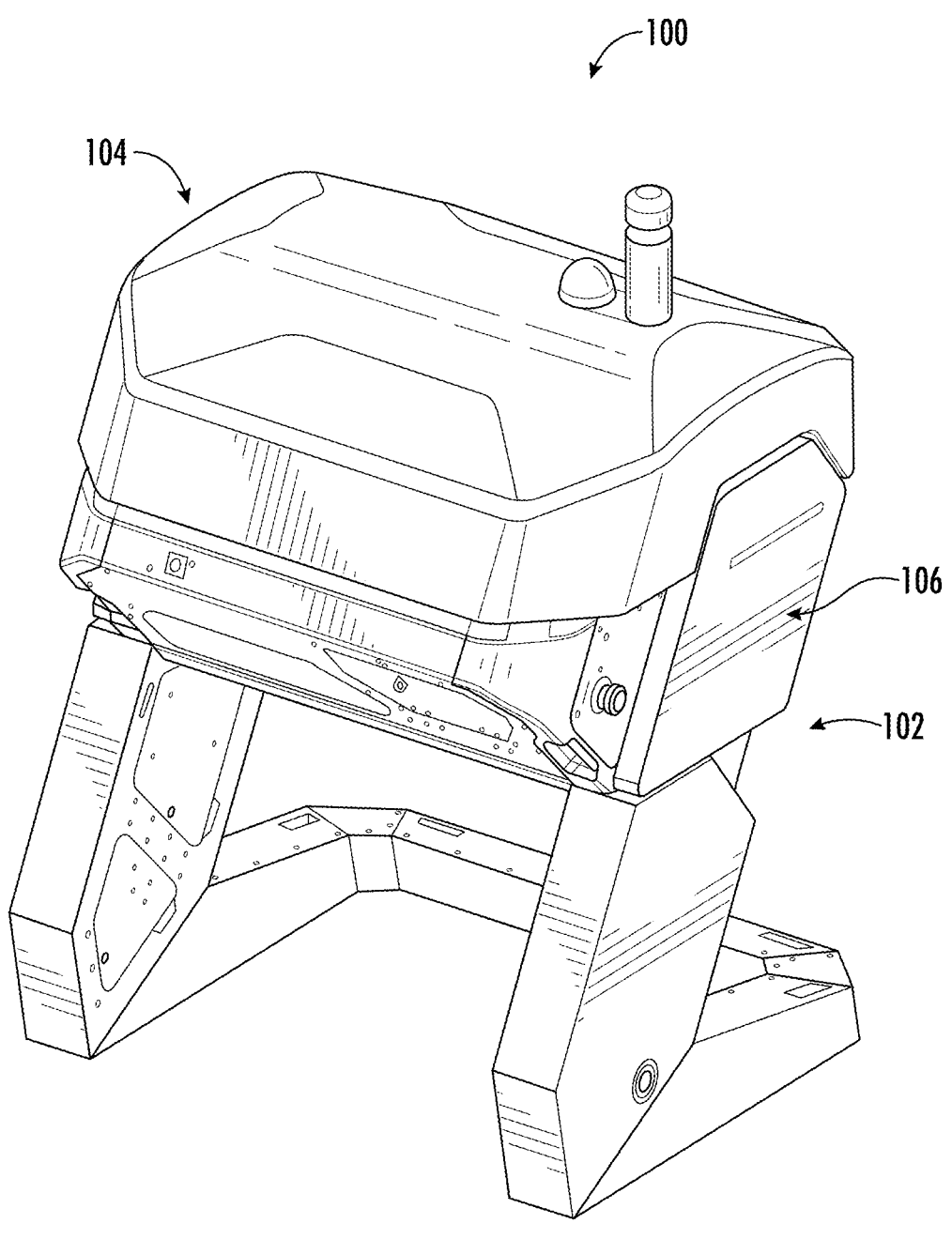
FIG. 1 is a front, perspective view of a base station according to the principles of the present disclosure shown in a closed position.
Figure 2:
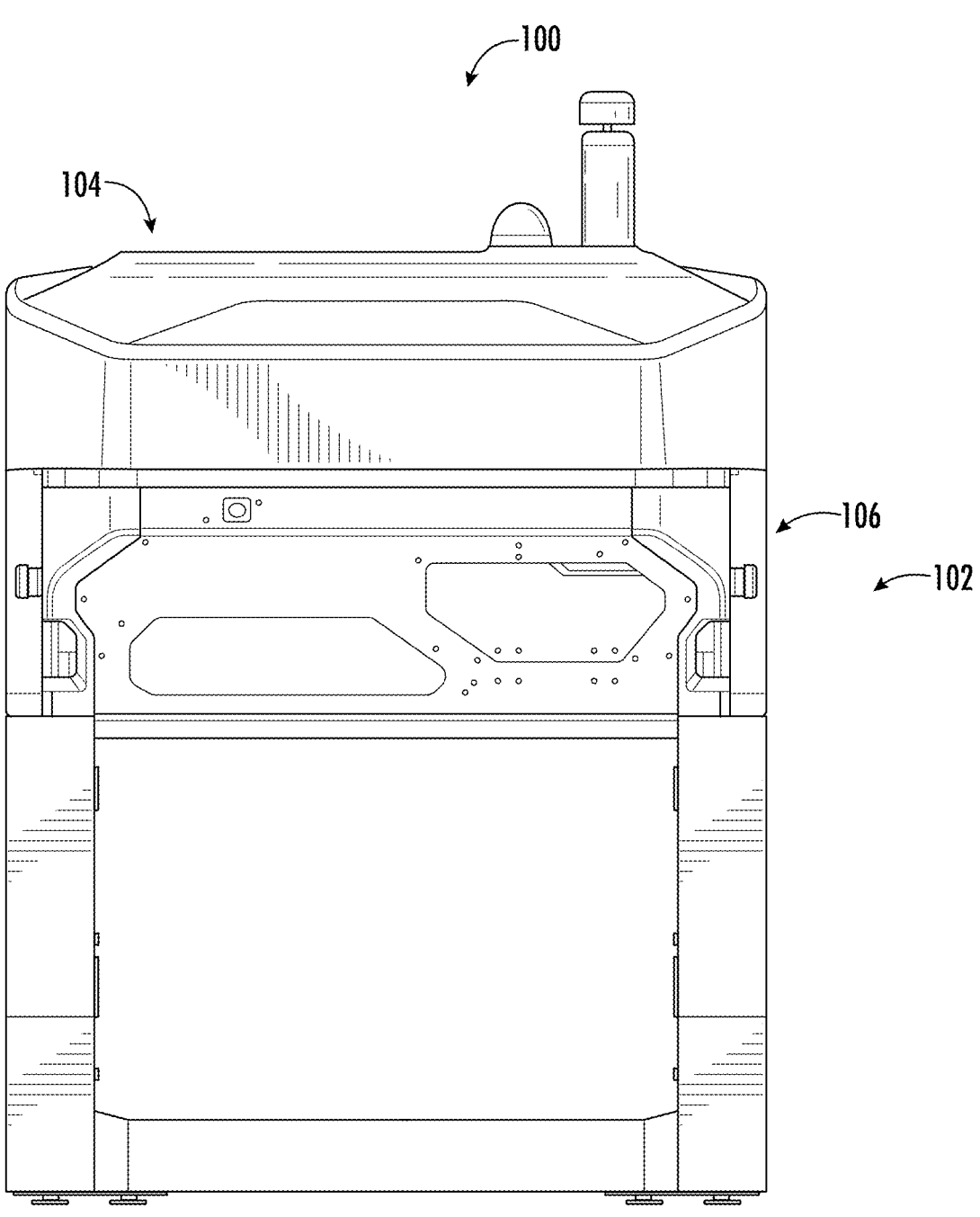
FIG. 2 is a front, plan view of the base station.
Figure 3A:
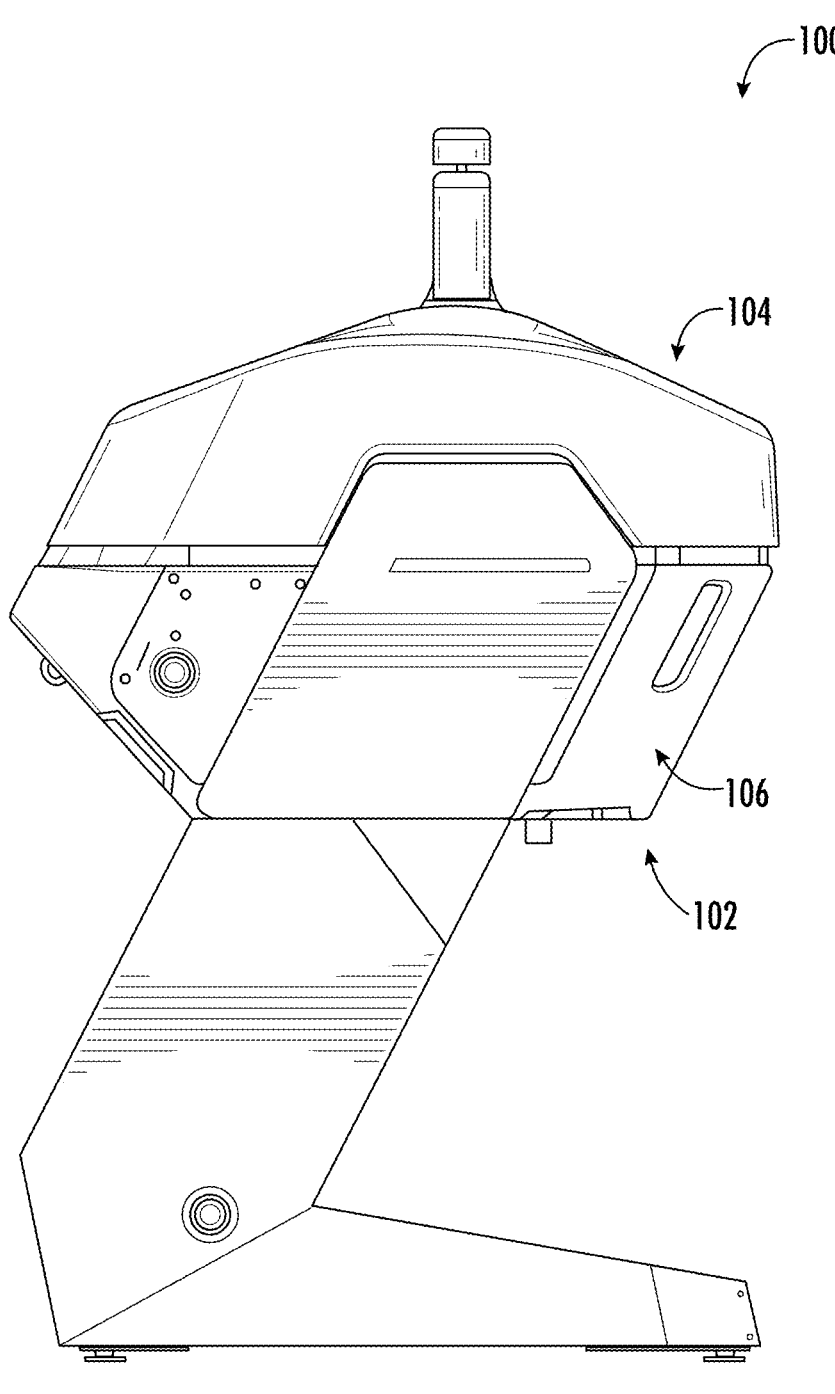
FIG. 3A is a side, plan view of the base station.
Figure 3B:
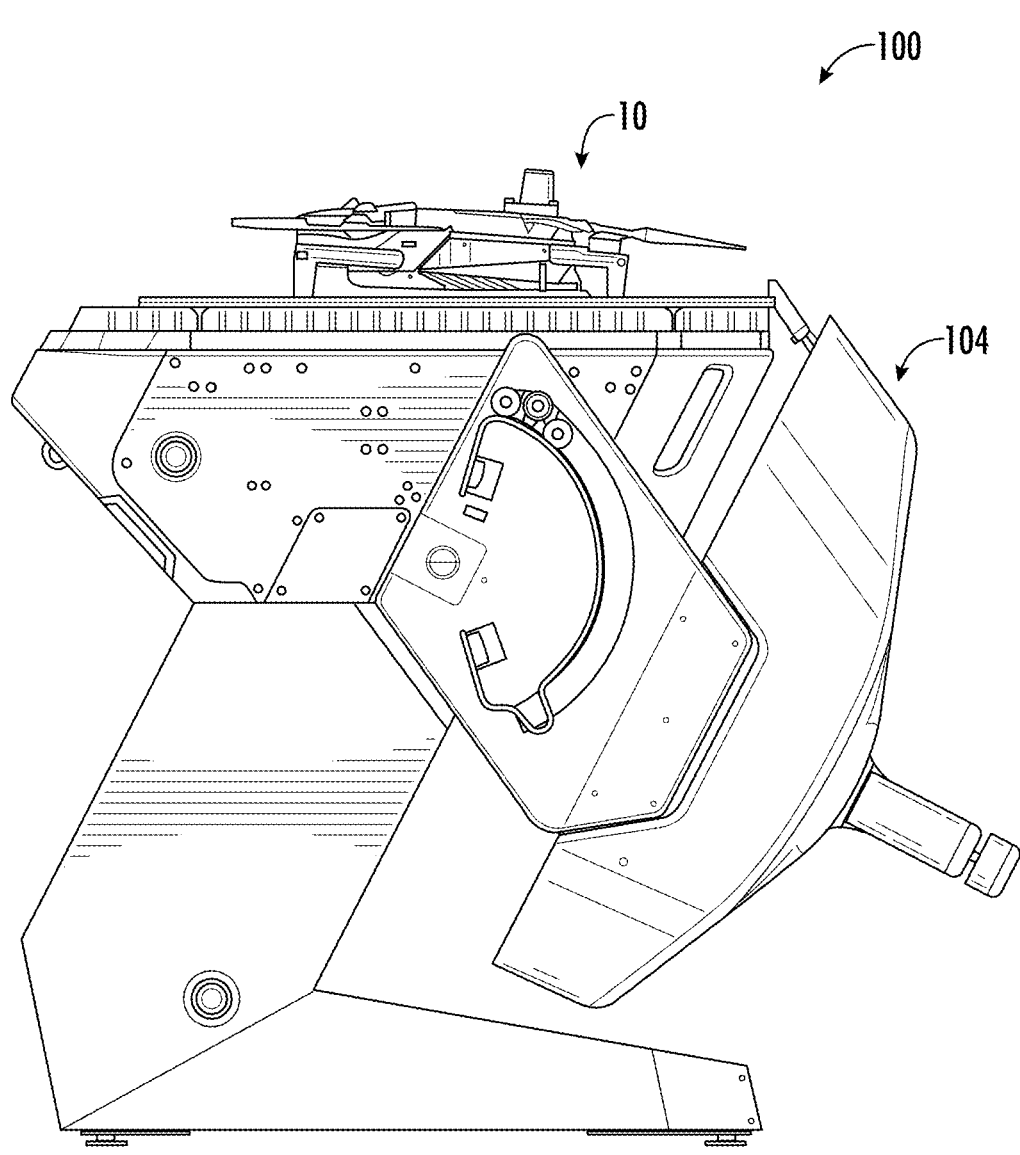
FIG. 3B is a side, plan view of the base station shown in an open position.
Figure 4:
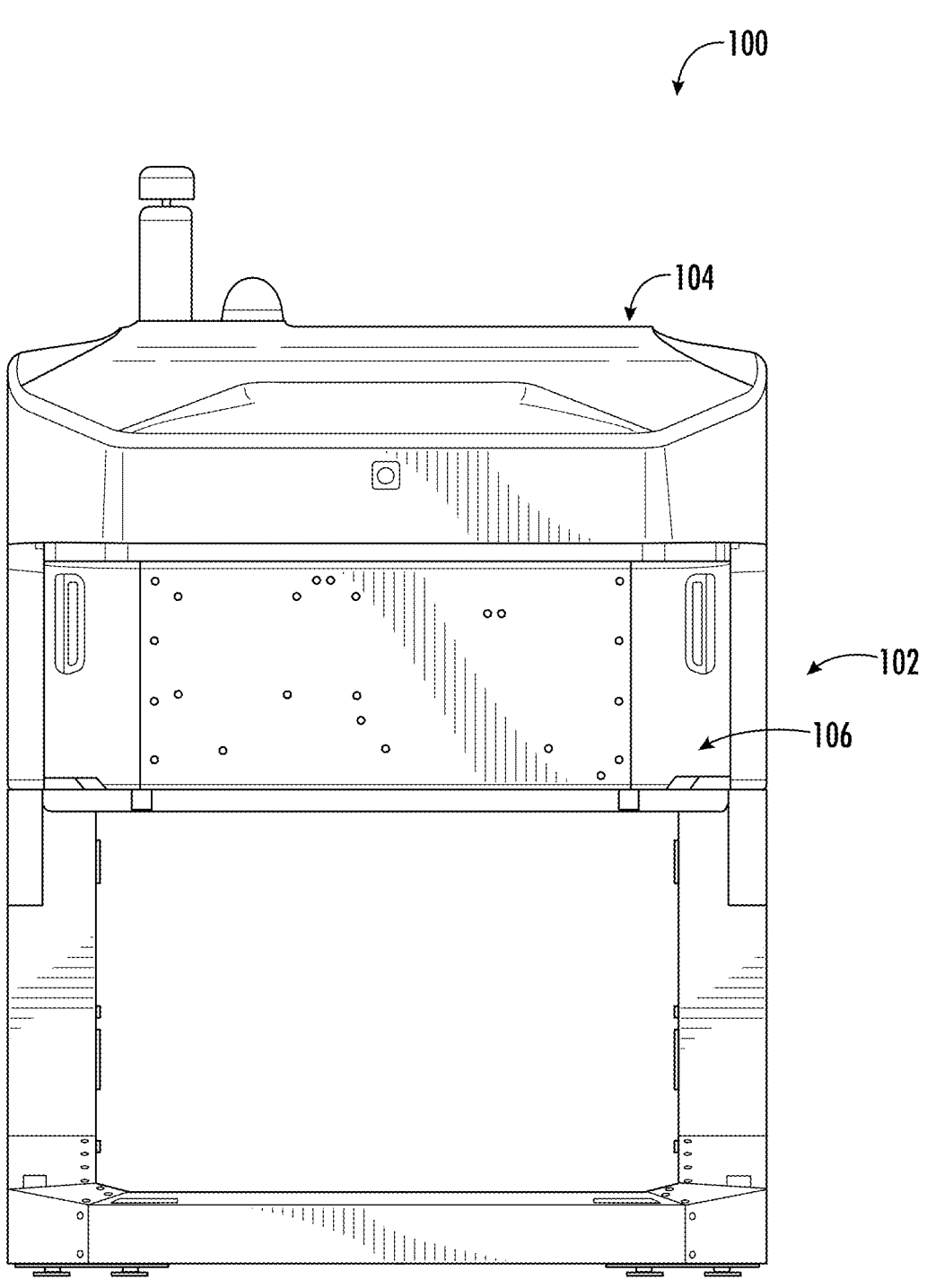
FIG. 4 is a rear, plan view of the base station.

The present disclosure describes a base station for a UAV that includes a reconfigurable landing platform, which facilitates landing and charging of the UAV and improves the overall docking procedure.

The landing platform includes alignment members, which engage the UAV and are repositionable (movable) between extended and retracted positions, and a drive mechanism, which is connected (secured) to the alignment members to facilitate extension and retraction thereof. During repositioning of the alignment members into the retracted position, the alignment members engage (contact) the UAV and reposition (e.g., generally center) the UAV on the landing platform, which generally aligns a power source on the UAV with a charging hub of the base station and facilitates proper closure of the base station.

The drive mechanism includes: a drive member; adjustable and non-adjustable pulley assemblies that engage the drive member; drive brackets that extend between and connect the drive member and the alignment members such that movement of the drive member causes corresponding movement of the drive brackets and the alignment members; and slide assemblies that support the alignment members during extension and retraction. The pulley assemblies support and guide the drive member during movement and are configured to apply both an axial and a lateral tension thereto in order to facilitate proper extension and retraction of the alignment members.

Referring now to the drawings, FIGS. 1, 2, 3A, 3B, and 4 illustrate a base station (dock) 100 for an unmanned aerial vehicle (UAV) 10 (FIGS. 3B, 8C, 12-15) (e.g., a drone), which is configured for automated servicing (e.g., storage, charging, operation, etc.) and accommodation of the UAV 10. While a single base station 100 and a single UAV 10 are shown and described herein, in certain embodiments of the disclosure, it is envisioned that a plurality of base stations 100 and UAVs 10 may be utilized depending, for example, upon the particular intended use of the UAVs 10.

To support autonomous landing and docking of the UAV 10 with the base station 100, it is envisioned that the UAV 10 may follow any suitable process or procedure and may include any suitable electrical and/or logic components, as described in U.S. Pat. No. 11,873,116, the entire contents of which are hereby incorporated by reference.

The base station 100 includes a base 102 and a roof 104, which is supported by the base 102 such that the roof 104 and the base station 100 are repositionable between a closed position (FIGS. 1, 2, 3A, 4), in which the base 102 and the roof 104 collectively define an enclosure that conceals the UAV 10 therein, and an open position (FIG. 3B), which facilitates takeoff and landing of the UAV 10.

With reference now to FIGS. 5-7, 8A, 8B, 8C, and 9-21 as well, the base 102 includes a body 106, which is the main structural member of the base 102 and supports various internal and external components of the base station 100; a charging hub 108 (FIGS. 11-15), which is movably supported by the body 106; and a (reconfigurable) landing platform 110.

The charging hub 108 is configured for engagement (contact) with and electrical connection to a power source 12 (e.g., a battery) on the UAV 10, which is located (e.g., attached to or otherwise supported on) a lower (bottom) surface thereof, to facilitate charging of the UAV 10.

Figure 14:
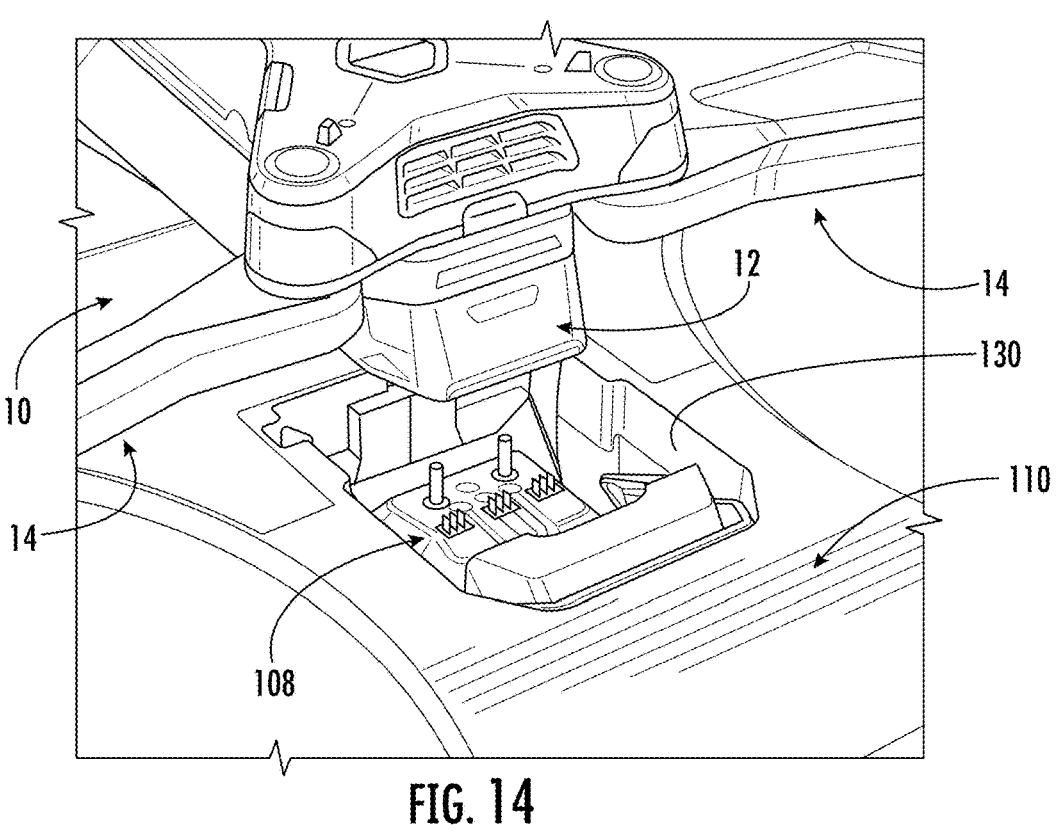
FIG. 14 is a partial, top, perspective view of the landing platform, the UAV, and a charging hub of the base station, which is shown in a retracted position.
Figure 15:
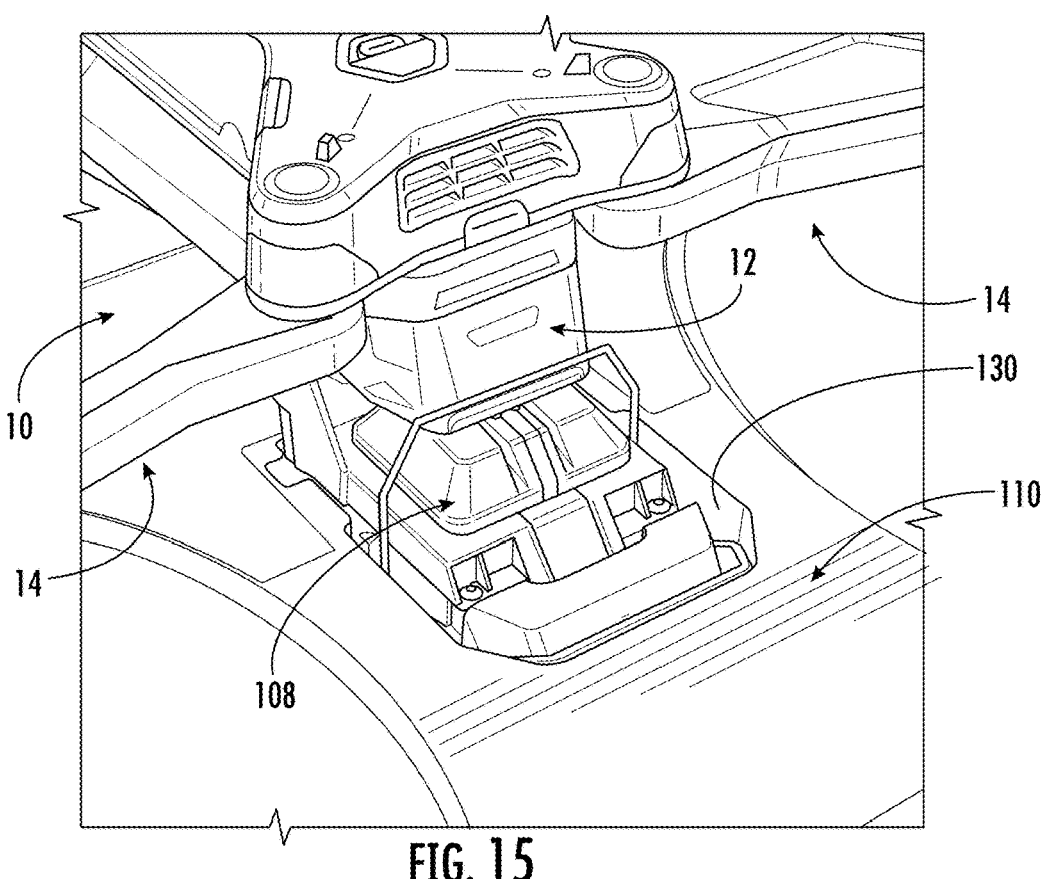
FIG. 15 is a partial, top, perspective view of the landing platform, the UAV, and the charging hub, which is shown in an extended position.

The charging hub 108 may draw power from any suitable source, whether internal to the base station 100 or external, and is repositionable between a (first) retracted position (FIG. 14) and a (second) extended position (FIG. 15). Prior to landing of the UAV 10, the charging hub 108 is maintained in the retracted position such that the charging hub 108 is concealed by the landing platform 110. Concealing the charging hub 108 facilitates docking of the UAV 10 by increasing the landing envelope (i.e., the surface area on the landing platform 110 that is available to the UAV 10), which reduces the requisite precision, thereby increasing the margin for error and resulting in more successful landings. Subsequent to landing and alignment of the UAV 10 with the charging hub 108, however, the charging hub 108 is repositioned to the extended position such that the charging hub 108 is exposed from and extends vertically through the landing platform 110 to facilitate connection to and charging of the UAV 10.

The landing platform 110 is supported by (e.g., connected (secured) to the body 106 and is configured to receive the UAV 10 during docking. In certain embodiments, it is envisioned that the base 102 may include (one or more) at least one damper that is positioned between the body 106 and the landing platform 110 in order to allow for relative movement therebetween during docking of the UAV 10 (e.g., to absorb force and thereby inhibit (if not entirely prevent) recoil of the UAV 10).

The landing platform 110 is pivotably connected (secured) to the body 106 at hinges 112 (FIGS. 9, 10) such that the landing platform 110 is repositionable between a closed position (FIGS. 9-13), in which the landing platform 110 receives and accommodates the UAV 10 and is laterally fixed (i.e., immovable) in relation to the body 106, and an open position (FIGS. 5-7), which provides access to various internal components of the base station 100. Embodiments in which the body 106 and the landing platform 110 may be non-pivotably connected (secured together) are also envisioned herein, however.

Figure 5:
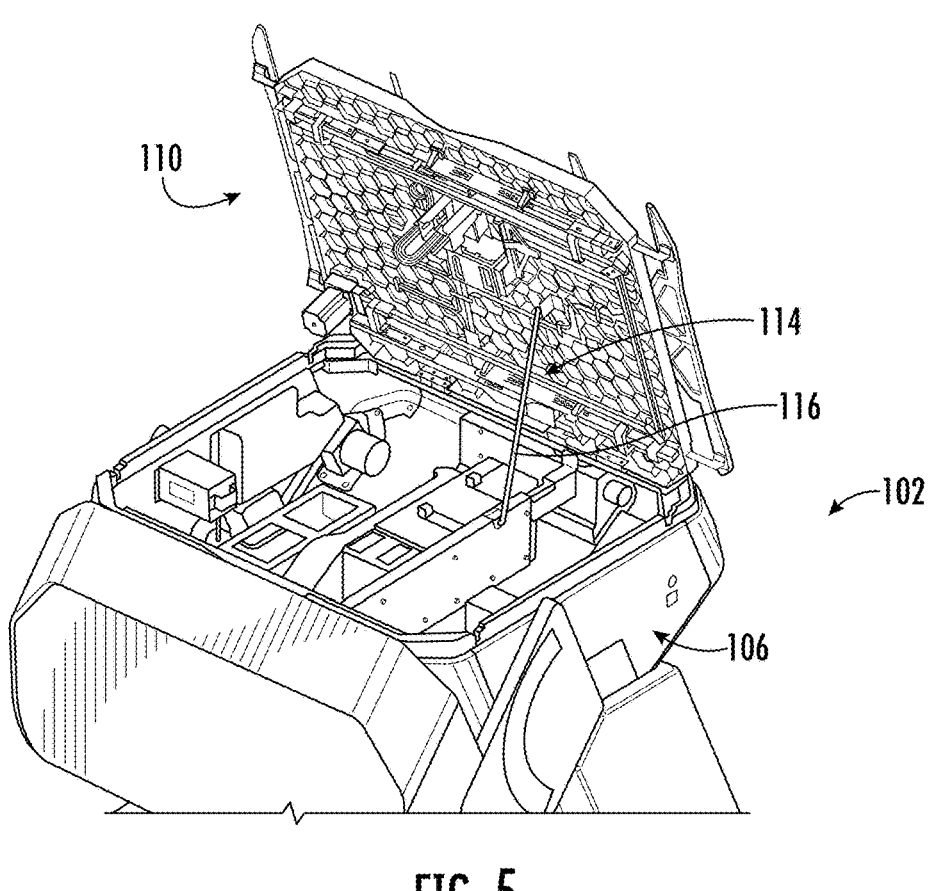
FIG. 5 is a partial, top, perspective view of the base station illustrating a landing platform thereof maintained in an open position by a support member.
Figure 6:
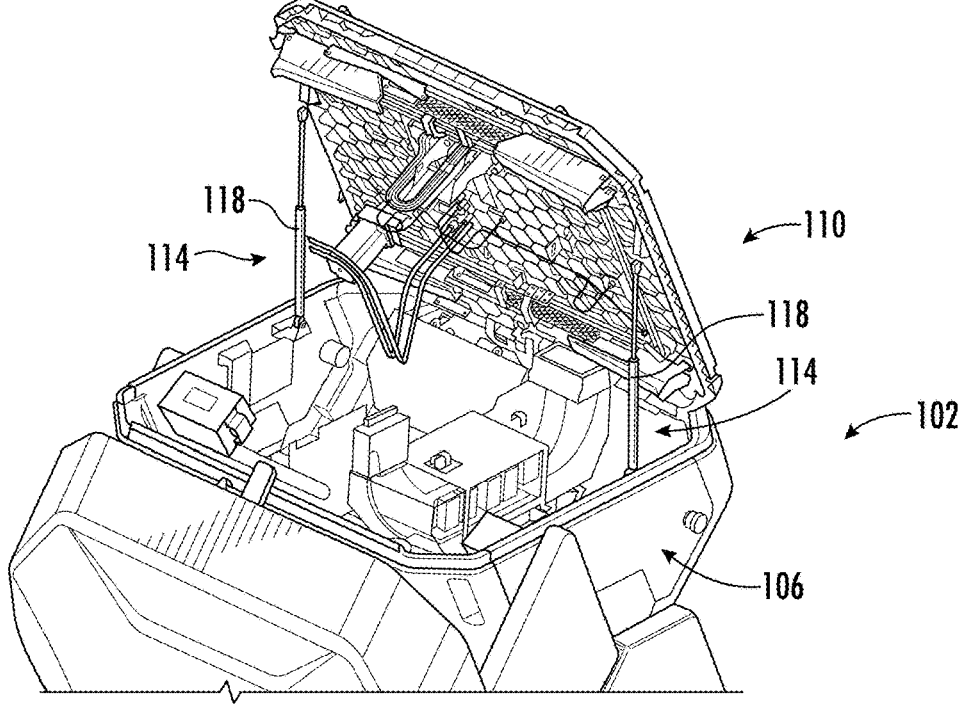
FIG. 6 is a partial, top, perspective view of the base station shown with an alternate embodiment of the support member.
Figures 7, 8A:
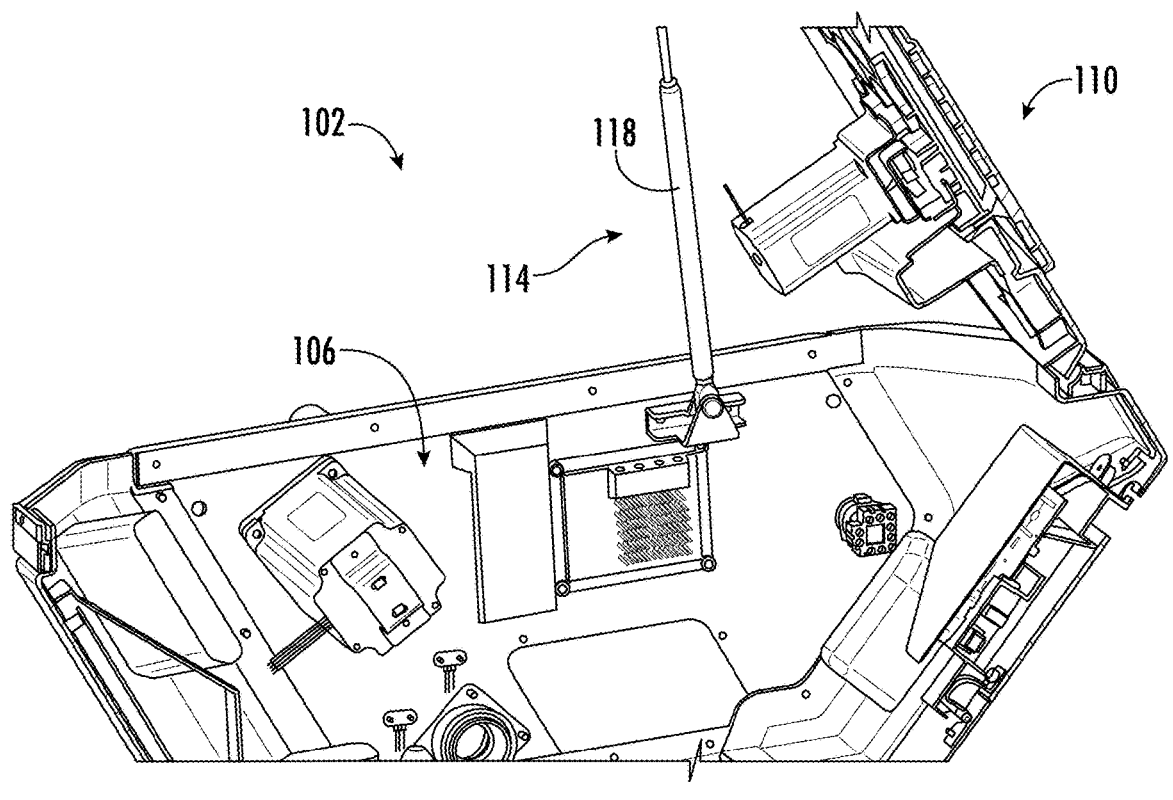
FIG. 7 is a partial, side, perspective view of the base station and the support member seen in FIG. 6.
FIG. 8A is a partial, side, perspective view of the base station and the support member seen in FIG. 6 with the support member shown in a stowed position.
Figure 8B:
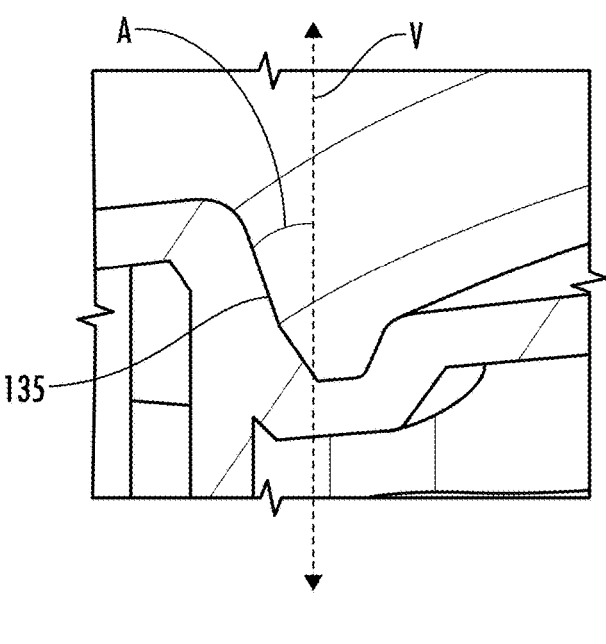
FIG. 8B is an enlargement of the area of detail identified in FIG. 8A.
Figure 8C:
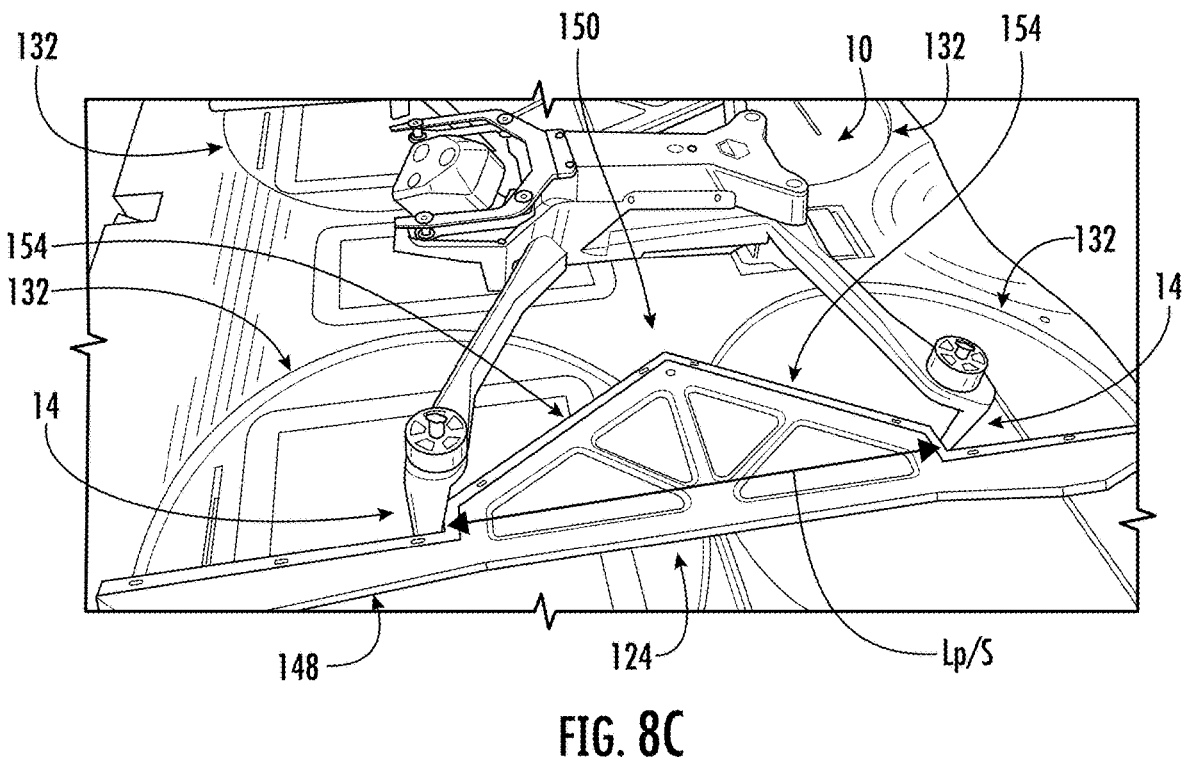
FIG. 8C is a partial, top, perspective view of the landing platform shown with a UAV.
Figure 9:
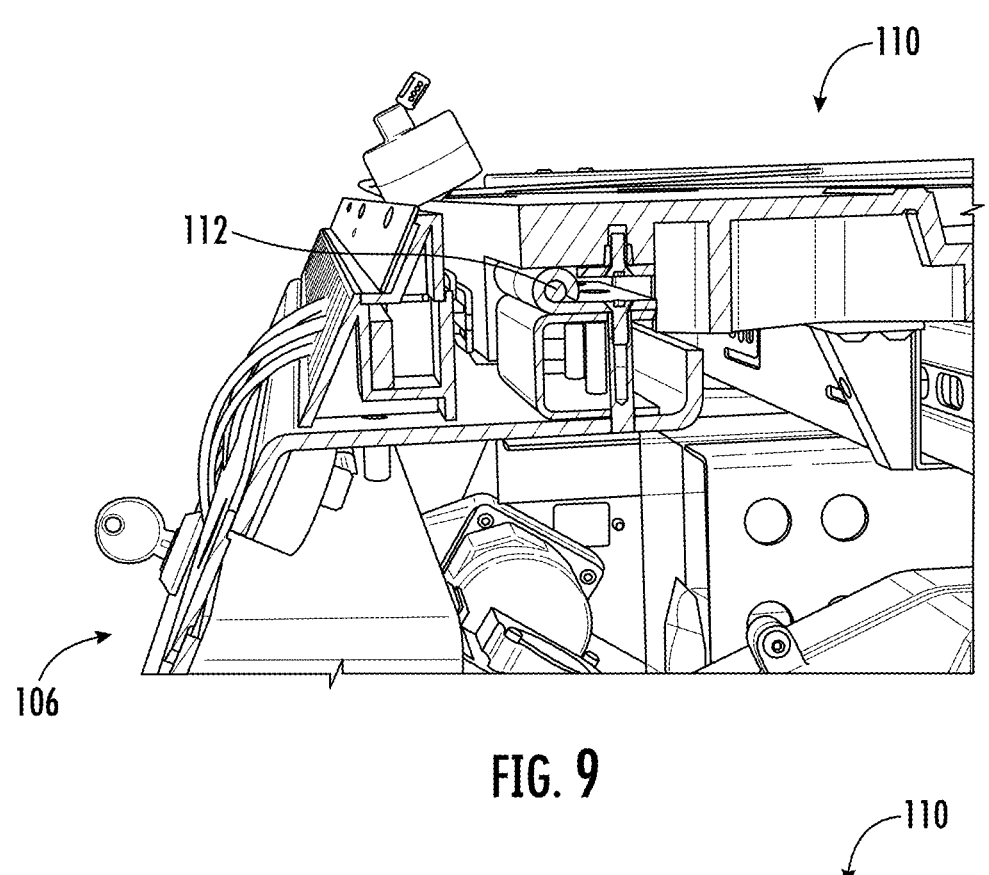
FIGS. 9 and 10 are cross-sectional, perspective views illustrating a hinged connection between the landing platform and a body of the base station.
Figure 10:
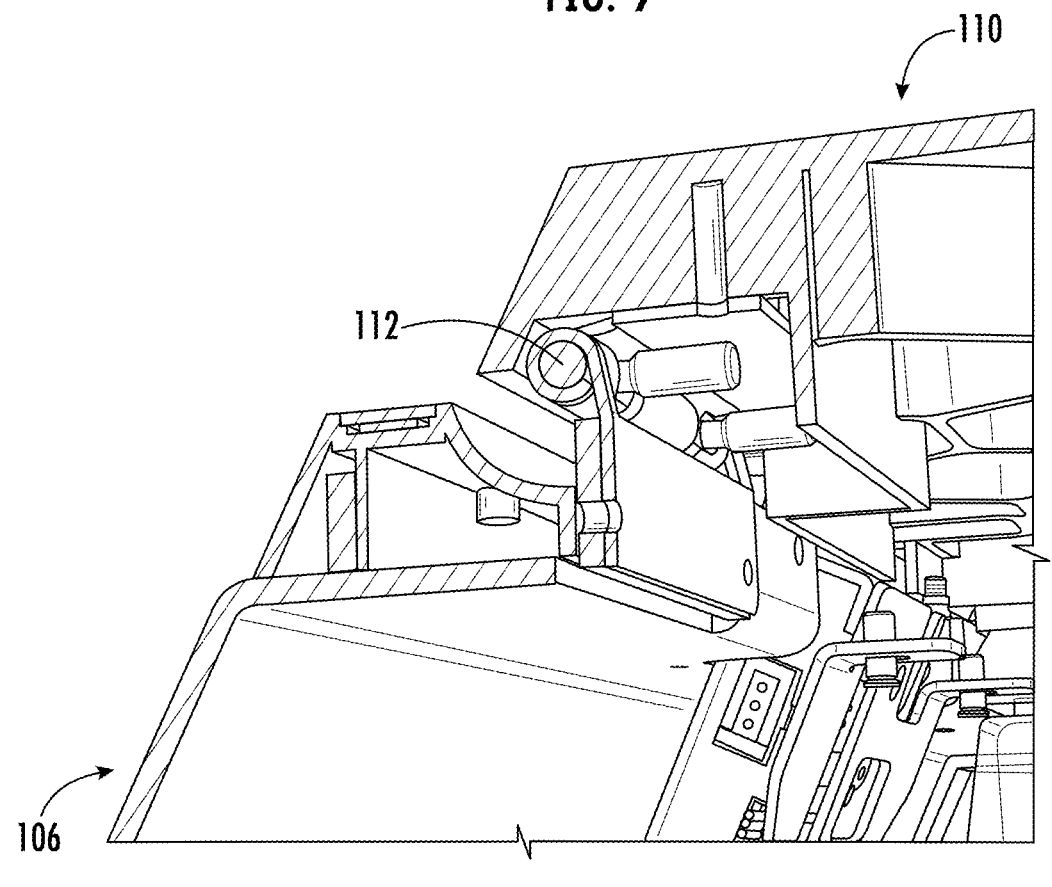

In order to facilitate repositioning of the landing platform 110 between the closed and open positions and brace the landing platform 110 in the open position, the base 102 includes (one or more) at least one support member 114 (FIGS. 5-8A). For example, it is envisioned that the support member(s) 114 may include rod(s) 116, as seen in FIG. 5, strut(s) 118, as seen in FIGS. 6-8A, or any other suitable component(s) or mechanism(s). The support member(s) 114 are repositionable between an extended (deployed) position (FIGS. 5-7), in which the support member(s) 114 maintain the landing platform 110 in the open position, and a retracted (stowed) position (FIG. 8A), in which the support member (s) 114 allow for closure of the landing platform 110.

In certain embodiments, it is envisioned that the landing platform 110 may be configured to tilt in relation to the base 102 in one or more degrees of freedom in order to match a landing angle of the UAV 10. Tiltability of the landing platform 110 reduces the requisite precision during docking (e.g., in the event of a crosswind) and, thus, potential damage to the UAV 10 and/or the landing platform 110, as well as recoil of the UAV 10.

Figure 11:
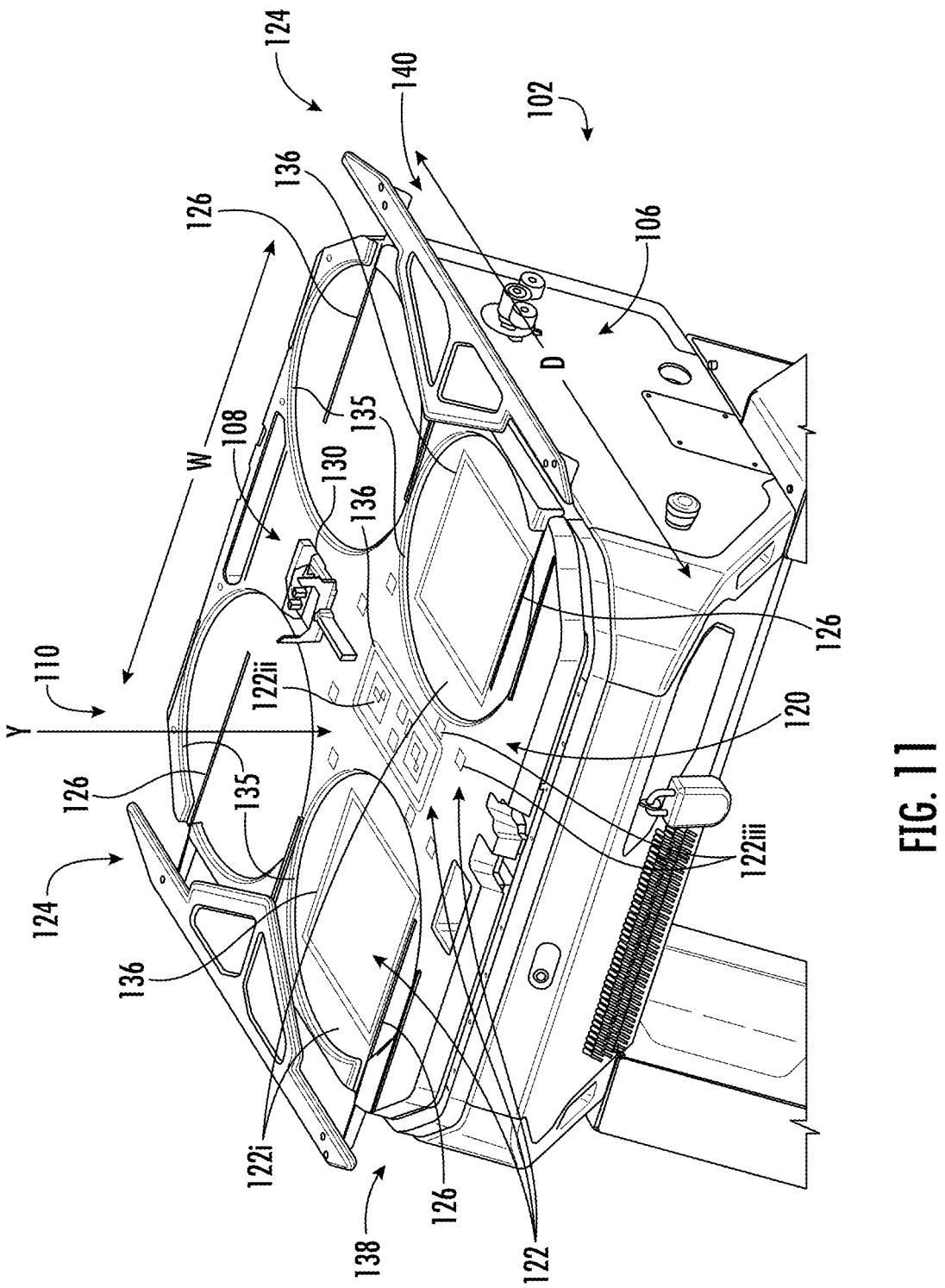
FIG. 11 is a partial, top, perspective view of the base station illustrating the landing platform, which includes repositionable alignment members.
Figure 12:
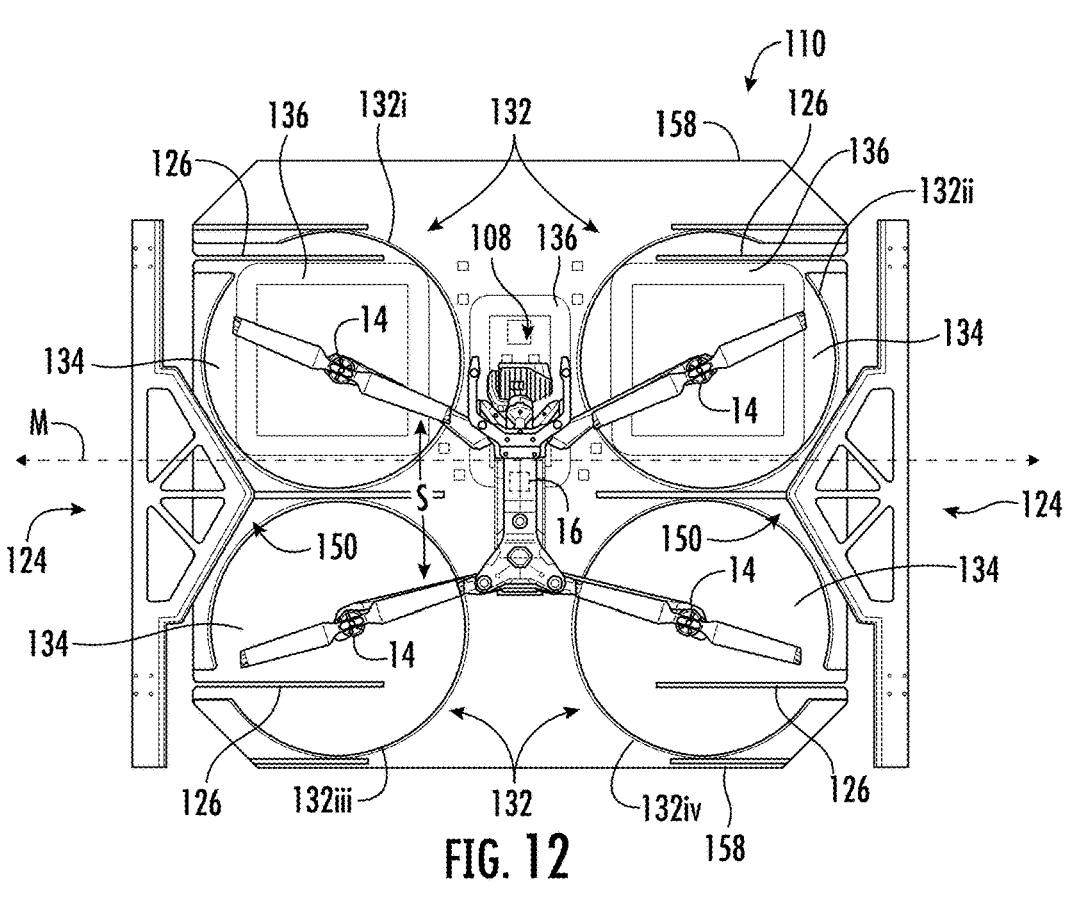
FIG. 12 is a top, plan view of the landing platform and the UAV with the alignment members shown in an extended position.
Figure 13:
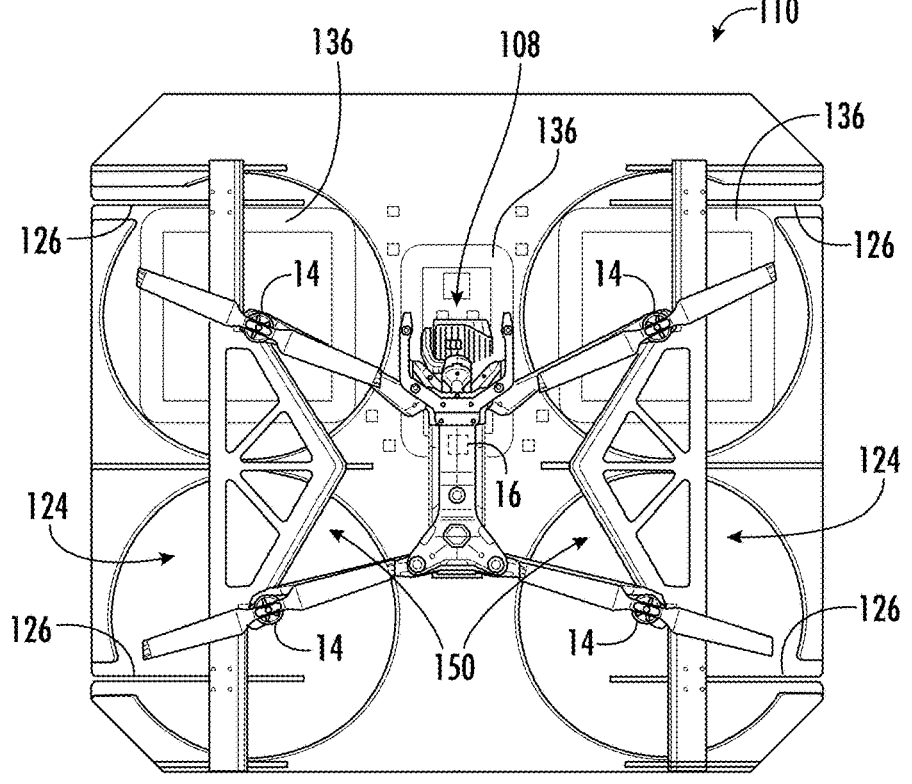
FIG. 13 is a top, plan view of the landing platform and the UAV with the alignment members shown in a retracted position.
Figure 16:
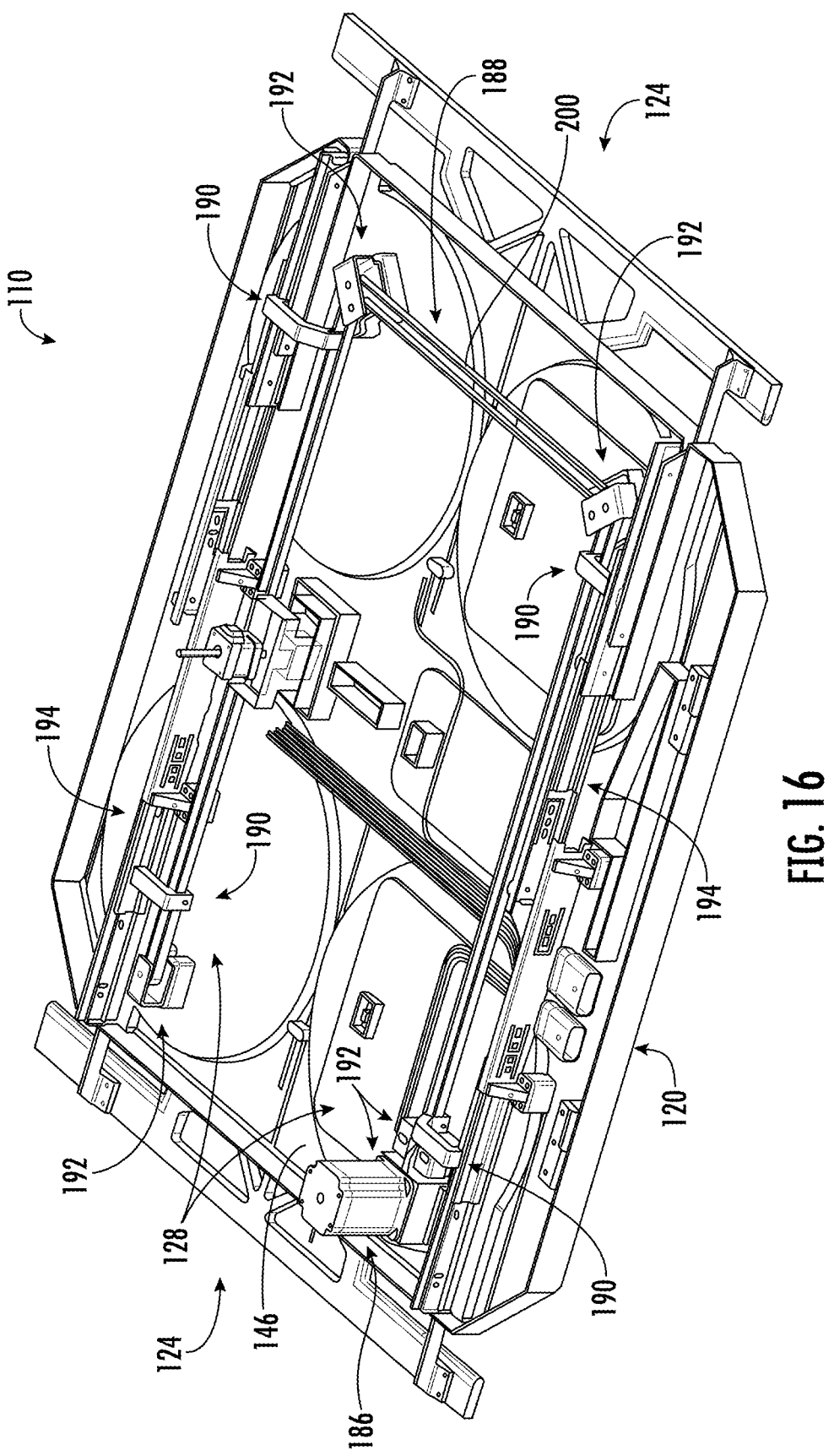
FIG. 16 is a bottom, perspective view of the landing platform with the alignment members shown in the extended position and illustrating a drive mechanism that interfaces with the alignment members to facilitate repositioning thereof.

With reference to FIGS. 11-13 in particular, the landing platform 110 defines a (lateral) width W (FIG. 11) and a depth D, which extend in generally orthogonal (perpendicular) relation to each other and in generally orthogonal (perpendicular) relation to a generally vertical landing direction Y (FIG. 11) of the UAV 10 when docking with the base station 100. The landing platform 110 includes: a stage 120, which is configured to receive the UAV 10; (one or more) at least one fiducial 122 (FIG. 11); a pair of (first and second) alignment members 124; slots 126; and a drive mechanism 128 (FIG. 16).

The stage 120 defines a window 130 (FIG. 11), which extends through the landing platform 110, and a plurality of landing areas 132 (FIG. 12).

The window 130 is generally aligned with the charging hub 108 (i.e., along the width W and the depth D of the landing platform 110) and is configured to receive the charging hub 108 such that the charging hub 108 moves through the window 130 during repositioning between the retracted and extended positions. Although shown as being generally rectangular in configuration, it is envisioned that the window 130 may include any suitable configuration (i.e., depending upon the particular configuration of the charging hub 108, the UAV 10, etc.).

The landing areas 132 (FIG. 12) receive and constrain the UAV 10 during docking with the base station 100. More specifically, the landing areas 132 are configured to receive legs 14 (FIGS. 8C, 12-15) of the UAV 10 during docking and correspond in number thereto. As such, in the illustrated embodiment, the landing platform 110 includes four landing areas 132*i*, 132*ii*, 132*iii*, 132*iv*. It is envisioned, however, that the specific number of landing areas 132 may be increased or decreased in alternate embodiments (e.g., depending on the particular configuration of the UAV 10) without departing from the scope of the present disclosure.

The landing areas 132 define depressions 134 that extend vertically into the stage 120 and which are configured to receive the legs 14 of the UAV 10. The depressions 134 not only facilitate landing of the UAV 10 with greater tolerance (i.e., by increasing the margin for error), but control the position of the UAV 10 and inhibit unintended movement of the UAV 10 in relation to the landing platform 110 (e.g., in windy conditions).

The depressions 134 define inner walls 135 (FIGS. 8A, 8B, 11) that are angled (tapered, beveled, chamfered, sloped) in configuration in order to guide the UAV 10 (i.e., the legs 14) into the landing areas 132. In addition to facilitating docking of the UAV 10 by further increasing the landing envelope and further reducing the requisite precision, the angled configuration of the inner walls 135 increases the likelihood that the UAV 10 will be retained within the landing areas 132 (e.g., in the event of recoil during landing).

In the illustrated embodiment, each of the inner walls 135 extends at an angle A (FIG. 8B) in relation to a vertical reference axis V, which extends in generally parallel relation to the landing direction Y (FIG. 11) and in generally orthogonal relation to the width W of the landing platform 110, that lies substantially within the range of approximately 30 degrees to approximately 60 degrees. Embodiments in which the angles A may lie outside of the disclosed range are also envisioned herein, however (e.g., depending upon the particular configuration of the UAV 10, the configuration of the landing platform 110, etc.).

During docking, it is envisioned that proper landing of the UAV 10 (i.e., reception of the legs 14 of the UAV 10 within the depressions 134) may be confirmed via an inertial measurement unit (IMU) 16 (FIGS. 12, 13) on the UAV and/or via detection of the legs 14 by the fiducials 122 (FIG. 11), as described in further detail below. In the event of an improper landing (e.g., in the event that one or more of the legs 14 of the UAV 10 are not received within the depressions 134), landing is aborted, the UAV 10 re-ascends, and landing is re-attempted. Additionally, or alternatively, in the event of an improper landing, it is envisioned that the UAV 10 and/or the base station 100 may generate and communicate an alert to a user.

In the illustrated embodiment, the depressions 134 are generally circular in configuration. It is envisioned, however, that the specific configurations of the depressions 134 may be varied in alternate embodiments (e.g., depending on the particular configuration of the UAV 10) without departing from the scope of the present disclosure. For example, an embodiment in which the depressions 134 may be generally polygonal (e.g., square-shaped) is also envisioned herein.

In order to facilitate drainage (e.g., in inclement weather), in certain embodiments, it is envisioned that the landing platform 110 may include one or more gutters (or other such drainage channels) that extend about the landing areas 132.

The fiducial(s) 122 (FIG. 11) facilitate visual identification of the base station 100 by the UAV 10, guidance of the UAV 10 during docking (i.e., towards the landing platform 110), and/or determining that the UAV 10 has landed properly (i.e., in a manner that allows for repositioning of the UAV 10 on the landing platform 110, which is described in further detail below). For example, it is envisioned that the fiducial(s) 122 may facilitate acquisition, descent, landing, and alignment of the UAV 10 during daytime operation, at night, in inclement weather, etc.

The fiducial(s) 122 are supported by and are connected (secured) to the landing platform 110 and may be positioned (located) in any suitable location (e.g., the stage 120, the landing areas 132, etc.). To promote or otherwise enhance visualization and/or recognition of the fiducial(s) 122, it is envisioned that the fiducial(s) 122 may be visible in different spectrums of light (e.g., ambient light, infrared light, etc.) and/or that the landing platform 110 may include contrasting coloration.

In the illustrated embodiment, the landing platform 110 includes: (one or more) at least one (first) fiducial 122*i*, which includes a first configuration and/or size (e.g., surface area); (one or more) at least one (second) fiducial 122*ii*, which includes a second, different configuration and/or size (e.g., surface area); and (one or more) at least one (third) fiducial 122_iii_.

The fiducial(s) 122_i_ are positioned (located) within (one or more) at least one of the landing areas 132 (FIG. 12) (i.e., within (one or more) at least one of the depressions 134) and correspond in configuration thereto, which maximizes the detectable surface area of the fiducial(s) 122_i_. As such, in the illustrated embodiment, the fiducial(s) 122_i_ are generally circular in configuration. It is envisioned, however, that the specific configuration(s) of the fiducial(s) 122_i_ may be varied in alternate embodiments (e.g., depending on the particular configurations of the landing areas 132) without departing from the scope of the present disclosure. As such, embodiments in which the fiducial(s) 122_i_ may be generally polygonal (e.g., rectangular, square-shaped, etc.) in configuration are also envisioned herein.

The fiducial(s) 122_ii_ are positioned (located) on the stage 120 between the landing areas 132 (i.e., the depressions 134) and are non-circular in configuration. More specifically, in the illustrated embodiment, the fiducial(s) 122_ii_ are generally polygonal (e.g., rectangular, square-shaped, etc.) in configuration. It is envisioned, however, that the specific configuration(s) of the fiducial(s) 122_ii_ may be varied in alternate embodiments (e.g., depending on the particular configurations of the landing areas 132, the arrangement thereof, etc.) without departing from the scope of the present disclosure.

The fiducial(s) 122_iii_ are spaced about the landing platform 110 (i.e., the stage 120) and further facilitate visual identification of the base station 100 by the UAV 10 and guidance of the UAV 10 during docking. In the illustrated embodiment, the fiducial(s) 122_iii_ are also positioned (located) between the landing areas 132 (i.e., the depressions 134). It is envisioned, however, that the specific positions (location) of the fiducial(s) 122_iii_ may be varied in alternate embodiments (e.g., depending on the particular configurations of the landing areas 132, the arrangement thereof, etc.) without departing from the scope of the present disclosure.

In order to facilitate detection of the fiducials 122 by the UAV 10, it is envisioned that the fiducials 122 may include a reflective outer surface (e.g., coating). Additionally, or alternatively, it is envisioned that the landing platform 110 may include (one or more) at least one light source 136 (FIGS. 11-13) in order to facilitate backlighting of the fiducials 122. For example, in the illustrated embodiment, the light source(s) 136 are associated with (e.g., connected (secured) to) the fiducials 122_i_, 122_ii_, whereas the fiducial 122_iii_ is devoid of backlighting.

In various embodiments of the base station 100, it is envisioned that the light source(s) 136 may be controllable in order to generate lighting conditions that facilitate detection by the UAV 10. For example, it is envisioned that the light source(s) 136 may be adjusted in accordance with the exposure on an image capture device of the UAV 10.

In order to further increase detection of the base station 100 (i.e., the fiducials 122) by the UAV 10, it is envisioned that one or more components of the base station 100 may include an anti-glare (e.g., low gloss) finish.

Referring now to FIGS. 16-21 in particular, the alignment members 124 will be discussed. The alignment members 124 are positioned (located) at opposite lateral ends 138, 140 of the landing platform 110 and are configured for engagement (contact) with the UAV 10 (i.e., the legs 14). The alignment members 124 are movable (repositionable) in relation to the stage 120 between an extended position (FIGS. 11, 12, 16) and a retracted position (FIGS. 8C, 13), which facilitates reconfiguration of the landing platform 110 between a first (landing) configuration and a second (charging) configuration, respectively. More specifically, during reconfiguration of the landing platform 110 between the first and second configurations, the alignment members 124 are movable (repositionable) along an axis of movement M (FIG. 12) that extends in generally parallel relation to the width W (FIG. 11) of the landing platform 110 and in generally orthogonal (perpendicular) relation to the landing direction Y (FIG. 11) of the UAV 10.

When the landing platform 110 is in the first configuration, the alignment members 124 are in the extended position and are positioned laterally outward of the landing areas 132 (i.e., along the width W of the landing platform 110), which facilitates docking of the UAV 10 with the base station 100. When the landing platform 110 is in the second configuration, the alignment members 124 are in retracted position and are generally aligned with and are positioned vertically above the landing areas 132. As described in further detail below, during reconfiguration of the landing platform from the first configuration into the second configuration (i.e., during repositioning of the alignment members 124 from the extended position into the retracted position), the alignment members 124 are movable laterally inward (i.e., towards each other) along the axis of movement M and engage (contact) the UAV 10 (e.g., the legs 14 thereof) in order to reposition (e.g., generally center) the UAV 10 on the landing platform 110. Centration of the UAV 10 on the landing platform 110 generally aligns the power source 12 on the UAV 10 with the charging hub 108 (FIGS. 11-15), thereby facilitating charging of the UAV 10, and facilitates proper closure of the roof 104 by inhibiting (if not entirely preventing) contact with the UAV 10 and, thus, damage to the UAV 10 and/or the base station 100.

In certain embodiments, it is envisioned that the landing platform 110 may include (one or more) at least one sensor 142 (FIG. 22) (e.g., Hall sensor(s) 144) in order to ascertain the positions of the alignment members 124 in relation to the stage 120 upon powering of the base station 100. More specifically, the sensors 142 are used to determine the locations of the alignment members 124 within their possible range of motion such that the alignment members 124 can be adjusted (e.g., extended) in order to prepare the base station 100 for landing of the UAV 10.

Although shown as being connected (secured) to an underside 146 of the landing platform 110 (i.e., the stage 120) in the illustrated embodiment, it is envisioned that the sensor(s) 142 may be positioned in any location(s) suitable for the intended purpose of ascertaining the positions of the alignment members 124.

The alignment members 124 include: fences 148 (FIGS. 18, 19, 21); projections 150; and alignment brackets 152.

The fences 148 extend along the depth D (FIG. 11) of the landing platform 110 and support the projections 150 and the alignment brackets 152. More specifically, in the illustrated embodiment, the alignment members 124 are configured such that the fences 148 span (i.e., extend across) the landing areas 132 and define lengths Lf.

The projections 150 extend laterally inward from the fences 148 (i.e., towards each other, along the width W (FIG. 11) of the landing platform 110) and are generally centered along the fences 148 (i.e., along the lengths Lf thereof). In the illustrated embodiment, the projections 150 are formed integrally (unitarily, monolithically) with the fences 148 (i.e., such that the fences 148 and the projections 150 are formed from a single piece of material). Embodiments in which the fences 148 and the projections 150 may be formed as separate, discrete components are also envisioned herein, however.

The projections 150 are generally triangular in configuration and define (angled) bearing surfaces 154 that are configured for engagement (contact) with the UAV 10 (e.g., the legs 14 thereof) during repositioning of the alignment members 124 from the extended position into the retracted position. More specifically, the projections 150 define lengths Lp (FIG. 18) that are approximately equal to the front-to-rear spacing S (FIGS. 8C, 12) between the legs 14 of the UAV 10.

In the illustrated embodiment, the alignment members 124 include (resilient) bumpers 156 (FIG. 18. 19), which extend along both the fences 148 and the projections 150 (i.e., the bearing surfaces 154). The bumpers 156 are configured for engagement (contact) with the UAV 10 (i.e., the legs 14 thereof) and absorb force upon contact therewith in order to inhibit (if not entirely prevent) damage to the UAV 10 and/or the alignment members 124.

The alignment members 124 are configured such that the bearing surfaces 154 subtend angles α (FIG. 18) that lie substantially within the range of approximately 90 degrees to approximately 150 degrees. Embodiments in which the alignment members 124 may be configured such that the angles α lie outside of the disclosed range are also envisioned herein, however (e.g., depending upon the particular configuration of the UAV 10, the spacing between the legs 14 thereof, etc.). The angled configurations of the projections 150 urge the legs 14 of the UAV 10 outwardly (e.g., towards a periphery 158 (FIG. 12) of the landing platform 110) during repositioning of the alignment members 124 from the extended position into the retracted position.

The alignment brackets 152 extend laterally inward from the fences 148 and are positioned (located) outwardly of the projections 150 (i.e., along the lengths Lf of the fences 148). The alignment brackets 152 define opposite (first and second) ends 160, 162 (FIG. 20) and include bases 164 and arms 166. The alignment brackets 152 are positioned (located) within (are received by) the slots 126 (FIGS. 11-13) in the landing platform 110 and are movable therethrough during extension and retraction of the alignment members 124 (i.e., reconfiguration of the landing platform 110 between the first and second configurations, respectively).

The bases 164 are positioned at the ends 160 of the alignment brackets 152 and include openings 168 that are configured to receive fasteners 170 in order to connect (secure) the bases 164 to the fences 148.

The arms 166 extend laterally inward from the bases 164 (i.e., along the width W (FIG. 11) of the landing platform 110) and include openings 172, 174 and mounts 176, which are configured to receive fasteners 178, 180, 182, respectively, in order to connect (secure) the alignment members 124 (i.e., the alignment brackets 152) to the drive mechanism 128, as described in further detail below.

Figure 17:
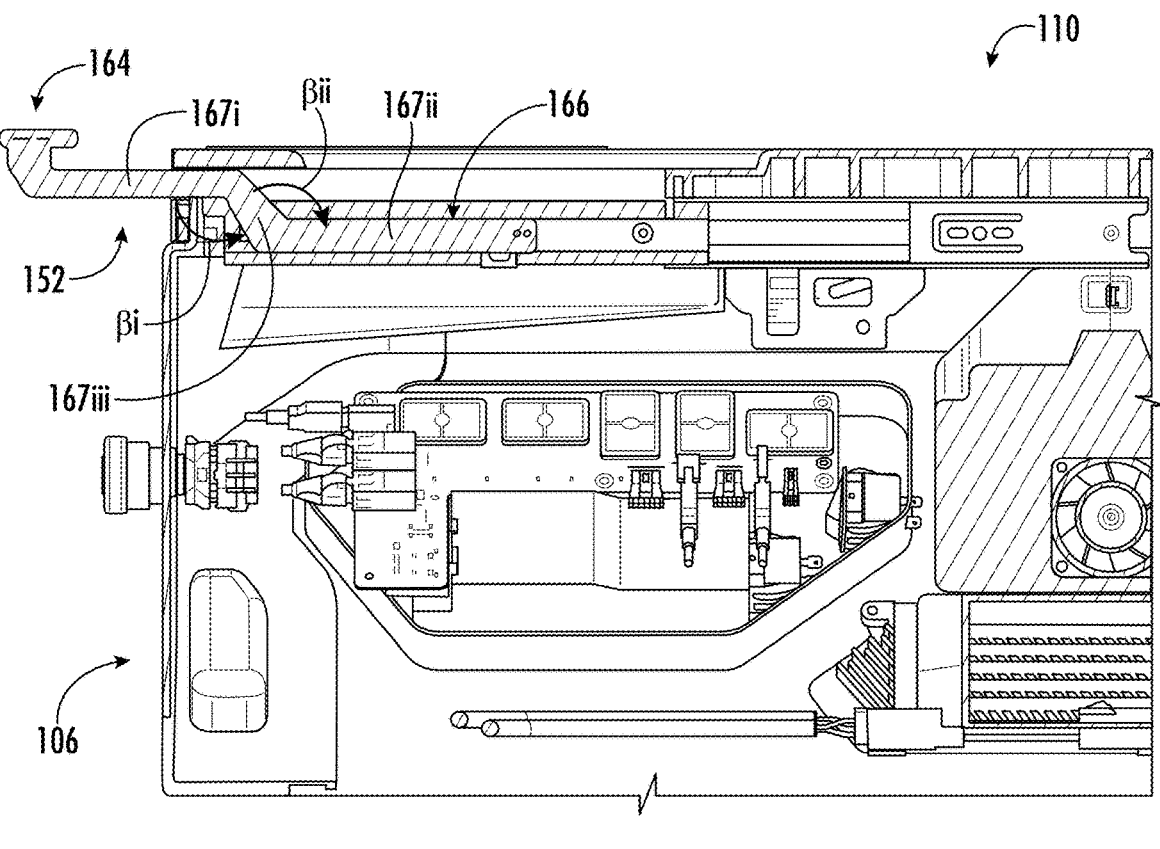
FIG. 17 is a partial, cross-sectional view of the base station.
Figure 18:
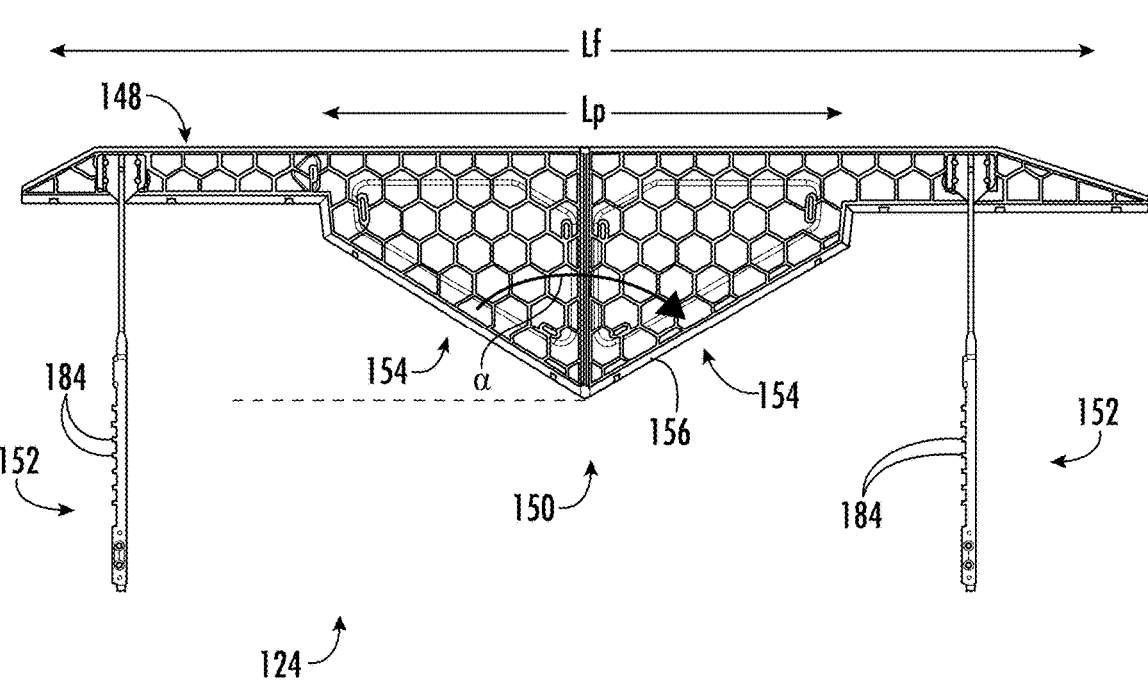
FIG. 18 is a bottom, plan view of one of the alignment members, each of which includes: a fence; a projection; and an alignment bracket.
Figure 19:
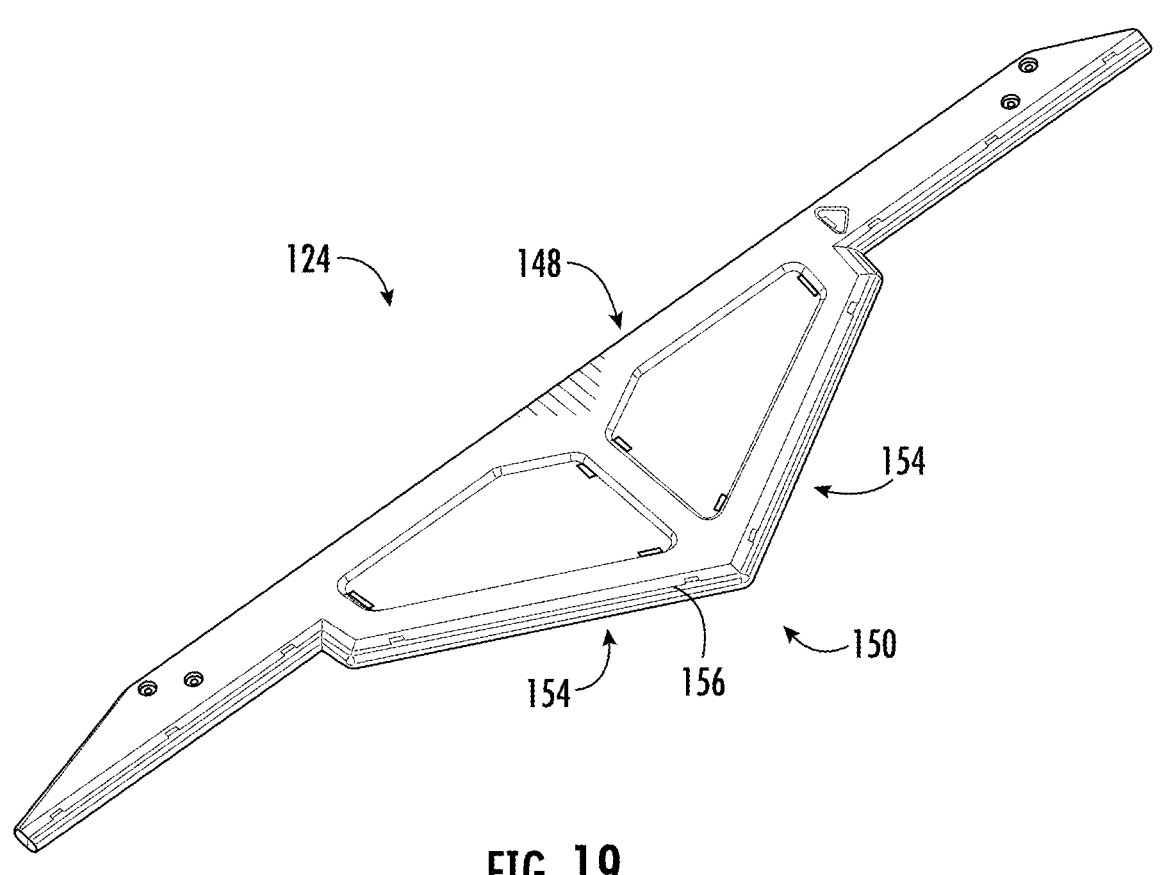
FIG. 19 is a partial, top, perspective view of one of the alignment members illustrating the fence and the projection.
Figure 20:
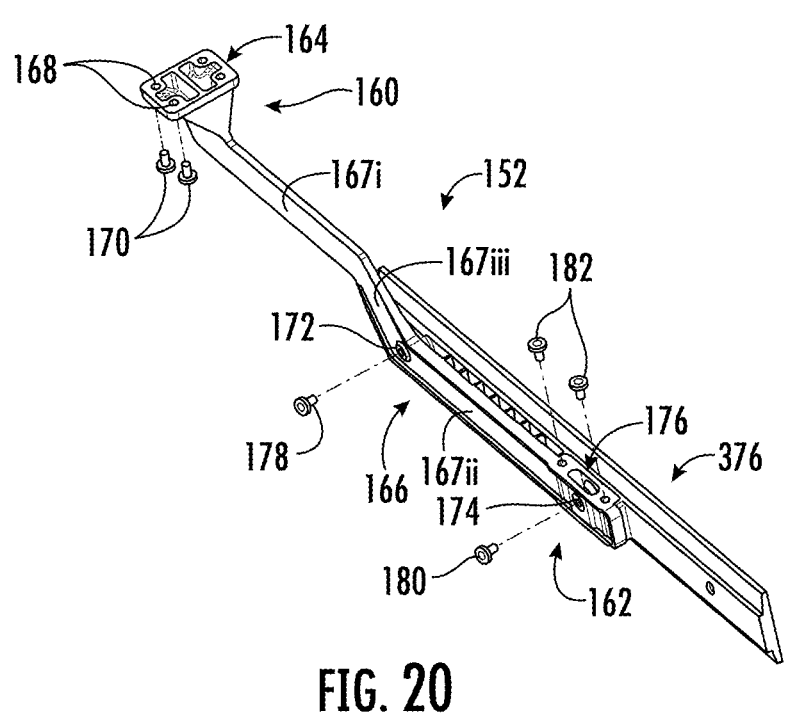
FIG. 20 is a partial, top, perspective view of one of the alignment members illustrating the alignment bracket.
Figure 21:
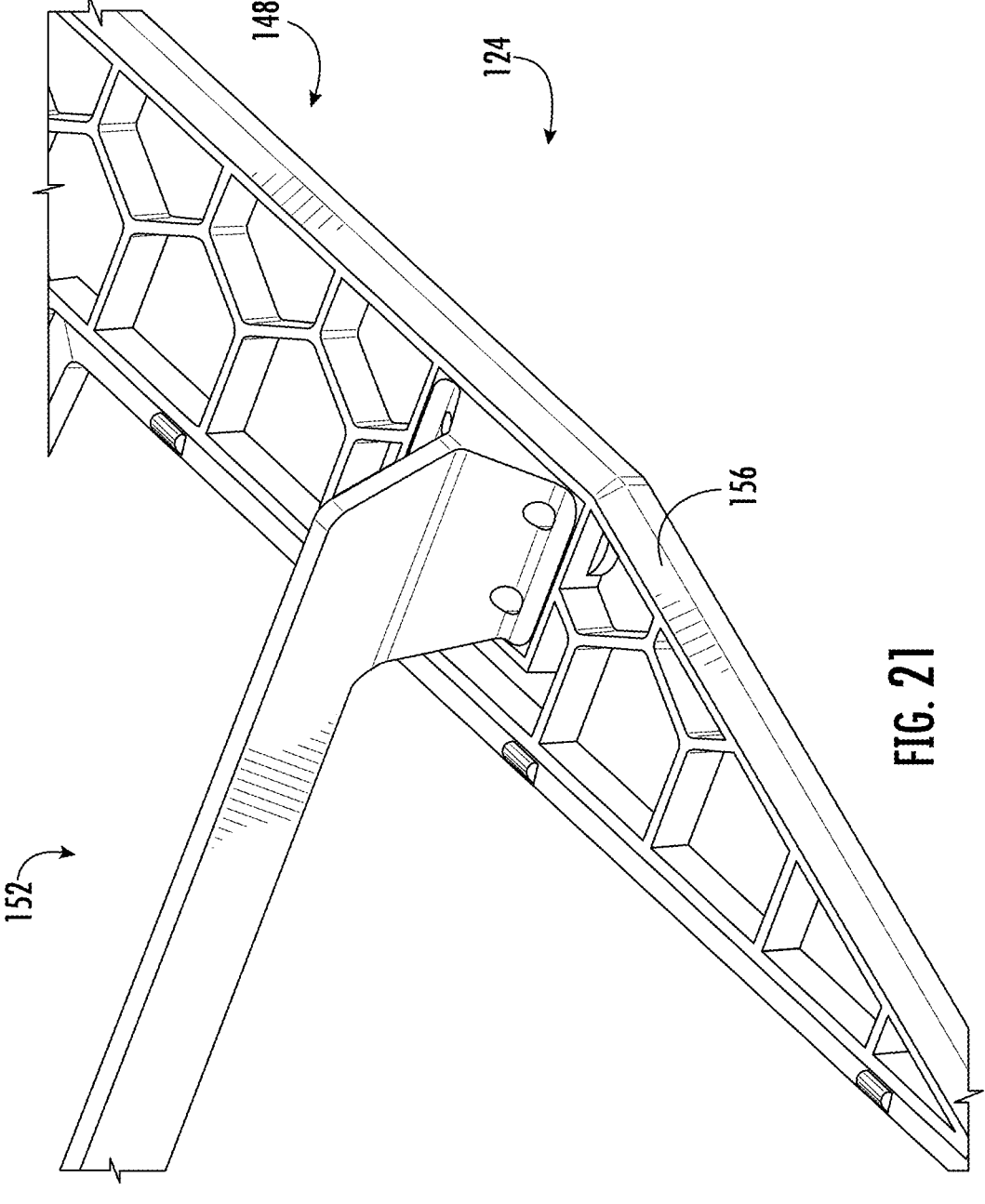
FIG. 21 is a partial, bottom, perspective view of one of the alignment members illustrating connection of the alignment bracket to the fence.

As seen in FIGS. 17 and 20, the arms 166 include: (first) sections 167i; (second) sections 167ii, which extend in generally parallel relation to the sections 167i and are vertically offset therefrom; and transitions 167iii, which extend between and connect the sections 167i, 167ii. The bases 164 are included (provided) on the sections 167i, and the mounts 176 are included (provided) on the sections 167ii.

In the illustrated embodiment, the arms 166 are configured such that the transitions 167iii subtend angles βi, βii (FIG. 17) with the sections 167i, 167ii, respectively, wherein the angles βi, βii lie substantially within the range of approximately 110 degrees to approximately 150 degrees. Embodiments in which the arms 166 may be configured such that either or both of the angles βi, βii lie outside of the disclosed range are also envisioned herein, however (e.g., depending upon the particular configuration of the stage 120, the drive mechanism 128, etc.).

Although shown as being approximately equivalent, embodiments in which the angles βi, βii may be nonequivalent are also envisioned herein.

In certain embodiments, it is envisioned that the alignment brackets 152 may further include fins 184 (FIG. 18) in order to facilitate drainage and the direction of water away from the drive mechanism 128. More specifically, the fins 184 are included (provided) on the sections 167ii and extend in a generally vertical orientation (i.e., such that the fins 184 extend in generally orthogonal (perpendicular) relation to the lengths of the sections 167ii).

With reference now to FIGS. 16 and 22-31, the drive mechanism 128 will be discussed. The drive mechanism 128 is positioned within the base 102 (i.e., the body 106) and is supported by the landing platform 110 such that the drive mechanism 128 is concealed by the landing platform 110 when the landing platform 110 is in the closed position. More specifically, the drive mechanism 128 is connected (secured) to the underside 146 of the landing platform 110 and to the alignment members 124, as described in further detail below, whereby the drive mechanism 128 indirectly connects the alignment members 124 to the stage 120.

The drive mechanism 128 interfaces with (i.e., is connected (secured) to) the alignment members 124 and is configured to facilitate repositioning thereof between the extended and retracted positions. The drive mechanism 128 includes: a motor assembly 186; a drive member 188; drive brackets 190; pulley assemblies 192; and slide assemblies 194.

The motor assembly 186 (FIG. 26) includes a motor 196, which is fixedly (i.e., immovably) and indirectly connected (secured) to the underside 146 of the landing platform 110 (i.e., the stage 120), and a motor shaft 198, which is connected (secured) to and extends from the motor 196. As described in further detail below, the motor assembly 186 drives the alignment members 124 via the drive member 188 and the drive brackets 190 to facilitate repositioning of the alignment members 124 between the extended and retracted positions.

The drive member 188 is positioned (located) vertically below (beneath) the landing platform 110 (i.e., the stage 120) and extends internally within the base station 100 (i.e., the body 106). The drive member 188 facilitates the transfer of power from the motor assembly 186 to the alignment members 124 and may include any structure(s) and component(s) suitable for that intended purpose.

In the illustrated embodiment, the drive member 188 includes a belt 200. Embodiments in which the particular configuration of the drive member 188 may be varied are also envisioned herein, however. For example, embodiments in which the drive member 188 may include a chain or the like are also envisioned herein.

The drive brackets 190 (FIG. 30) define (first and second) ends 202, 204 and extend between and connect the drive member 188 and the alignment members 124 (i.e., the alignment brackets 152) in order to facilitate the transfer of power from the motor assembly 186 to the alignment members 124 such that, upon actuation of the motor assembly 186, movement of the drive member 188 (i.e., advancement and retraction thereof) causes corresponding movement of the drive brackets 190 and the alignment members 124.

The ends 202 of the drive brackets 190 are connected (secured) to the drive member 188 and include: grooves 206; retainers 208 (FIGS. 23, 24); and openings 210.

The grooves 206 are recessed into the drive brackets 190 and are configured to receive the drive member 188 such that the drive member 188 extends into the drive brackets 190. More specifically, the grooves 206 extend in generally parallel relation to the width W (FIG. 11) of the landing platform 110 and the length of the drive member 188.

The retainers 208 extend between and connect the drive member 188 and the drive brackets 190. More specifically, the retainers 208 include (first) ends 212, which are connected (secured) to the drive member 188, and (second) ends 214, which are connected (secured) to the drive brackets 190 via fasteners 216 (FIG. 30) that extend into the openings 210 in order to connect the drive member 188 to the drive brackets 190. Upon assembly of the landing platform 110, the retainers 208 overlie the drive member 188 and span (i.e., extend across) the grooves 206, thereby maintaining the drive member 188 within the grooves 206 and securing the drive member 188 to the drive brackets 190.

The ends 204 of the drive brackets 190 include feet 218 and are connected (secured) to the alignment members 124, whereby the drive member 188 is operatively (e.g., indirectly) connected to the alignment members 124 via the drive brackets 190. The feet 218 are configured for engagement (contact) with the mounts 176 (FIG. 20) on the alignment brackets 152 and include openings 220, which are oriented in generally orthogonal (perpendicular) relation to the openings 210. The openings 220 are configured to receive the fasteners 182 (FIG. 20) such that the fasteners 182 extend through the drive brackets 190 and into the mounts 176.

Figure 30:
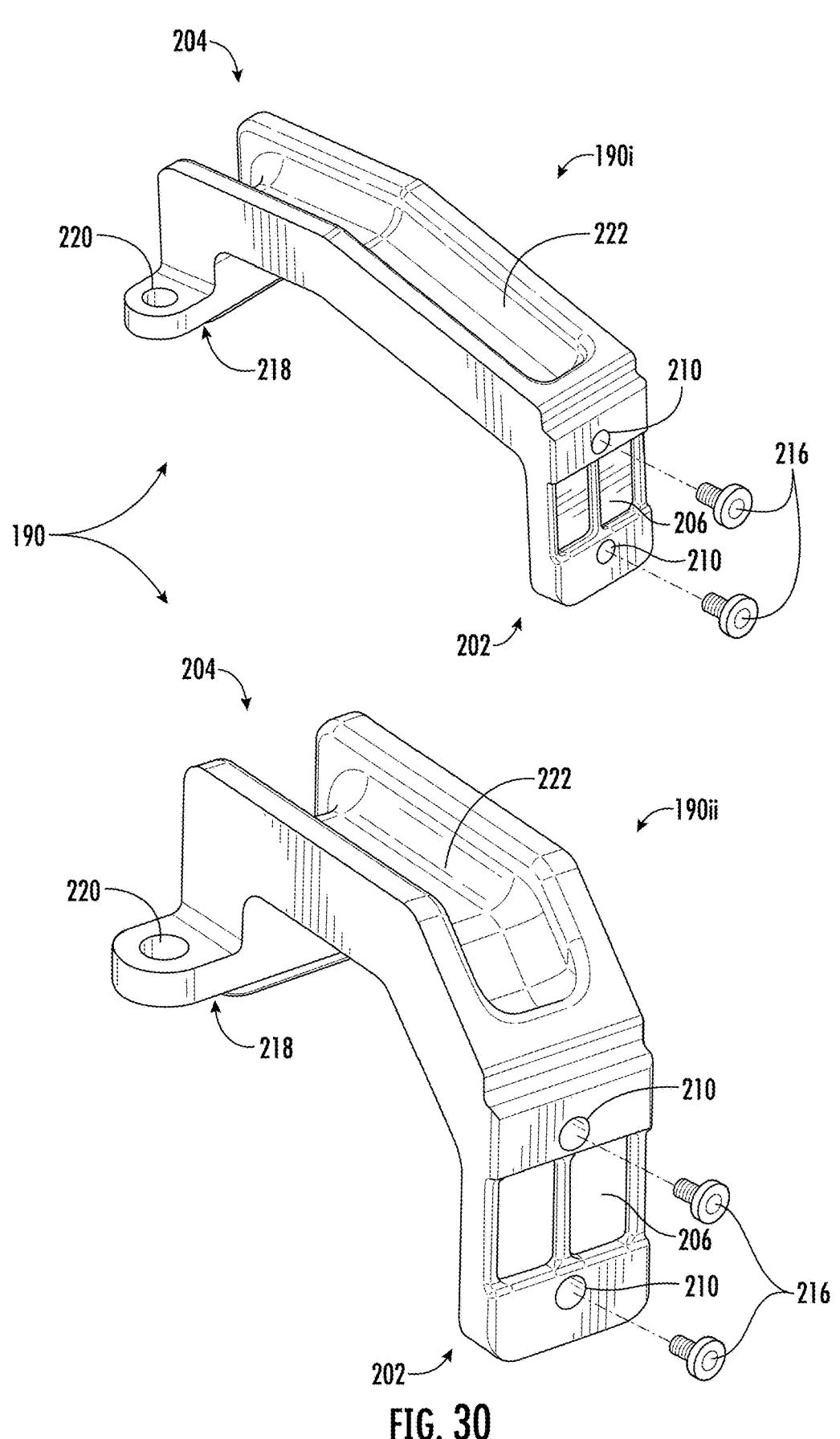
FIG. 30 is a bottom, perspective view of the drive brackets.
Figure 31:
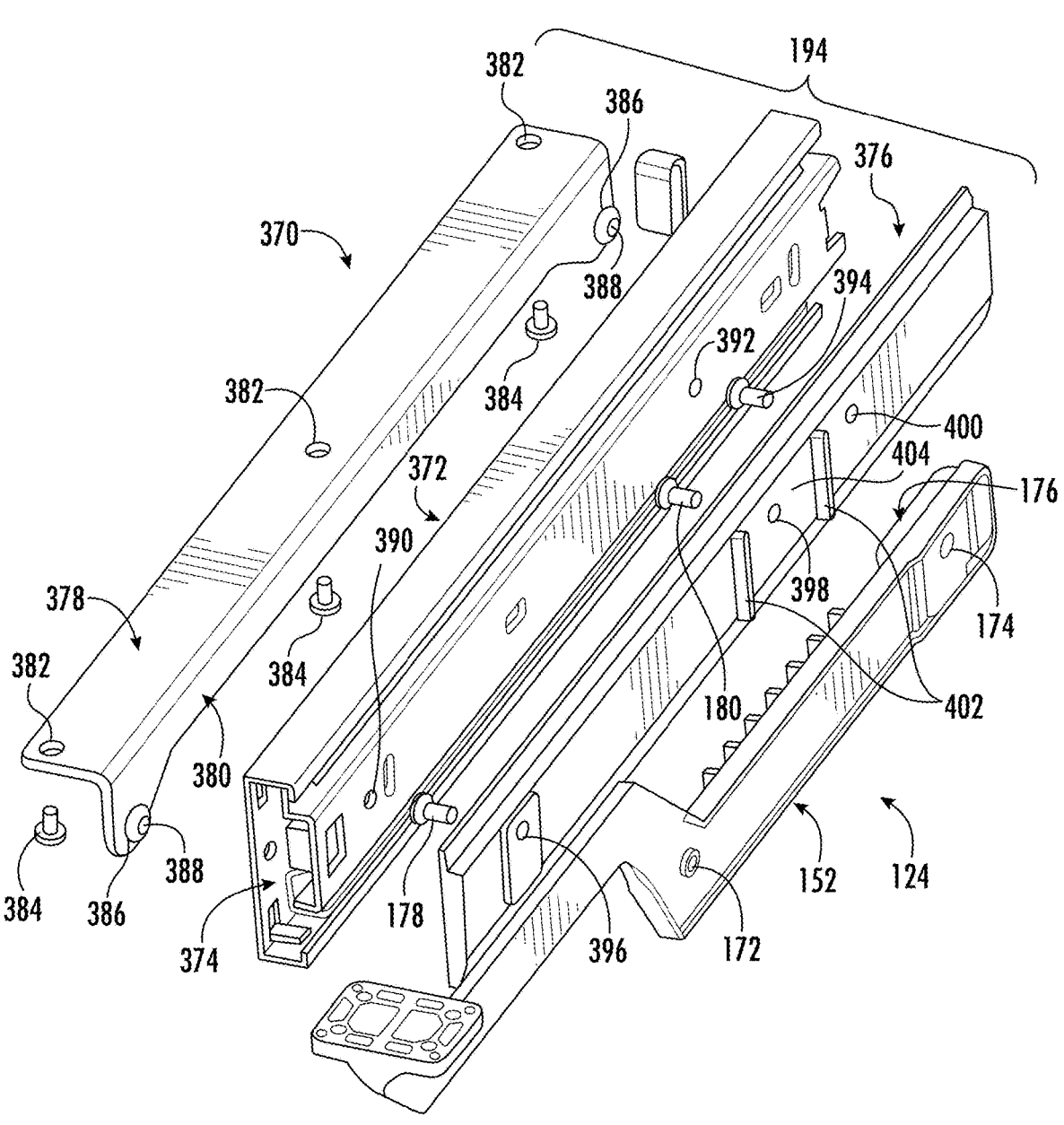
FIG. 31 is a top, perspective view of one of the slide assemblies shown with one of the alignment brackets.

In order to reduce the overall weight of the drive mechanism 128, in certain embodiments, it is envisioned that the drive brackets 190 may include reliefs 222, as seen in FIG. 30.

In the illustrated embodiment, the drive mechanism 128 includes (first) drive brackets 190i with first configurations and (second) drive brackets 190ii with second, different configurations. The differing configurations of the drive brackets 190i, 190ii are dictated by the specific locations (positions) thereof in relation to the alignment members 124 and the slide assemblies 194, packing concerns, etc. Embodiments in which each of the drive brackets 190 may be generally identical in configuration are also envisioned herein, however.

With reference now to FIGS. 16, 22, and 25-29 in particular, the pulley assemblies 192 will be discussed. The pulley assemblies 192 engage, support, and guide the drive member 188 to facilitate the transfer of power from the motor assembly 186 to the alignment members 124. The pulley assemblies 192 are connected (secured) to the underside 146 of the landing platform 110 (i.e., the stage 120) and are configured to apply both an axial and a lateral tension to the drive member 188, as described in further detail below.

The pulley assemblies 192 include: a (first) pulley assembly 224; a (second) pulley assembly 226; (third) pulley assemblies 228; and a (fourth) pulley assembly 230.

The pulley assembly 224 is connected (secured) to and extends between the motor assembly 186 and the landing platform 110 (i.e., the stage 120). The pulley assembly 224 includes a (first) frame 232 (FIG. 26) and a (first) pulley 234, which is rotatable about a (first) axis of rotation R1, and is non-adjustable in that configuration of the frame 232 and the axis of rotation R1 are both fixed (i.e., immovable) in relation to the frame 232.

The frame 232 includes: a base plate 236 and mounting brackets 238i, 238ii.

The base plate 236 defines a (central) aperture 240, which receives (accommodates) the motor shaft 198 and the pulley 234 such that the motor shaft 198 and the pulley 234 extend into the frame 232, and openings 242, which receive fasteners 244. The fasteners 244 extend through the base plate 236 and into the motor assembly 186 (i.e., the motor 196) to thereby fixedly (i.e., immovably) connect (secure) the base plate 236 to the motor assembly 186.

The mounting brackets 238i, 238ii extend vertically from the base plate 236 and respectively include flanges 246i, 246ii that define openings 248. The openings 248 receive fasteners 250, which extend through the flanges 246i, 246ii and into the underside 146 of the landing platform 110 (i.e., the stage 120), thereby directly connecting (securing) the pulley assembly 224 to the landing platform 110 and indirectly connecting (securing) the motor assembly 186 to the landing platform 110 via the pulley assembly 224.

In certain embodiments, it is envisioned that the frame 232 may include a visual indicator 252 (e.g., a notch 254) that provides a reference point in order to facilitate proper alignment and connection of the pulley assembly 224 and the motor assembly 186. Although shown as being included on the flange 246ii, it is envisioned that the visual indicator 252 may be positioned in any suitable location.

The pulley 234 engages (contacts) the drive member 188 such that the drive member 188 extends about the pulley 234. The pulley 234 is connected (secured) to the motor shaft 198 such that, upon actuation of the motor assembly 186, rotation of the motor shaft 198 in a first direction (e.g., clockwise) causes corresponding rotation of the pulley 234 about the axis of rotation R1, which is defined by the motor shaft 198, and, thus, advancement of the drive member 188, and rotation of the motor shaft 198 in a second direction (e.g., counterclockwise) causes corresponding rotation of the pulley 234 and, thus, retraction of the drive member 188. The pulley 234 thus supports, guides, and drives the drive member 188 in order to maintain tension in and apply force to the drive member 188 so as to facilitate advancement and retraction thereof.

The pulley assembly 226 is connected (secured) to the landing platform 110 (i.e., the stage 120) and is positioned adjacent to the motor assembly 186 and the pulley assembly 224. The pulley assembly 226 includes: a (second) frame 256; pulley shafts 258, which define (second) axes of rotation R2; (second) pulleys 260; and (one or more) at least one biasing member 262. The pulley assembly 226 is adjustable in that the axes of rotation R2 are laterally movable, as described in further detail below.

The frame 256 includes openings 264 and slots 266.

The openings 264 receive fasteners 268 such that the fasteners 268 extend through the frame 256 and into the underside 146 of the landing platform 110 (i.e., the stage 120), thereby directly connecting (securing) the pulley assembly 226 to the landing platform 110.

The slots 266 extend in generally orthogonal (perpendicular) relation to the length of the drive member 188 and the width W (FIG. 11) of the landing platform 110 and in generally parallel relation to the depth D of the landing platform 110. The slots 266 receive the pulley shafts 258 such that the pulley shafts 258 extend into and through the frame 256 via the slots 266, which facilitates connection of the biasing member(s) 262 to the pulley shafts 258 as well as lateral adjustment (movement, repositioning) of the pulley shafts 258 and, thus, the pulleys 260 and the axes of rotation R2, in relation to the frame 256.

The pulleys 260 engage (contact) the drive member 188 such that the drive member 188 extends therebetween whereby movement (repositioning) (i.e., advancement and retraction) of the drive member 188 causes corresponding rotation of the pulleys 260 in relation to the frame 256 about the axes of rotation R2. The pulleys 260 thus support and guide the drive member 188 in order to maintain the tension therein.

The pulleys 260 are connected (secured) to the pulley shafts 258, which facilities lateral movement (repositioning) of the pulleys 260 in relation to the frame 256 via movement of the pulley shafts 258 within the slots 266. Adjusting the lateral positions of the pulleys 260 applies a lateral force and a lateral (first) tension TL (FIG. 25) to the drive member 188, which are oriented in a direction that is generally orthogonal (perpendicular) in relation to the length of the drive member 188, and allows for variation in the lateral tension TL. Varying the lateral tension TL facilitates fine adjustments in the overall tension in the drive member 188 and proper engagement of the drive member 188 and the pulley assemblies 192.

The biasing member(s) 262 extend in generally orthogonal (perpendicular) relation to the length of the drive member 188. The biasing member(s) 262 include opposite ends 270, 272 that engage (contact) or are otherwise connected (secured) to the pulley shafts 258 such that the biasing member(s) 262 extend between the pulley shafts 258. The biasing member(s) 262 apply a lateral approximation force to the pulley shafts 258 that biases the pulley shafts 258 and, thus, the pulleys 260 laterally inward (i.e., towards each other and in generally orthogonal (perpendicular) relation to the length of the drive member 188) and into engagement (contact) with the drive member 188 so as to apply the aforementioned lateral tension TL thereto.

In order to increase or decrease the lateral approximation force and, thus, the lateral tension TL applied to the drive member 188, it is envisioned that the specific configuration(s) of the biasing member(s) 262 (e.g., the spring constant(s) thereof) may be varied.

In the illustrated embodiment, the ends 270, 272 of the biasing member(s) 262 include eyelets 274 that receive the pulley shafts 258 such that the pulley shafts 258 extend through the eyelets 274. It is envisioned, however, that the biasing member(s) 262 may engage and/or receive the pulley shafts 258 in any manner suitable for the intended purpose of facilitating the application of force thereto in the manner described herein.

In the illustrated embodiment, the pulley assembly 226 includes a pair of biasing members 262. It is envisioned, however, that the specific number of biasing members 262 may be varied in alternate embodiments. For example, an embodiment of the pulley assembly 226 that includes a single biasing member 262 is also envisioned herein.

Additionally, while the biasing members 262 are each illustrated as a coil spring 276, it is envisioned that the biasing members 262 may include any structure and components suitable for the intended purpose of applying the lateral tension TL to the pulleys 260 in the manner described above.

The pulley assemblies 228 are connected (secured) to the landing platform 110 (i.e., the stage 120) and are positioned (located) between the pulley assembly 226 and the pulley assembly 230. The pulley assemblies 228 are generally identical in configuration and each include: a (third) frame

278; pulley shafts 280, which define (third) axes of rotation R3; (third) pulleys 282; and a spacer 284. The pulley assemblies 228 are non-adjustable in that the axes of rotation R3 are fixed (i.e., immovable) in relation to the frame 278.

Although shown as including a pair of pulley assemblies 228, it is envisioned that the specific number of pulley assemblies 228 may be varied in alternate embodiments of the landing platform 110. For example, an embodiment of the landing platform 110 that includes a single pulley assembly 228 is also envisioned herein as are embodiments that include three or more pulley assemblies 228.

The frame 278 includes: (upper, first and lower, second) frame portions 286, 288, which extend in generally parallel relation; a backspan 290, which connects the frame portions 286, 288; openings 292; openings 294; and an opening 296.

The openings 292 receive fasteners 298 such that the fasteners 298 extend through the frame 278 and into the underside 146 of the landing platform 110 (i.e., the stage 120), thereby directly connecting (securing) the pulley assemblies 228 to the landing platform 110.

The openings 294 receive the pulley shafts 280 such that the pulley shafts 280 extend into and through the frame 278 via the openings 294. Reception (positioning) of the pulley shafts 280 within the openings 294 inhibits (if not entirely prevents) lateral movement of the pulley shafts 280 and, thus, the pulleys 282, in relation to the frame 278 such that the pulleys 282 are laterally fixed (i.e., immovable) in relation the frame 278.

The opening 296 extends through the frame portion 288 and receives a fastener 300 such that the fastener 300 extend through the frame portion 286 and into the spacer 284, thereby connecting (securing) the spacer 284 to the frame 278.

The pulleys 282 are connected (secured) to the pulley shafts 280 and engage the drive member 188 such that the drive member 188 extends about the pulleys 282 whereby movement (repositioning) of the drive member 188 causes corresponding rotation of the pulleys 282 in relation to the frame 278 about the axes of rotation R3. The pulleys 282 thus support and guide the drive member 188 in order to maintain the tension therein.

The spacer 284 is positioned (located) internally within the frame 278 (i.e., between the frame portions 286, 288) and is generally aligned with the opening 296. The spacer 284 maintains the configuration of the frame 278 by inhibiting (if not entirely preventing) deflection (e.g., cantilevering) of the frame portions 286, 288 and, thus, interference with rotation of the pulleys 282.

It is envisioned that the spacer 284 may be connected (secured) to the frame 278 in any suitable manner. For example, in the illustrated embodiment, the spacer 284 includes a (first, upper) end 302 that engages (contacts) the frame portion 286 in a snap (pressure) fit and a (second, lower) 304 with an opening 306 that receives the fastener 300 such that the fastener 300 extends into and connects the end 304 of the spacer 284 to the frame portion 288.

Figure 22:
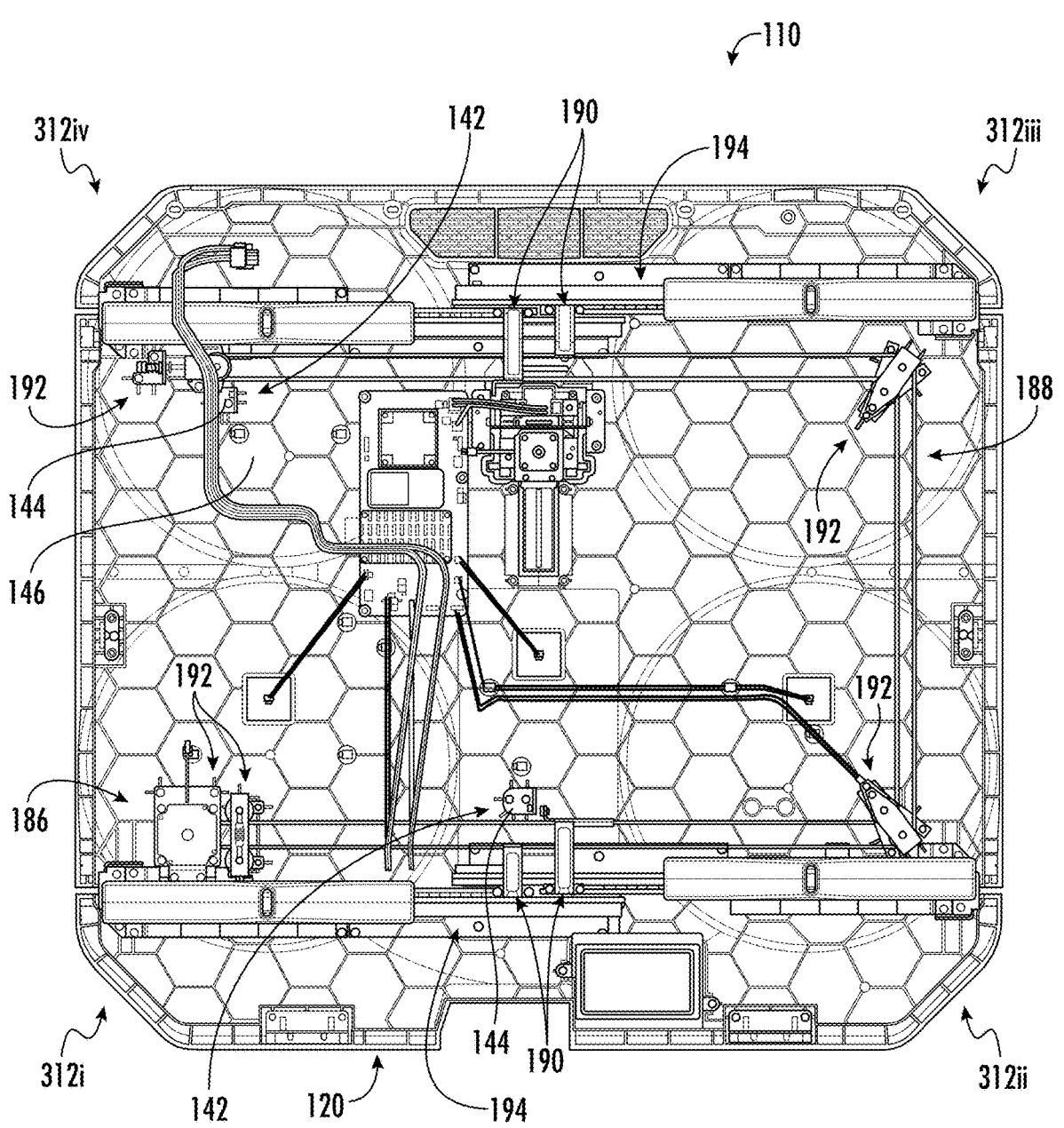
FIG. 22 is a bottom, plan view of the landing platform and the drive mechanism, which includes: a motor assembly; a drive member; drive brackets; pulley assemblies; and slide assemblies.
Figure 23:
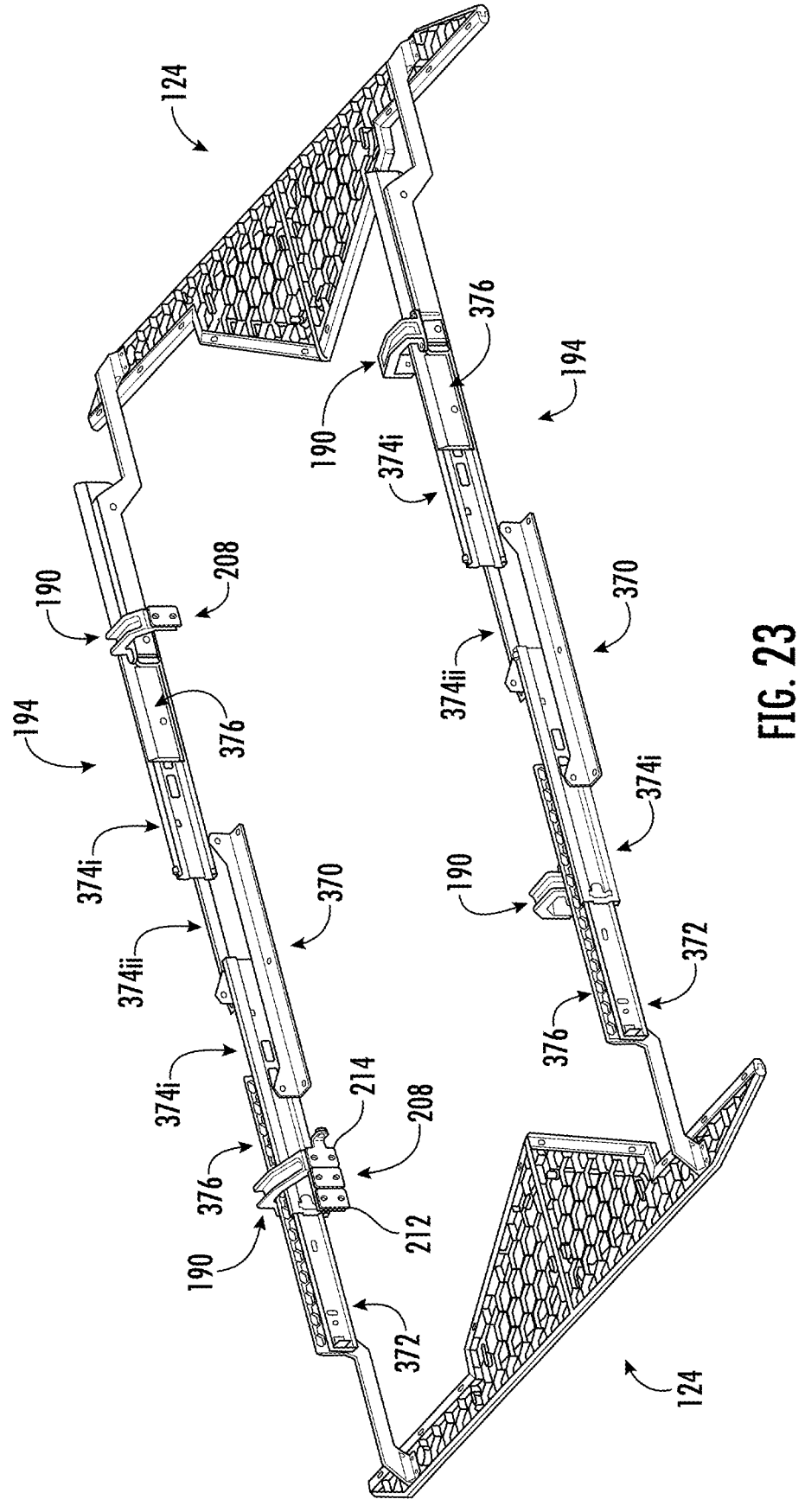
FIG. 23 is a partial, bottom, perspective view of the landing platform and the drive mechanism illustrating the alignment members, the drive brackets, and the slide assemblies with the alignment members shown in the extended position.
Figure 24:
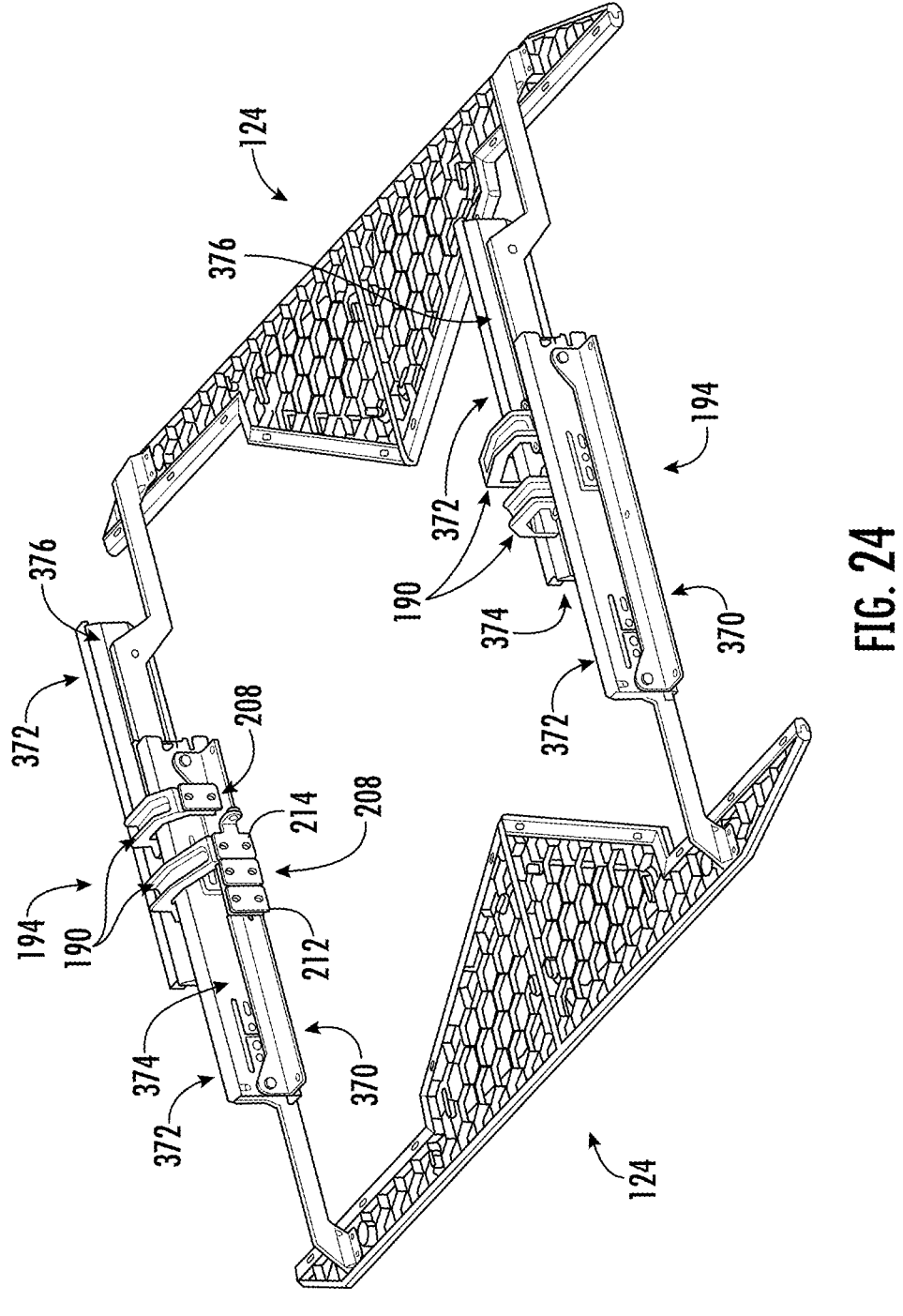
FIG. 24 is a partial, bottom, perspective view of the landing platform and the drive mechanism illustrating the alignment members, the drive brackets, and the slide assemblies with the alignment members shown in the retracted position.
Figure 25:
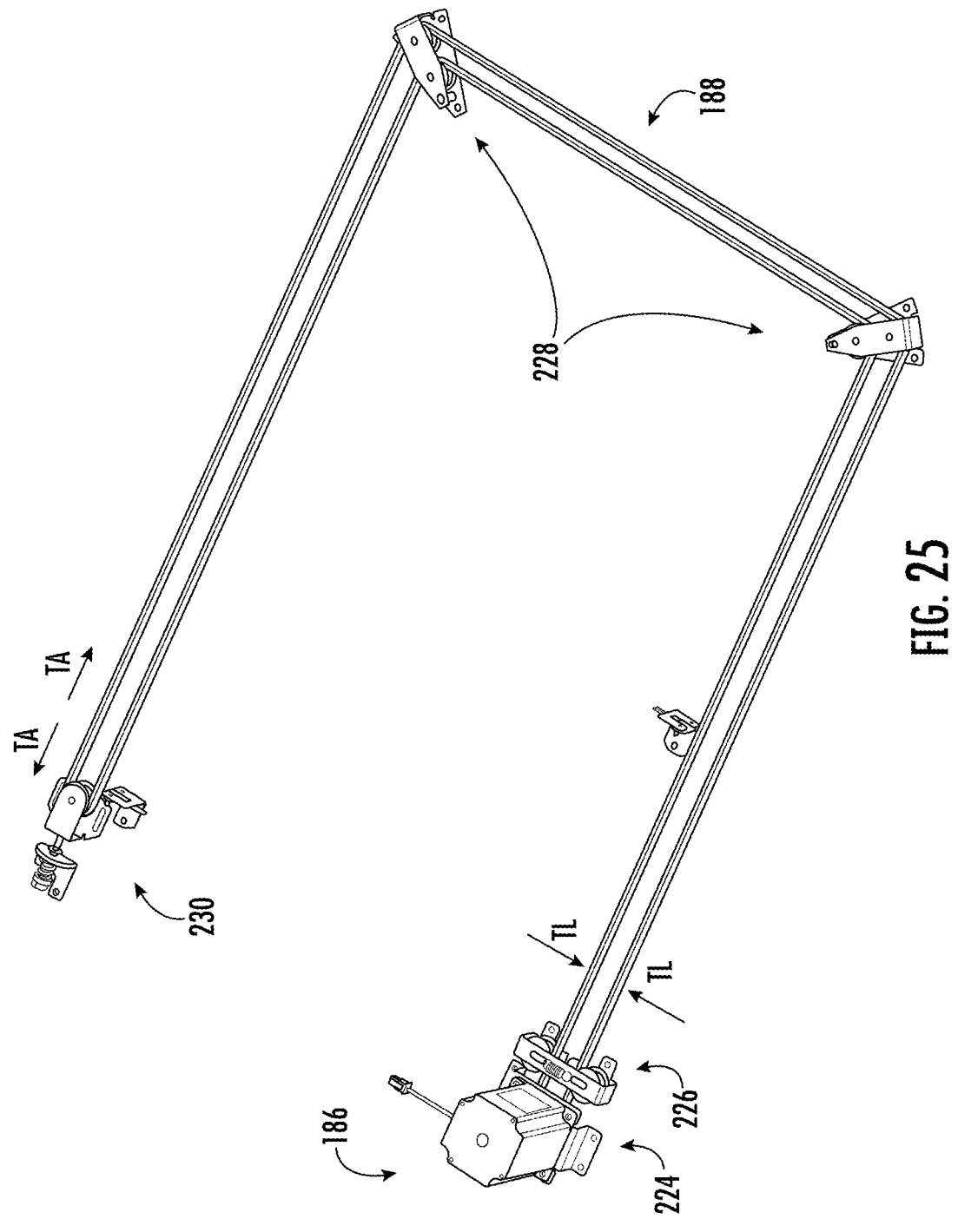
FIG. 25 is a bottom, perspective view of the drive mechanism illustrating a first pulley assembly, a second pulley assembly, a pair of third pulley assemblies, and a fourth pulley assembly.
Figure 26:
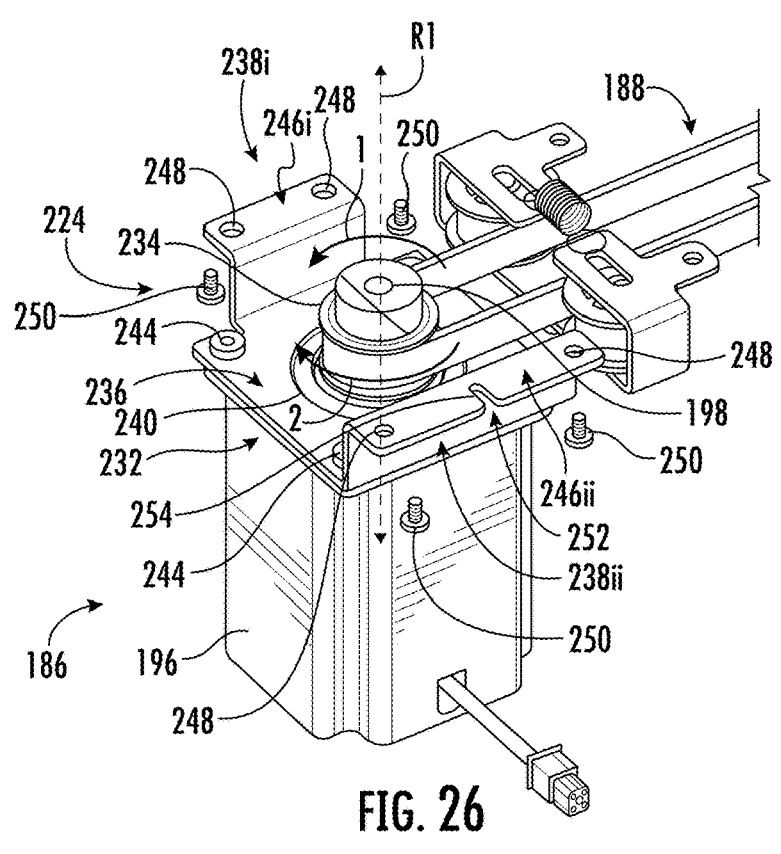
FIG. 26 is a top perspective view of the first pulley assembly and the second pulley assembly shown with the drive member.
Figure 27:
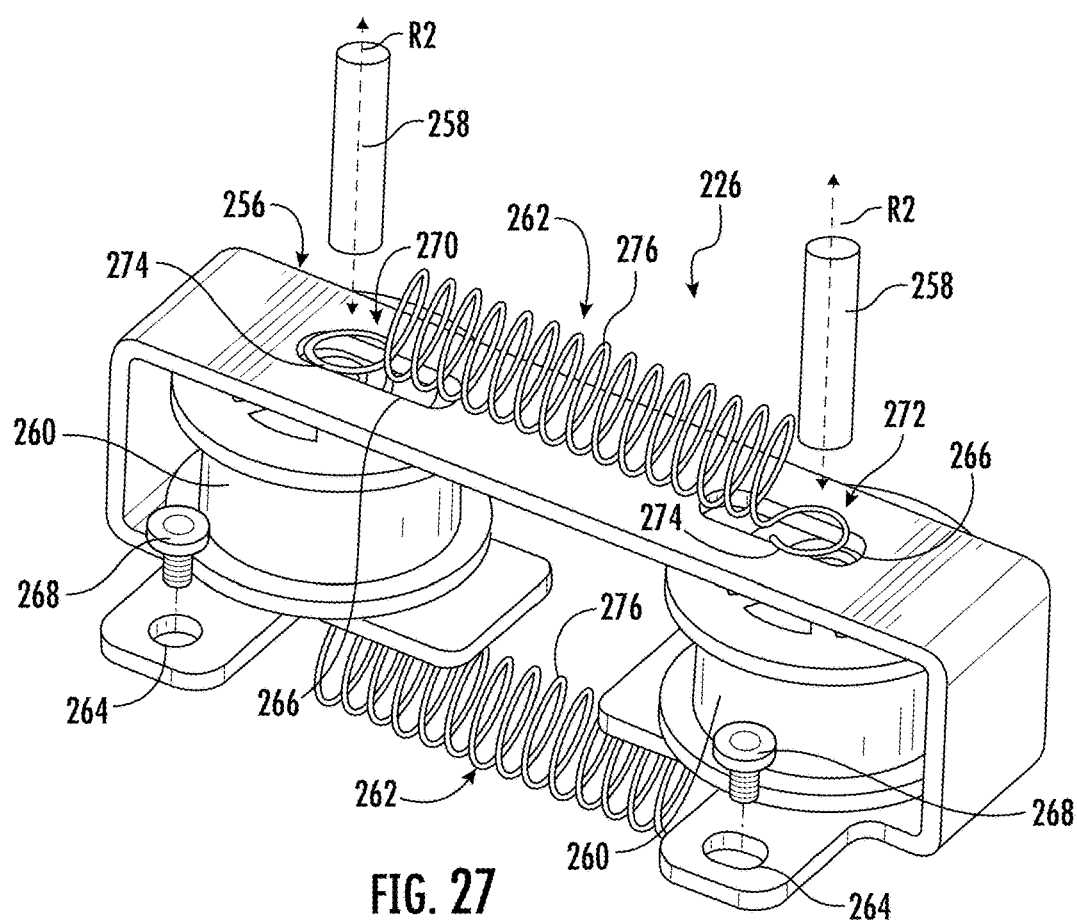
FIG. 27 is a bottom, perspective view of the second pulley assembly.
Figure 28:
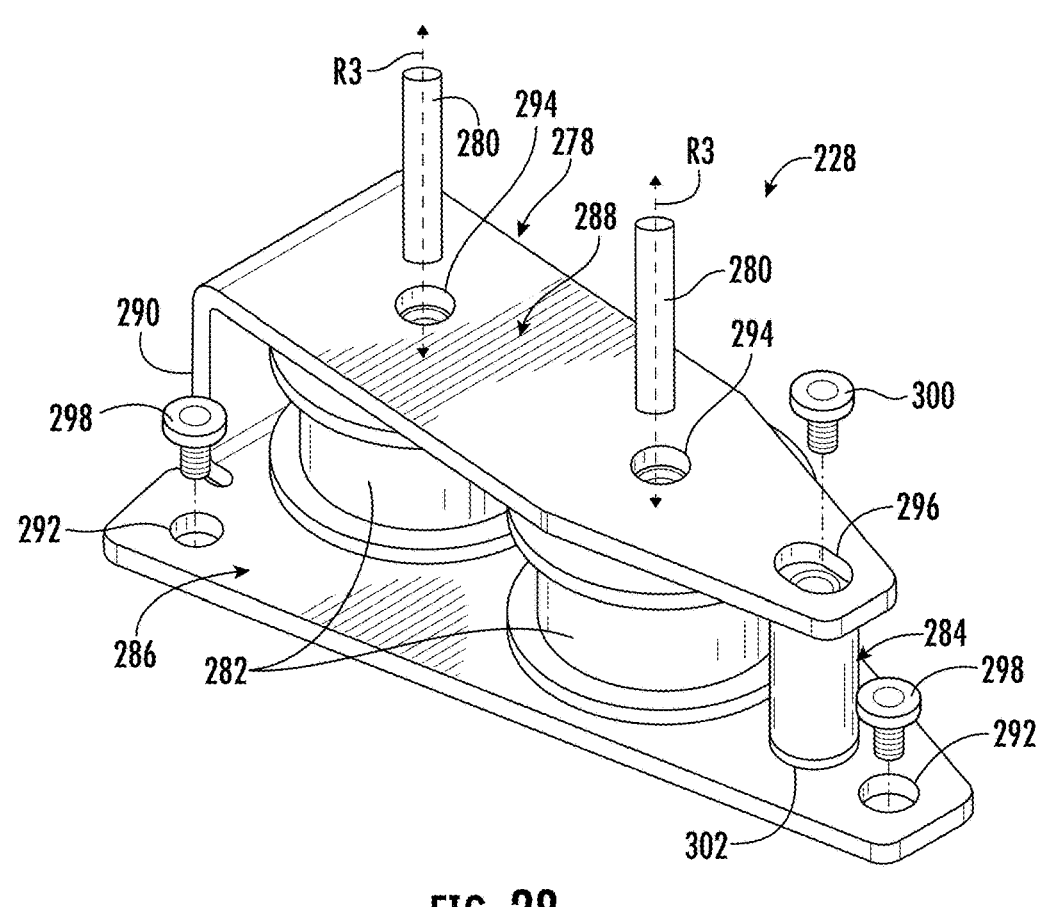
FIG. 28 is a bottom, perspective view of one of the third pulley assemblies.
Figure 29:
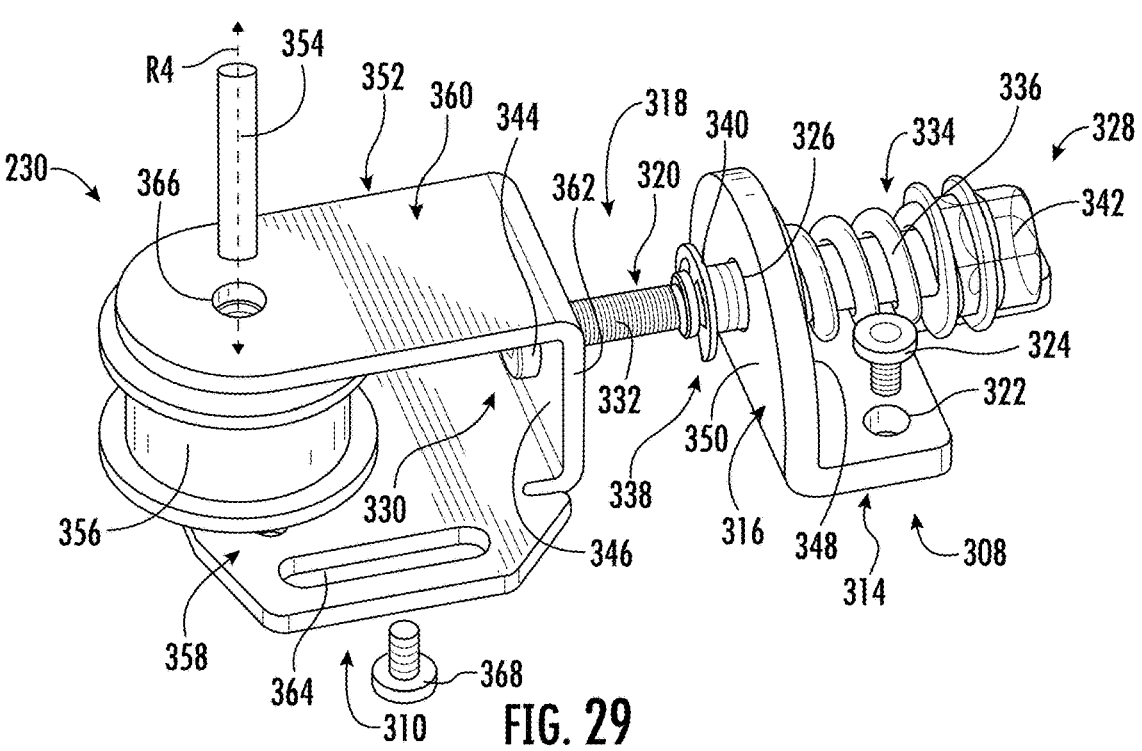
FIG. 29 is a bottom, perspective view of the fourth pulley assembly.

The pulley assembly 230 is connected (secured) to the landing platform 110 (i.e., the stage 120) and includes a (first, fixed) bracket 308 and a (second, movable) bracket 310. More specifically, the pulley assembly 230 is positioned such that the pulley assemblies 192 are arranged in a generally rectangular orientation, as seen in FIG. 22, with the pulley assemblies 224, 226 being generally positioned (located) in a (first) corner section 312*i* of the landing platform 110, the pulley assemblies 228 being generally positioned (located) in (second and third) corner sections 312*ii*, 312*iii* of the landing platform 110, and the pulley assembly 230 being generally positioned (located) in a (fourth) corner section 312iv of the landing platform 110.

The pulley assembly 230 is adjustable in that the bracket 310 is repositionable (movable, slidable) in relation to the bracket 308 to expand and compress the pulley assembly 230 and thereby reconfigure the pulley assembly 230 between expanded and compressed configurations. Expansion and compression of the pulley assembly 230 applies an axial force and an axial (second) tension TA (FIG. 25) to the drive member 188, which are oriented in a direction that is generally parallel in relation to the length of the drive member 188 and in generally orthogonal (perpendicular) relation to the lateral tension TL, and allows for variation in the axial tension TA. More specifically, during compression of the pulley assembly 230, the brackets 308, 310 are approximated (i.e., via movement of the bracket 310 towards the bracket 308), which applies and increases the axial tension TA in the drive member 188, thereby tightening the drive member 188, and during expansion of the pulley assembly 230, the brackets 308, 310 are separated (i.e., via movement of the bracket 310 away from the bracket 308), which decreases the axial tension TA in the drive member 188, thereby loosening the drive member 188. Altering the positions of the brackets 308, 310 thus allows the axial tension TA in the drive member 188 to be varied in order to allow for coarse adjustments in the overall tension in the drive member 188 and proper engagement of the drive member 188 and the pulley assemblies 192.

The bracket 308 is generally L-shaped in configuration and includes a (first) leg 314; a (second) leg 316; and an adjustment member 318 (e.g., a set screw 320 or other such fastener).

The leg 314 includes openings 322 that receive fasteners 324 such that the fasteners 324 extend through the bracket 308 and into the underside 146 of the landing platform 110 (i.e., the stage 120), thereby directly and fixedly (i.e., immovably) connecting (securing) the bracket 308 to the landing platform 110.

The leg 316 extends in generally orthogonal (perpendicular) relation to the leg 314 and includes an opening 326 that receives the adjustment member 318 such that the adjustment member 318 extends through the bracket 308.

The adjustment member 318 extends between and connects the brackets 308, 310 and includes: a (first) end 328; a (second) end 330; a shaft 332; a biasing member 334 (e.g., a coil spring 336); and a retention member 338 (e.g., a c-clip 340 or the like).

The end 328 of the adjustment member 318 includes a head 342, which is configured for engagement by a user, either manually or via a tool, to facilitate rotation of the adjustment member 318 in relation to the brackets 308, 310 and, thus, approximation and separation of the brackets 308, 310 (i.e., via axial repositioning of the bracket 310) in order to expand and compress the pulley assembly 230 and thereby apply and vary the axial tension TA (FIG. 25) in the drive member 188.

The end 330 of the adjustment member 318 extends into the bracket 310 and includes an anchor 344. The anchor 344 is configured for engagement (contact) with an inner surface 346 of the bracket 310 in order to inhibit (if not entirely prevent) inadvertent removal of the adjustment member 318 from the bracket 310.

The shaft 332 extends between the ends 328, 330 of the adjustment member 318 in generally parallel relation to the length of the drive member 188. The shaft 332 threadably engages (contacts) the bracket 310 such that rotation of the adjustment member 318 adjusts the relative positions (locations) of the brackets 308, 310 (i.e., the position (location) of the bracket 310 in relation to the bracket 308). More specifically, rotation of the adjustment member 318 in a first direction (e.g., clockwise) causes approximation of the brackets 308, 310 (i.e., movement of the bracket 310 towards the bracket 308), thereby compressing the pulley assembly 230 so as to increase the axial tension TA (FIG. 25) in the drive member 188, and rotation of the adjustment member 318 in a second direction (e.g., counterclockwise) causes separation of the brackets (i.e., movement of the bracket 310 away from the bracket 308), thereby expanding the pulley assembly 230 so as to decrease the axial tension TA in the drive member 188.

The biasing member 334 is supported by and extends about the shaft 332 such that the biasing member 334 extends in generally parallel relation to the length of the drive member 188. More specifically, the biasing member 334 is positioned between the head 342 and an inner surface 348 of the leg 316 of the bracket 308 such that rotation of the adjustment member 318 in the first direction cause compression of the biasing member 262, thereby creating a biasing force that acts upon the bracket 308 and the adjustment member 318 to thereby bias the pulley assembly 230 towards the expanded configuration, and rotation of the adjustment member 318 in the second direction allows for expansion of the biasing member 334 as the brackets 308, 310 are separated during expansion of the pulley assembly 230.

Although illustrated as the aforementioned coil spring 336 in the illustrated embodiment, it is envisioned that the biasing member 334 may include any structure and components suitable for the intended purpose of applying force to the adjustment member 318 in the manner described above.

The retention member 338 is supported by the shaft 332 and is positioned (located) between the brackets 308, 310. The retention member 338 is configured for engagement (contact) with an outer surface 350 of the leg 316 to limit travel of the adjustment member 318 in relation thereto during rotation of the adjustment member 318 in the second direction (i.e., during expansion of the pulley assembly 230), thereby inhibiting (if not entirely preventing) inadvertent removal of the adjustment member 318 from the bracket 308.

The bracket 310 includes: a (fourth) frame 352; a pulley shaft 354, which defines a (fourth) axis of rotation R4; and a (fourth) pulley 356.

The frame 352 includes: (upper, first and lower, second) frame portions 358, 360, which extend in generally parallel relation; a backspan 362, which connects the frame portions 358, 360; slots 364; and openings 366.

The slots 364 extend in generally parallel relation to the length of the drive member 188 and the depth width W (FIG. 11) of the landing platform 110 and in generally orthogonal (perpendicular) relation to the depth D of the landing platform 110. The slots 364 receive fasteners 368 such that the fasteners 368 extend through the frame 352 and into the underside 146 of the landing platform 110 (i.e., the stage 120). Reception (positioning) of the fasteners 368 within the slots 364 movably connects (secures) the bracket 310 to the landing platform 110 and facilitates axial movement (repositioning) of the bracket 310 in relation to the bracket 308 and the landing platform 110 as the pulley assembly 230 is compressed and expanded, during which, the fasteners 368 move axially through the slots 364.

The openings 366 receive the pulley shaft 354 such that the pulley shaft 354 extends into and through the frame 352 via the openings 366. Reception (positioning) of the pulley shaft 354 within the openings 366 inhibits (if not entirely prevents) lateral movement of the pulley shaft 354 and, thus, the pulley 356, in relation to the frame 352 such that the pulley 356 and the axis rotation R4 are laterally fixed (i.e., immovable) in relation the frame 352.

The pulley 356 is connected (secured) to the pulley shaft 354 and engages (contacts) the drive member 188 such that the drive member 188 extends about the pulley 356 whereby movement (repositioning) of the drive member 188 causes corresponding rotation of the pulley 356 in relation to the frame 352 about the axis of rotation R4. The pulley 356 thus supports and guides the drive member 188 in order to maintain the tension therein.

With reference now to FIGS. 16, 23, 24, and 31, the slide assemblies 194 will be discussed. The slide assemblies 194 are connected (secured) to and extend between the landing platform 110 (i.e., the stage 120) and the alignment members 124 so as to support the alignment members 124 and facilitate repositioning thereof between the extended and retracted positions and, thus, reconfiguration of the landing platform 110 between the first and second configurations.

The slide assemblies 194 include: slide brackets 370; guides 372; slide members 374; and (splash) guards 376.

The slide brackets 370 are connected (secured) to the landing platform 110 and support the guides 372, the slide members 374, and the guards 376. The slide brackets 370 are generally L-shaped in configuration and include (first and second) legs 378, 380, which extend in generally orthogonal (perpendicular) relation.

The legs 378 include openings 382, which receive fasteners 384 such that the fasteners 384 extend through the legs 378 and into the underside 146 of the landing platform 110 (i.e., the stage 120), thereby directly connecting (securing) the slide brackets 370 and, thus, the slide assemblies 194 to the landing platform 110.

The legs 380 include openings 386, which are oriented in generally orthogonal (perpendicular) relation to the openings 382 and receive fasteners 388 such that the fasteners 388 extend through the guides 372 and into the legs 380. The fasteners 388 thus directly and fixedly (i.e., immovably) connect (secure) the guides 372 to the slide brackets 370 so as to inhibit (if not entirely prevent) relative movement therebetween.

The guides 372 connect the slide members 374 to the slide brackets 370 and support the slide members 374. More specifically, the guides 372 support the slide members 374 such that the slide members 374 are axially repositionable (movable) in relation thereto during extension and retraction of the alignment members 124, as described in further detail below.

In certain embodiments, it is envisioned that the guides 372 and/or the slide members 374 may include (one or more) at least one stop in order to limit relative (axial) movement between the guides 372 and the slide members 374 (i.e., movement of the slide members 374 in relation to the guides 372).

The slide members 374 include openings 390, 392 and are connected (secured) to and extend between the guides 372 and the guards 376 and the alignment members 124, thereby connecting the guards 376 and the alignment members 124 to the guides 372 such that the guards 376 and the alignment members 124 are movable (repositionable) in relation thereto.

The openings 390 receive the fasteners 178 such that the fasteners 178 extend through the slide members 374, through the guards 376, and into the alignment members 124. The fasteners 178 directly and fixedly (i.e., immovably)

connect (secure) the slide members 374 to the guards 376 and the alignment members 124 so as to inhibit relative movement therebetween such that movement of the alignment members 124 (i.e., extension and retraction thereof) causes corresponding movement of the slide members 374 and the guides 372.

The openings 392 receive fasteners 394 such that the fasteners 394 extend through the slide members 374 and into the guards 376. The fasteners 394 directly and fixedly (i.e., immovably) connect (secure) the slide members 374 to the guards 376 so as to inhibit relative movement therebetween such that the guards 376 move concomitantly (simultaneously) with the slide members 374.

In the illustrated embodiment, each of the slide assemblies 194 includes (first and second) slide members 374i, 374ii (FIG. 23) that are connected (secured) together so as to facilitate relative movement therebetween (e.g., via ball bearings and races, etc.). More specifically, in the illustrated embodiment, the slide member 374ii is nested within (received by) the slide member 374i such that the slide member 374ii is axially repositionable (slidable) in relation thereto, which facilitates telescopic extension and retraction of the slide assemblies 194. Embodiments of the slide assemblies 194 that include a single slide member 374 are also envisioned herein, however.

The guards 376 conceal (cover) the slide members 374 in order to protect the slide members 374 from water and/or debris, and thereby maintain the functionality (e.g., axial movement) thereof. More specifically, the guards 376 are positioned (located) between the slide members 374 and the alignment members 124 (i.e., the alignment brackets 152).

The guards 376 are non-metallic in construction (e.g., are formed from polycarbonate) and include: (first) openings 396, which receive the fasteners 178; (second) openings 398, which receive the fasteners 180; (third) opening 400, which receive the fasteners 394; and ribs 402.

The openings 398 receive the fasteners 180 such that the fasteners 180 extend through the guards 376 and into the alignment members 124 (i.e., the alignment brackets 152). The fasteners 180 thus directly and fixedly (i.e., immovably) connect (secure) the guards 376 to the alignment members 124 so as to inhibit relative movement therebetween in order to further facilitate concomitant (simultaneous) movement of the guards 376 with the alignment members 124 and the slide members 374.

The ribs 402 extend in a generally vertical orientation and are spaced axially along the length of the drive member 188 so as to define receiving spaces 404 therebetween. The receiving spaces 404 are configured to receive the mounts 176 on the alignment brackets 152 to facilitate proper registration of (alignment between) the guards 376 and the alignment members 124.

With general reference now to FIGS. 1-4 and 11-16, a method of docking the UAV 10 (FIGS. 3B, 8C, 12-15) with the base station 100 will be discussed, which includes a landing procedure followed by an alignment procedure.

During the landing procedure, the roof 104 (FIGS. 1-4) is opened in order to allow visual identification of the fiducials 122 and guidance of the UAV 10 towards the landing platform 110.

In contrast to certain known base stations, which often include a landing surface (e.g., a cradle) that is extendible from and retractable into the base station during landing, the landing platform 110 is open and positioned in a fixed location during landing of the UAV 10. The fixed location of the landing platform 110 improves the predictability of wind conditions, propeller wash, etc., thereby improving control of the UAV 10 during landing.

Prior to touchdown, the locations (positions) of the alignment members 124 are determined (e.g., via the sensor(s) 142 (FIG. 22)) and, if necessary, the alignment members 124 are repositioned towards the extended position (FIGS. 11, 12, 16) via the drive mechanism 128 (FIG. 16) in order to prepare the landing platform 110 for reception of the UAV 10.

In order to move the alignment members 124 towards the extended position, the motor assembly 186 is actuated such that the pulley 234 is rotated in a first direction 1 (FIG. 26), which acts upon and moves the drive member 188. Movement of the drive member 188 transfers force to the alignment members 124 via the drive brackets 190 such that the alignment members 124 move through the slots 126 (FIGS. 11-13) in the landing platform 110 and are repositioned towards the extended position.

Upon touchdown, the base station 100 performs a landing assessment to confirm proper landing of the UAV 10 (i.e., that the legs 14 of the UAV 10 have been received by the landing areas 132). In the event of an improper landing, the landing procedure is aborted, the UAV 10 is caused to ascend, and landing is reattempted.

Upon confirmation of proper landing, the alignment procedure is initiated via actuation of the motor assembly 186 and rotation of the pulley 234 in a second direction 2 (FIG. 26), which repositions the alignment members 124 towards the retracted position (FIGS. 8C, 13) by transferring force thereto via the drive member 188 and the drive brackets 190.

During retraction of the alignment members 124, the projections 150 (FIGS. 8C, 12, 13, 18, 19) are brought into engagement (contact) with the UAV 10 (e.g., the legs 14) such that the bearing surfaces 154 urge the UAV 10 outwardly towards the periphery 158 (FIG. 12) of the landing platform 110. Retraction of the alignment members 124 continues until the power source 12 on the UAV 10 is brought into general alignment with the charging hub 108, as seen in FIG. 14.

The charging hub 108 is then repositioned from the retracted position (FIG. 14) into the extended position (FIG. 15) such that that the charging hub 108 protrudes from the landing platform 110 (i.e., via the window 130) and engages (contacts) the power source 12 on the UAV 10 to facilitate charging thereof.

Following charging, the charging hub 108 is retracted, thereby disengaging the charging hub 108 from the power source 12 on the UAV 10. The alignment members 124 are then extended to thereby disengage and separate the alignment members 124 from the UAV 10. The UAV 10 then ascends, and the roof 104 is closed.

In certain methods of docking the UAV 10, following retraction of the charging hub 108, it is envisioned that the base station 100 may be utilized to (temporarily or indefinitely) store the UAV 10. In such methods, it is envisioned that the alignment members 124 may remain in the retracted position (e.g., in engagement (contact) with the UAV 10)) to thereby stabilize and secure the UAV 10 on the landing platform 110. Alternatively, it is envisioned that the alignment members 124 may be extended to thereby disengage and separate the alignment members 124 from the UAV 10, which may occur prior to, concomitantly with, or following closure of the roof 104.

Persons skilled in the art will understand that the various embodiments of the disclosure described herein and shown in the accompanying figures constitute non-limiting examples and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (i.e., an angle that lies within the range of (approximately) 135° to (approximately) 225°) and the term "generally orthogonal" should be understood as referring to configurations in with the pertinent components are oriented so as to define an angle therebetween that is equal to 90°±25% (i.e., an angle that lies within the range of (approximately) 67.5° to (approximately) 112.5°). The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A landing platform for a base station configured to receive an unmanned aerial vehicle (UAV), wherein the landing platform is reconfigurable from a first configuration into a second configuration to reposition the UAV on the landing platform and comprises:

a stage;

alignment members configured for engagement with the UAV, wherein the alignment members are repositionable in relation to the stage from an extended position, which corresponds to the first configuration of the landing platform, into a retracted position, which corresponds to the second configuration of the landing platform; and a drive mechanism connected to the alignment members to facilitate repositioning from the extended position into the retracted position, wherein the drive mechanism includes:

a drive member;

pulley assemblies engaging the drive member;

drive brackets extending between and connecting the drive member and the alignment members such that movement of the drive member causes corresponding movement of the drive brackets and the alignment members; and slide assemblies supporting the alignment members, wherein the slide assemblies include:

slide brackets connected to the stage;

guides connected to the slide brackets; and slide members movable in relation to the guides, wherein the slide members are connected to the alignment members such that movement of the alignment members causes corresponding movement of the slide members.

2. The landing platform of claim 1, wherein the pulley assemblies include:

a first pulley assembly connected to the stage and defining a first axis of rotation;

a second pulley assembly connected to the stage and defining second axes of rotation;

third pulley assemblies connected to the stage and defining third axes of rotation; and a fourth pulley assembly connected to the stage and defining a fourth axis of rotation.

3. The landing platform of claim 2, wherein the first axis of rotation, the third axes of rotation, and the fourth axis of rotation are fixed.

4. The landing platform of claim 3, wherein the second axes of rotation are movable.

5. The landing platform of claim 1, wherein the pulley assemblies include:

a first pulley assembly connected to the stage and including:

a first frame; and a first pulley extending into the first frame and engaging the drive member such that the drive member extends about the first pulley whereby rotation of the first pulley causes movement of the drive member;

a second pulley assembly connected to the stage and including:

a second frame; and second pulleys rotatable in relation to the second frame and engaging the drive member such that the drive member extends between the second pulleys;

third pulley assemblies connected to the stage, wherein the third pulley assemblies each include:

a third frame; and third pulleys rotatable in relation to the third frame and engaging the drive member such that the drive member extends about the third pulleys; and a fourth pulley assembly connected to the stage, wherein the fourth pulley assembly includes:

a first bracket fixedly connected to the stage; and a second bracket movably connected to the stage such that the second bracket is axially movable in relation to the first bracket, wherein the second bracket includes:

a fourth frame; and a fourth pulley rotatable in relation to the fourth frame and engaging the drive member such that the drive member extends about the fourth pulley.

6. The landing platform of claim 5, wherein the second pulleys are laterally movable in relation to the second frame.

7. The landing platform of claim 6, wherein the second pulley assembly further includes:

pulley shafts connected to the second pulleys and extending into slots in the frame.

8. The landing platform of claim 7, wherein the second pulley assembly further includes:

a biasing member extending between the pulley shafts to bias the second pulleys laterally inward and apply a lateral tension to the drive member.

9. The landing platform of claim 5, wherein the third pulleys are laterally fixed in relation to the third frame.

10. The landing platform of claim 5, wherein the fourth pulley assembly further includes:

an adjustment member extending between the first bracket and the second bracket, wherein the adjustment member is configured to vary an axial tension in the drive member.

11. A reconfigurable landing platform for a base station configured to receive an unmanned aerial vehicle (UAV), wherein the reconfigurable landing platform comprises:

alignment members configured for engagement with the UAV, wherein the alignment members are repositionable from an extended position into a retracted position to reposition the UAV on the reconfigurable landing platform; and a drive mechanism secured to an underside of the landing platform and connected to the alignment members to facilitate repositioning from the extended position into the retracted position, wherein the drive mechanism includes:

a drive member; and pulley assemblies engaging the drive member, wherein the pulley assemblies are configured to vary a lateral tension and an axial tension in the drive member.

12. The reconfigurable landing platform of claim 11, wherein the pulley assemblies include:

adjustable pulley assemblies; and non-adjustable pulley assemblies.

13. The reconfigurable landing platform of claim 12, wherein the adjustable pulley assemblies include:

a first adjustable pulley assembly configured to apply the lateral tension to the drive member; and a second adjustable pulley assembly configured to apply the axial tension to the drive member.

14. The reconfigurable landing platform of claim 13, wherein the first adjustable pulley assembly includes:

a first frame defining slots;

pulley shafts extending into the slots; and first pulleys connected to the pulley shafts.

15. The reconfigurable landing platform of claim 14, wherein the first adjustable pulley assembly further includes:

a biasing member extending between the pulley shafts to bias the first pulleys laterally inward and vary the lateral tension in the drive member.

16. The reconfigurable landing platform of claim 13, wherein the second adjustable pulley assembly includes:

a fixed bracket; and a movable bracket axially repositionable in relation to the fixed bracket, wherein axial repositioning of the movable bracket in relation to the fixed bracket varies the axial tension in the drive member.

17. A reconfigurable landing platform for a base station configured to receive an unmanned aerial vehicle (UAV), wherein the reconfigurable landing platform comprises:

alignment members configured for engagement with the UAV, wherein the alignment members are repositionable from an extended position into a retracted position to reposition the UAV on the reconfigurable landing platform; and a drive mechanism concealed beneath the landing platform within the base station and connected to the alignment members to facilitate repositioning from the extended position into the retracted position, wherein the drive mechanism includes:

a drive member; and drive brackets extending between and connecting the drive member and the alignment members such that movement of the drive member causes corresponding movement of the drive brackets and the alignment members.

18. The reconfigurable landing platform of claim 17, wherein the drive mechanism further includes:

slide assemblies supporting the alignment members to facilitate repositioning of the alignment members from the extended position into the retracted position.

19. The reconfigurable landing platform of claim 18, wherein the slide assemblies include:

guides; and slide members movable in relation to the guides, wherein the slide members are connected to the alignment members such that movement of the alignment members causes corresponding movement of the slide members.

20. The reconfigurable landing platform of claim 19, wherein the slide assemblies further include:

guards positioned between the slide members and the alignment members, wherein the guards conceal the slide members to protect the slide members from water and/or debris.

* * * * *